(12) United States Patent
Veenman et al.

(10) Patent No.: US 12,262,657 B2
(45) Date of Patent: Apr. 1, 2025

(54) DEVICE AND METHOD FOR DISPENSING A PARTICULATE MATERIAL

(71) Applicant: Koppert B.V., Berkel en Rodenrijs (NL)

(72) Inventors: Arend Veenman, Berkel en Rodenrijs (NL); Sjors Veenman, Berkel en Rodenrijs (NL); Maarten Henk De Glopper, Berkel en Rodenrijs (NL)

(73) Assignee: Koppert B.V., Berkel en Rodenrijs (NL)

( * ) Notice: Subject to any disclaimer, the term of this patent is extended or adjusted under 35 U.S.C. 154(b) by 883 days.

(21) Appl. No.: 17/421,839

(22) PCT Filed: Jan. 13, 2020

(86) PCT No.: PCT/NL2020/050016
§ 371 (c)(1),
(2) Date: Jul. 9, 2021

(87) PCT Pub. No.: WO2020/145827
PCT Pub. Date: Jul. 16, 2020

(65) Prior Publication Data
US 2022/0095530 A1   Mar. 31, 2022

(30) Foreign Application Priority Data
Jan. 11, 2019 (NL) ..................... 2022384

(51) Int. Cl.
*A01C 15/00* (2006.01)
*A01M 99/00* (2006.01)
*B64D 1/16* (2006.01)

(52) U.S. Cl.
CPC ........... *A01C 15/006* (2013.01); *A01M 99/00* (2013.01); *B64D 1/16* (2013.01)

(58) Field of Classification Search
CPC ....... A01C 15/006; A01C 15/00; A01C 15/12; A01M 99/00; B64D 1/16
See application file for complete search history.

(56) References Cited

FOREIGN PATENT DOCUMENTS

| | | |
|---|---|---|
| DE | 4004497 A1 | 8/1991 |
| EP | 0508170 A1 | 10/1992 |
| EP | 0829194 A1 | 3/1998 |
| JP | S5648720 U | 4/1981 |
| JP | S58117816 U | 8/1983 |
| WO | WO2017106903 A1 | 6/2017 |

*Primary Examiner* — Tara Mayo
(74) *Attorney, Agent, or Firm* — Mandar A. Joshi; Bret E. Field; Bozicevic, Field & Francis LLP

(57) ABSTRACT

The invention relates to a method for dispensing a particulate material in a target area and a device suitable for use in the method. The method comprise (i) providing a reservoir comprising openings for the particulate material, (ii) providing a number of closing means suitable for at least partially closing the openings of the reservoir (iii) providing a number of screens in the void of the reservoir, said screens being movable, through the void of the reservoir between at least a first and a second position (iv) loading particulate material in the reservoir, (v) moving the reservoir loaded with particulate material over the target area and at least partially opening the number of openings while alternatingly moving the screens between a first and a second position and vice versa.

20 Claims, 47 Drawing Sheets

| Particle size (1) | density of particulate material | | | | |
| --- | --- | --- | --- | --- | --- |
| | 70-250 | 70-100 | 90-150 | 180-240 | 140-200 |
| 0.05 - 15.00 | x | x | x | x | x |
| 0.10 - 10.00 | x | x | x | x | x |
| 0.25 - 10.00 | x | x | x | x | x |
| 0.50 - 2.00 | x | x | x | x | x |
| 0.25 - 7.00 | x | x | x | x | x |

(1) Particle size in mm. Particle size is average particle size over longest axis of particles.
(2) Density of particulate material is density under standard conditions in grams per liter (g/l).
    X marks a combination envisaged within the invention.

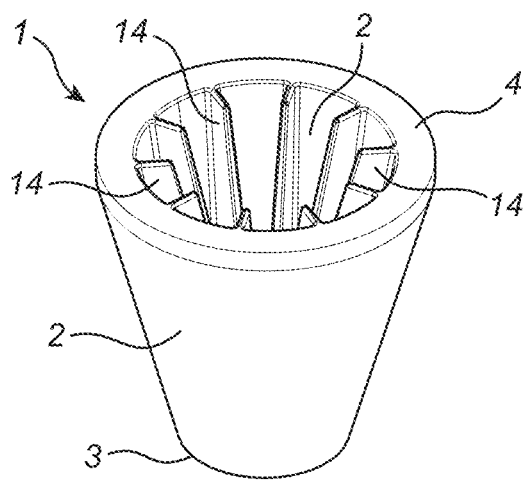 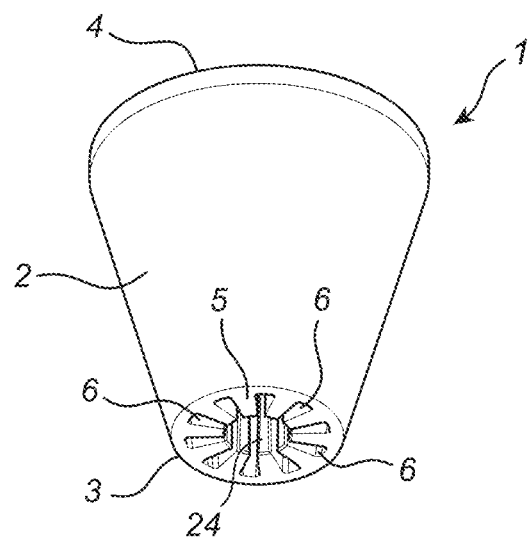
Fig. 9A Fig. 9B
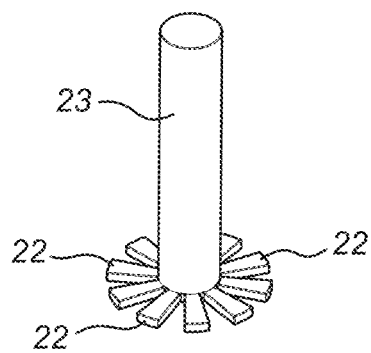 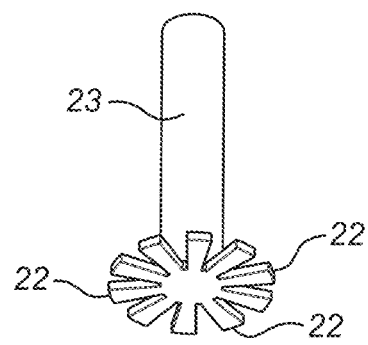
Fig. 9C Fig. 9D
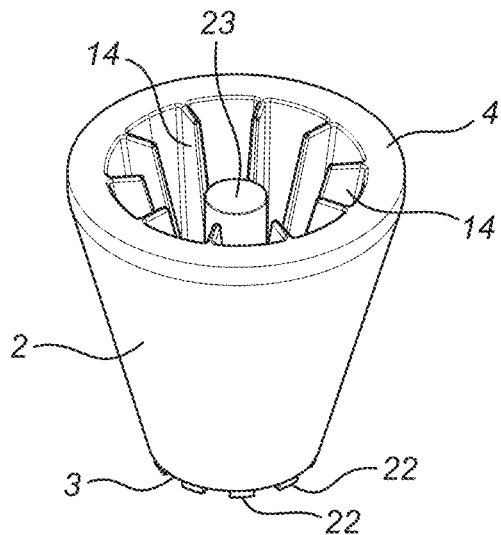 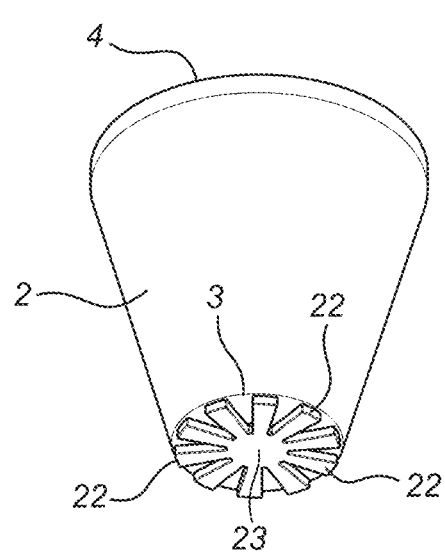
Fig. 9E Fig. 9F

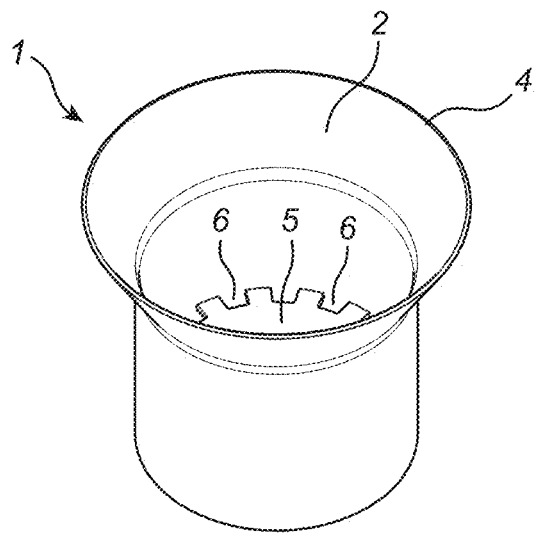
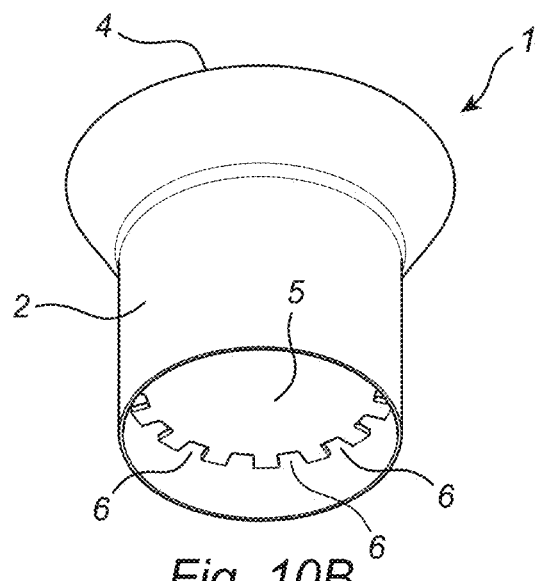
Fig. 10A  Fig. 10B
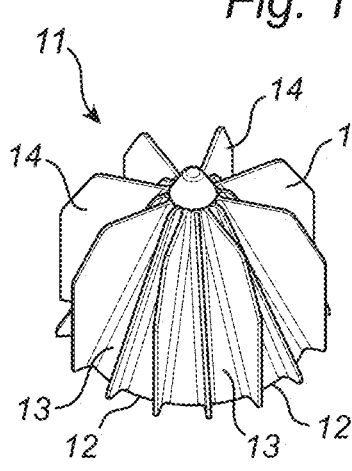
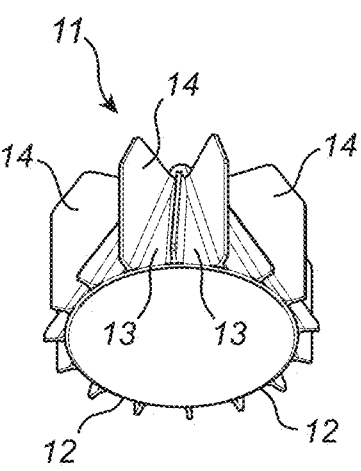
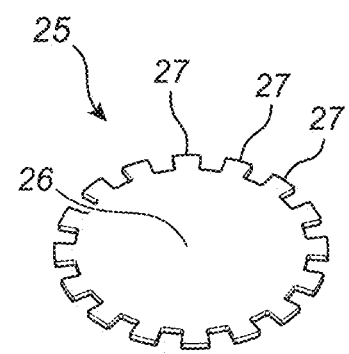
Fig. 10C  Fig. 10D  Fig. 10E
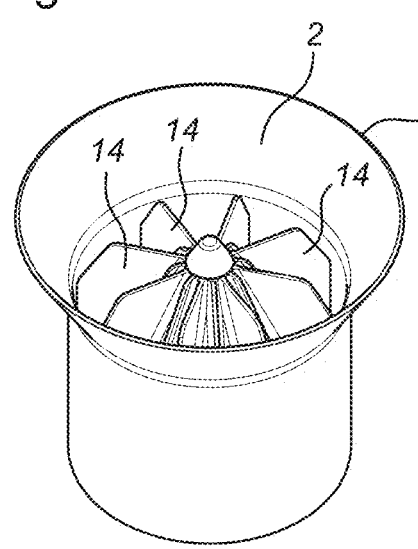
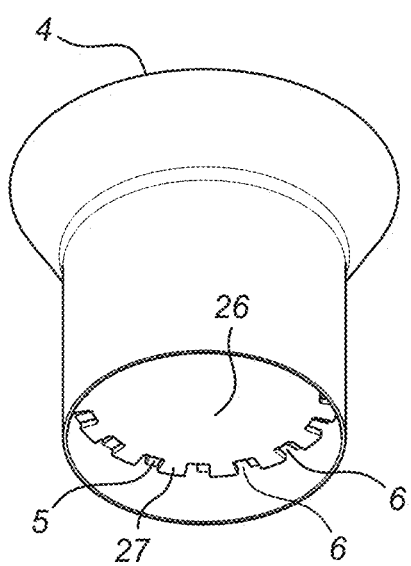
Fig. 10F  Fig. 10G

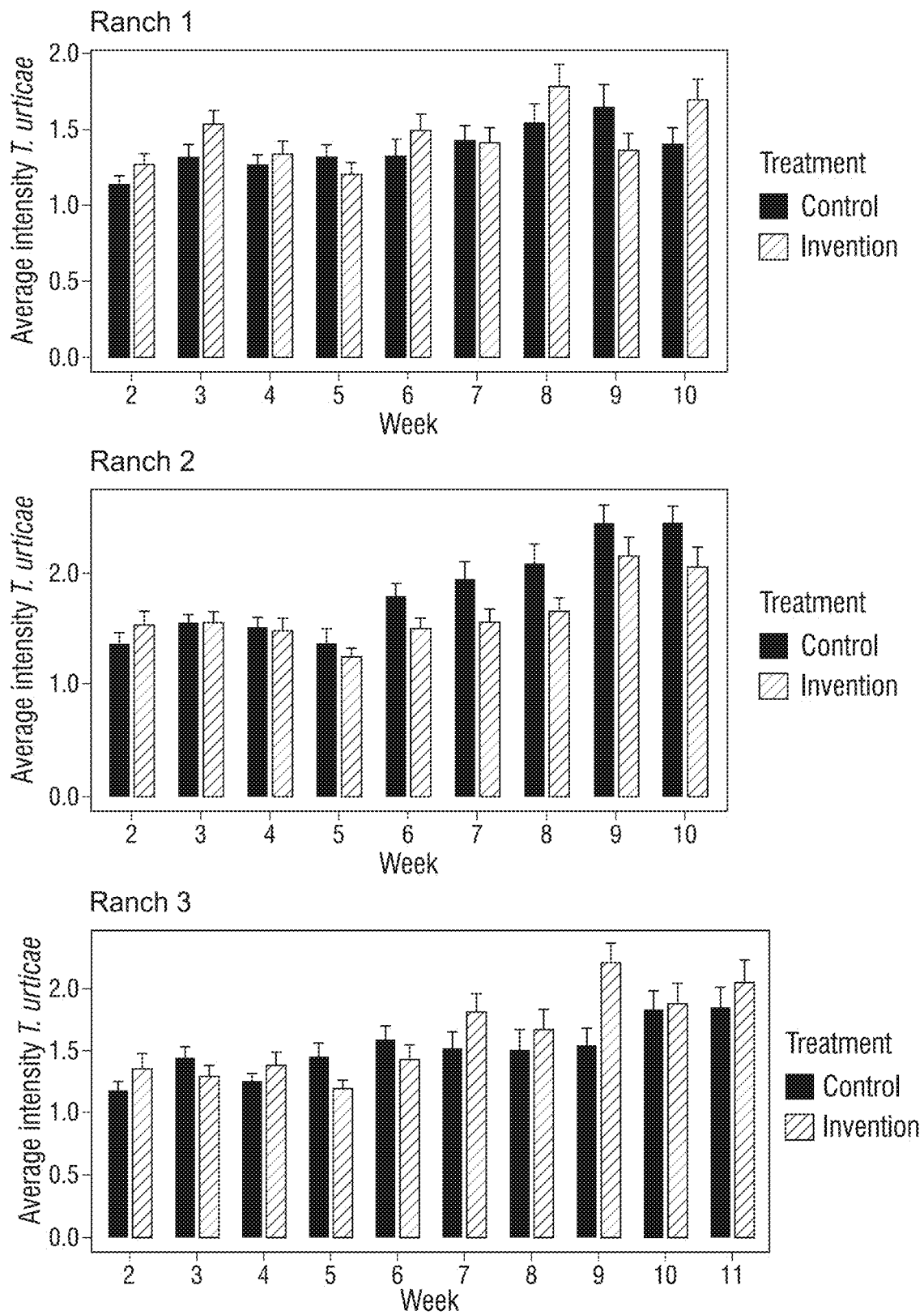
*Fig. 14A*   *Average intensity of T. urticae*

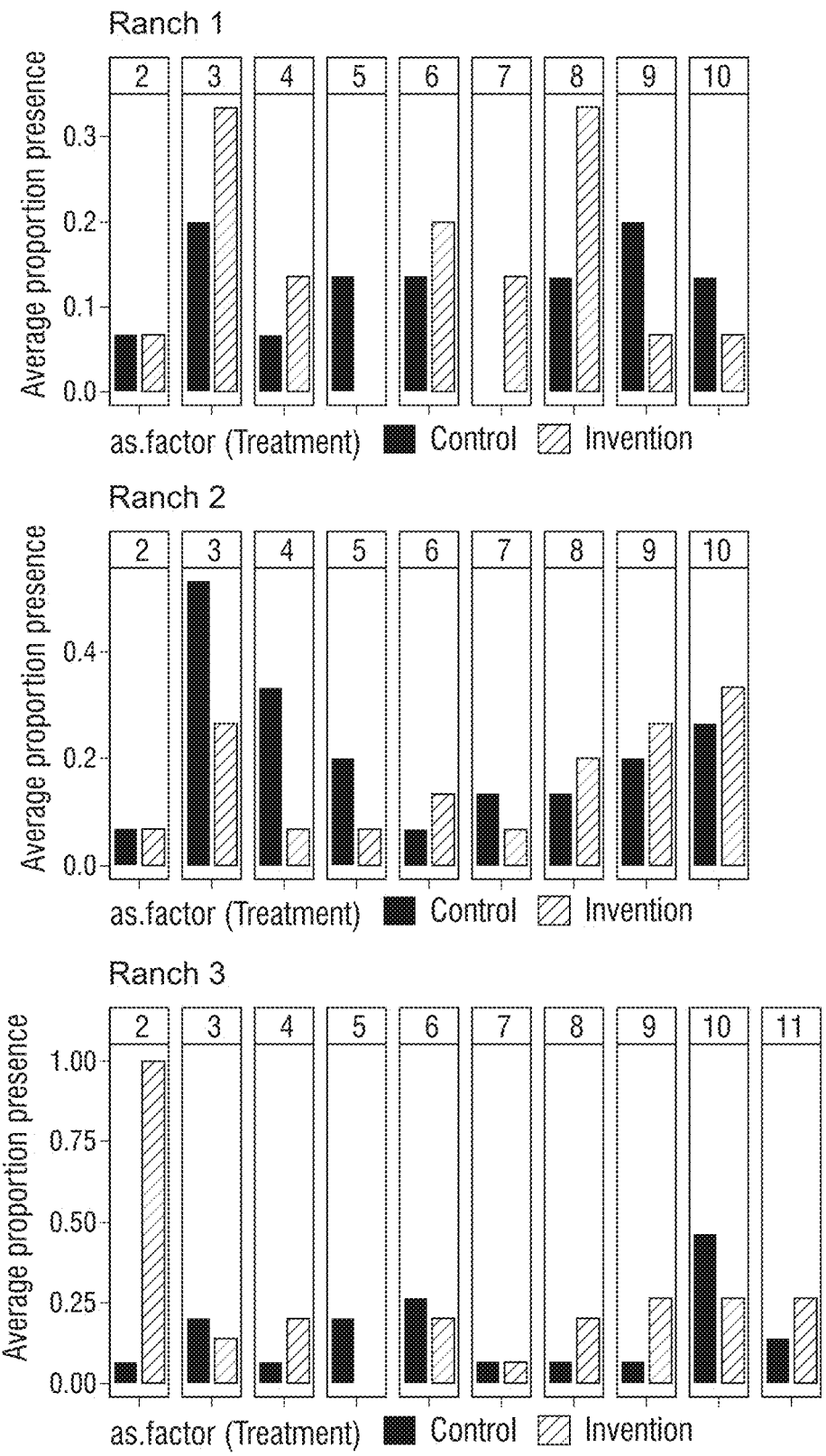
*Fig. 14B*   *Average P. Persimilis pressure*

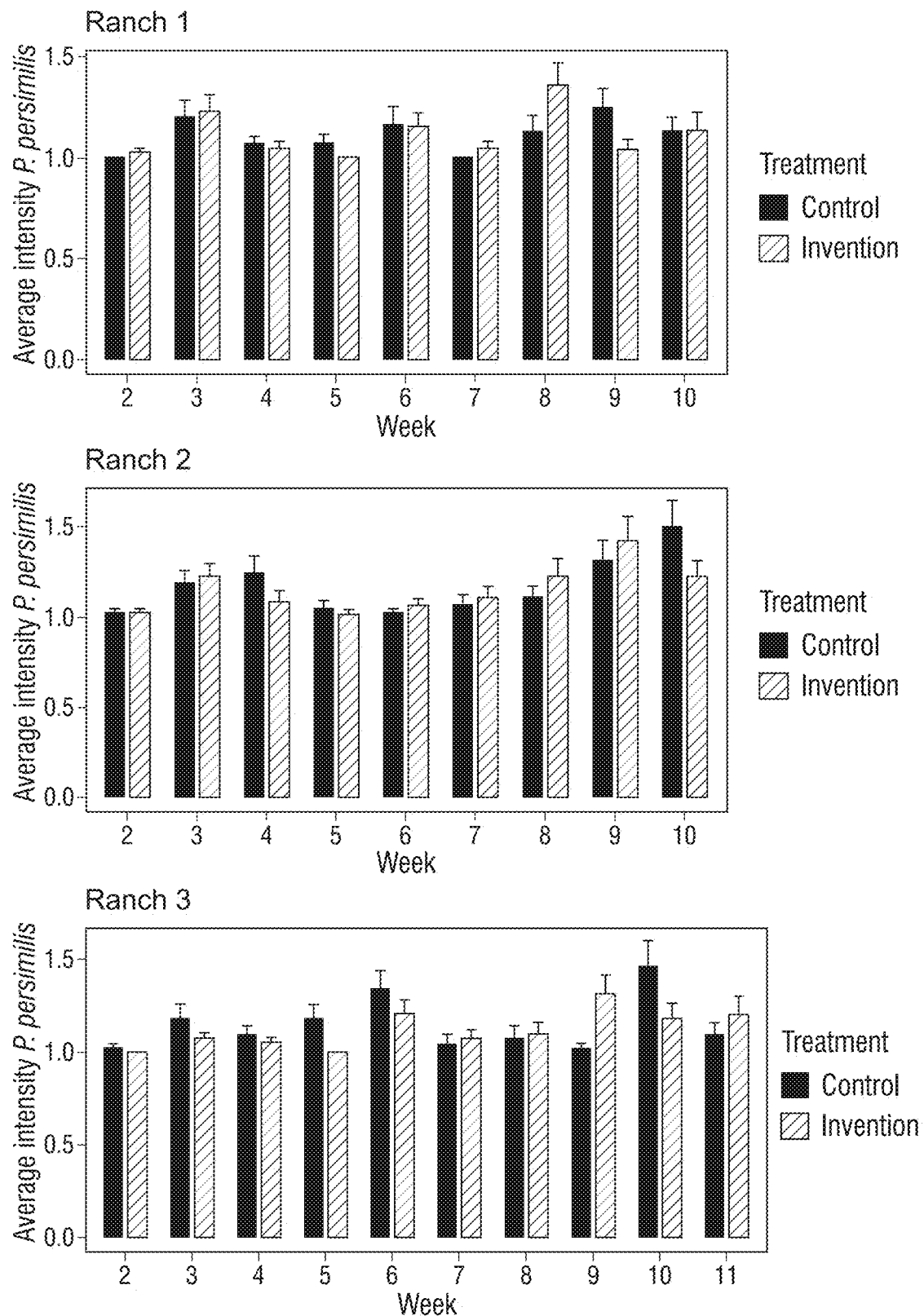
Fig. 14C  Average intensity of P. Persimilis

Fig. 15

| second position \ first position | 0-20% | 2-20% | 2-18% | 4-18% | 4-16% | 5-15% |
|---|---|---|---|---|---|---|
| 30-100% | P1 | P11 | P21 | P31 | P41 | P51 |
| 30-95% | P2 | P12 | P22 | P32 | P42 | P52 |
| 30-90% | P3 | P13 | P23 | P33 | P43 | P53 |
| 30-85% | P4 | P14 | P24 | P34 | P44 | P54 |
| 30-80% | P5 | P15 | P25 | P35 | P45 | P55 |
| 35-75% | P6 | P16 | P26 | P36 | P46 | P56 |
| 35-70% | P7 | P17 | P27 | P37 | P47 | P57 |
| 40-70% | P8 | P18 | P28 | P38 | P48 | P58 |
| 40-65% | P9 | P19 | P29 | P39 | P49 | P59 |
| 40-60% | P10 | P20 | P30 | P40 | P50 | P60 |

Fig. 16

| Area of openings (mm2) \ Frequency (S^-1) | 0.1-45 | 0.1-40 | 0.2-40 | 0.2-35 | 0.5-30 | 0.5-25 | 1-20 | 1-15 | 1-10 |
|---|---|---|---|---|---|---|---|---|---|
| 5-1000*10^3 | AF1 | AF5 | AF9 | AF13 | AF17 | AF21 | AF25 | AF29 | AF33 |
| 10-100*10^3 | AF2 | AF6 | AF10 | AF14 | AF18 | AF22 | AF26 | AF30 | AF34 |
| 50-50*10^3 | AF3 | AF7 | AF11 | AF15 | AF19 | AF23 | AF27 | AF31 | AF35 |
| 50-500 | AF4 | AF8 | AF12 | AF16 | AF20 | AF24 | AF28 | AF32 | AF36 |

| | | Frequency (S^-1) | | | | | | | | |
|---|---|---|---|---|---|---|---|---|---|---|
| | | 0.1-45 | 0.1-40 | 0.2-40 | 0.2-35 | 0.5-30 | 0.5-25 | 1-20 | 1-15 | 1-10 |
| First position / Second position combinations | P1 | PF1 | PF61 | PF121 | PF181 | PF241 | PF301 | PF361 | PF421 | PF481 |
| | P2 | PF2 | PF62 | PF122 | PF182 | PF242 | PF302 | PF362 | PF422 | PF482 |
| | P3 | PF3 | PF63 | PF123 | PF183 | PF243 | PF303 | PF363 | PF423 | PF483 |
| | P4 | PF4 | PF64 | PF124 | PF184 | PF244 | PF304 | PF364 | PF424 | PF484 |
| | P5 | PF5 | PF65 | PF125 | PF185 | PF245 | PF305 | PF365 | PF425 | PF485 |
| | P6 | PF6 | PF66 | PF126 | PF186 | PF246 | PF306 | PF366 | PF426 | PF486 |
| | P7 | PF7 | PF67 | PF127 | PF187 | PF247 | PF307 | PF367 | PF427 | PF487 |
| | P8 | PF8 | PF68 | PF128 | PF188 | PF248 | PF308 | PF368 | PF428 | PF488 |
| | P9 | PF9 | PF69 | PF129 | PF189 | PF249 | PF309 | PF369 | PF429 | PF489 |
| | P10 | PF10 | PF70 | PF130 | PF190 | PF250 | PF310 | PF370 | PF430 | PF490 |
| | P11 | PF11 | PF71 | PF131 | PF191 | PF251 | PF311 | PF371 | PF431 | PF491 |
| | P12 | PF12 | PF72 | PF132 | PF192 | PF252 | PF312 | PF372 | PF432 | PF492 |
| | P13 | PF13 | PF73 | PF133 | PF193 | PF253 | PF313 | PF373 | PF433 | PF493 |
| | P14 | PF14 | PF74 | PF134 | PF194 | PF254 | PF314 | PF374 | PF434 | PF494 |
| | P15 | PF15 | PF75 | PF135 | PF195 | PF255 | PF315 | PF375 | PF435 | PF495 |
| | P16 | PF16 | PF76 | PF136 | PF196 | PF256 | PF316 | PF376 | PF436 | PF496 |
| | P17 | PF17 | PF77 | PF137 | PF197 | PF257 | PF317 | PF377 | PF437 | PF497 |
| | P18 | PF18 | PF78 | PF138 | PF198 | PF258 | PF318 | PF378 | PF438 | PF498 |
| | P19 | PF19 | PF79 | PF139 | PF199 | PF259 | PF319 | PF379 | PF439 | PF499 |
| | P20 | PF20 | PF80 | PF140 | PF200 | PF260 | PF320 | PF380 | PF440 | PF500 |
| | P21 | PF21 | PF81 | PF141 | PF201 | PF261 | PF321 | PF381 | PF441 | PF501 |
| | P22 | PF22 | PF82 | PF142 | PF202 | PF262 | PF322 | PF382 | PF442 | PF502 |
| | P23 | PF23 | PF83 | PF143 | PF203 | PF263 | PF323 | PF383 | PF443 | PF503 |
| | P24 | PF24 | PF84 | PF144 | PF204 | PF264 | PF324 | PF384 | PF444 | PF504 |
| | P25 | PF25 | PF85 | PF145 | PF205 | PF265 | PF325 | PF385 | PF445 | PF505 |
| | P26 | PF26 | PF86 | PF146 | PF206 | PF266 | PF326 | PF386 | PF446 | PF506 |
| | P27 | PF27 | PF87 | PF147 | PF207 | PF267 | PF327 | PF387 | PF447 | PF507 |
| | P28 | PF28 | PF88 | PF148 | PF208 | PF268 | PF328 | PF388 | PF448 | PF508 |
| | P29 | PF29 | PF89 | PF149 | PF209 | PF269 | PF329 | PF389 | PF449 | PF509 |

*Fig. 17*

| | | Frequency (S^-1) | | | | | | | | |
|---|---|---|---|---|---|---|---|---|---|---|
| | | 0.1-45 | 0.1-40 | 0.2-40 | 0.2-35 | 0.5-30 | 0.5-25 | 1-20 | 1-15 | 1-10 |
| First position / Second position combinations | P30 | PF30 | PF90 | PF150 | PF210 | PF270 | PF330 | PF390 | PF450 | PF510 |
| | P31 | PF31 | PF91 | PF151 | PF211 | PF271 | PF331 | PF391 | PF451 | PF511 |
| | P32 | PF32 | PF92 | PF152 | PF212 | PF272 | PF332 | PF392 | PF452 | PF512 |
| | P33 | PF33 | PF93 | PF153 | PF213 | PF273 | PF333 | PF393 | PF453 | PF513 |
| | P34 | PF34 | PF94 | PF154 | PF214 | PF274 | PF334 | PF394 | PF454 | PF514 |
| | P35 | PF35 | PF95 | PF155 | PF215 | PF275 | PF335 | PF395 | PF455 | PF515 |
| | P36 | PF36 | PF96 | PF156 | PF216 | PF276 | PF336 | PF396 | PF456 | PF516 |
| | P37 | PF37 | PF97 | PF157 | PF217 | PF277 | PF337 | PF397 | PF457 | PF517 |
| | P38 | PF38 | PF98 | PF158 | PF218 | PF278 | PF338 | PF398 | PF458 | PF518 |
| | P39 | PF39 | PF99 | PF159 | PF219 | PF279 | PF339 | PF399 | PF459 | PF519 |
| | P40 | PF40 | PF100 | PF160 | PF220 | PF280 | PF340 | PF400 | PF460 | PF520 |
| | P41 | PF41 | PF101 | PF161 | PF221 | PF281 | PF341 | PF401 | PF461 | PF521 |
| | P42 | PF42 | PF102 | PF162 | PF222 | PF282 | PF342 | PF402 | PF462 | PF522 |
| | P43 | PF43 | PF103 | PF163 | PF223 | PF283 | PF343 | PF403 | PF463 | PF523 |
| | P44 | PF44 | PF104 | PF164 | PF224 | PF284 | PF344 | PF404 | PF464 | PF524 |
| | P45 | PF45 | PF105 | PF165 | PF225 | PF285 | PF345 | PF405 | PF465 | PF525 |
| | P46 | PF46 | PF106 | PF166 | PF226 | PF286 | PF346 | PF406 | PF466 | PF526 |
| | P47 | PF47 | PF107 | PF167 | PF227 | PF287 | PF347 | PF407 | PF467 | PF527 |
| | P48 | PF48 | PF108 | PF168 | PF228 | PF288 | PF348 | PF408 | PF468 | PF528 |
| | P49 | PF49 | PF109 | PF169 | PF229 | PF289 | PF349 | PF409 | PF469 | PF529 |
| | P50 | PF50 | PF110 | PF170 | PF230 | PF290 | PF350 | PF410 | PF470 | PF530 |
| | P51 | PF51 | PF111 | PF171 | PF231 | PF291 | PF351 | PF411 | PF471 | PF531 |
| | P52 | PF52 | PF112 | PF172 | PF232 | PF292 | PF352 | PF412 | PF472 | PF532 |
| | P53 | PF53 | PF113 | PF173 | PF233 | PF293 | PF353 | PF413 | PF473 | PF533 |
| | P54 | PF54 | PF114 | PF174 | PF234 | PF294 | PF354 | PF414 | PF474 | PF534 |
| | P55 | PF55 | PF115 | PF175 | PF235 | PF295 | PF355 | PF415 | PF475 | PF535 |
| | P56 | PF56 | PF116 | PF176 | PF236 | PF296 | PF356 | PF416 | PF476 | PF536 |
| | P57 | PF57 | PF117 | PF177 | PF237 | PF297 | PF357 | PF417 | PF477 | PF537 |
| | P58 | PF58 | PF118 | PF178 | PF238 | PF298 | PF358 | PF418 | PF478 | PF538 |
| | P59 | PF59 | PF119 | PF179 | PF239 | PF299 | PF359 | PF419 | PF479 | PF539 |
| | P60 | PF60 | PF120 | PF180 | PF240 | PF300 | PF360 | PF420 | PF480 | PF540 |

*Fig. 17 Continued*

| First position / Second position combinations | | AF1 | AF2 | AF3 | AF4 | AF5 | AF6 | AF7 | AF8 | AF9 | AF10 | AF11 | AF12 | AF13 | AF14 | AF15 | AF16 | AF17 | AF18 |
|---|---|---|---|---|---|---|---|---|---|---|---|---|---|---|---|---|---|---|---|
| Area of opening / frequency of alternating movement combinations | P1 | E1 | E61 | E121 | E181 | E241 | E301 | E361 | E421 | E481 | E541 | E601 | E661 | E721 | E781 | E841 | E901 | E961 | E1021 |
| | P2 | E2 | E62 | E122 | E182 | E242 | E302 | E362 | E422 | E482 | E542 | E602 | E662 | E722 | E782 | E842 | E902 | E962 | E1022 |
| | P3 | E3 | E63 | E123 | E183 | E243 | E303 | E363 | E423 | E483 | E543 | E603 | E663 | E723 | E783 | E843 | E903 | E963 | E1023 |
| | P4 | E4 | E64 | E124 | E184 | E244 | E304 | E364 | E424 | E484 | E544 | E604 | E664 | E724 | E784 | E844 | E904 | E964 | E1024 |
| | P5 | E5 | E65 | E125 | E185 | E245 | E305 | E365 | E425 | E485 | E545 | E605 | E665 | E725 | E785 | E845 | E905 | E965 | E1025 |
| | P6 | E6 | E66 | E126 | E186 | E246 | E306 | E366 | E426 | E486 | E546 | E606 | E666 | E726 | E786 | E846 | E906 | E966 | E1026 |
| | P7 | E7 | E67 | E127 | E187 | E247 | E307 | E367 | E427 | E487 | E547 | E607 | E667 | E727 | E787 | E847 | E907 | E967 | E1027 |
| | P8 | E8 | E68 | E128 | E188 | E248 | E308 | E368 | E428 | E488 | E548 | E608 | E668 | E728 | E788 | E848 | E908 | E968 | E1028 |
| | P9 | E9 | E69 | E129 | E189 | E249 | E309 | E369 | E429 | E489 | E549 | E609 | E669 | E729 | E789 | E849 | E909 | E969 | E1029 |
| | P10 | E10 | E70 | E130 | E190 | E250 | E310 | E370 | E430 | E490 | E550 | E610 | E670 | E730 | E790 | E850 | E910 | E970 | E1030 |
| | P11 | E11 | E71 | E131 | E191 | E251 | E311 | E371 | E431 | E491 | E551 | E611 | E671 | E731 | E791 | E851 | E911 | E971 | E1031 |
| | P12 | E12 | E72 | E132 | E192 | E252 | E312 | E372 | E432 | E492 | E552 | E612 | E672 | E732 | E792 | E852 | E912 | E972 | E1032 |
| | P13 | E13 | E73 | E133 | E193 | E253 | E313 | E373 | E433 | E493 | E553 | E613 | E673 | E733 | E793 | E853 | E913 | E973 | E1033 |
| | P14 | E14 | E74 | E134 | E194 | E254 | E314 | E374 | E434 | E494 | E554 | E614 | E674 | E734 | E794 | E854 | E914 | E974 | E1034 |
| | P15 | E15 | E75 | E135 | E195 | E255 | E315 | E375 | E435 | E495 | E555 | E615 | E675 | E735 | E795 | E855 | E915 | E975 | E1035 |
| | P16 | E16 | E76 | E136 | E196 | E256 | E316 | E376 | E436 | E496 | E556 | E616 | E676 | E736 | E796 | E856 | E916 | E976 | E1036 |
| | P17 | E17 | E77 | E137 | E197 | E257 | E317 | E377 | E437 | E497 | E557 | E617 | E677 | E737 | E797 | E857 | E917 | E977 | E1037 |
| | P18 | E18 | E78 | E138 | E198 | E258 | E318 | E378 | E438 | E498 | E558 | E618 | E678 | E738 | E798 | E858 | E918 | E978 | E1038 |
| | P19 | E19 | E79 | E139 | E199 | E259 | E319 | E379 | E439 | E499 | E559 | E619 | E679 | E739 | E799 | E859 | E919 | E979 | E1039 |
| | P20 | E20 | E80 | E140 | E200 | E260 | E320 | E380 | E440 | E500 | E560 | E620 | E680 | E740 | E800 | E860 | E920 | E980 | E1040 |
| | P21 | E21 | E81 | E141 | E201 | E261 | E321 | E381 | E441 | E501 | E561 | E621 | E681 | E741 | E801 | E861 | E921 | E981 | E1041 |
| | P22 | E22 | E82 | E142 | E202 | E262 | E322 | E382 | E442 | E502 | E562 | E622 | E682 | E742 | E802 | E862 | E922 | E982 | E1042 |
| | P23 | E23 | E83 | E143 | E203 | E263 | E323 | E383 | E443 | E503 | E563 | E623 | E683 | E743 | E803 | E863 | E923 | E983 | E1043 |
| | P24 | E24 | E84 | E144 | E204 | E264 | E324 | E384 | E444 | E504 | E564 | E624 | E684 | E744 | E804 | E864 | E924 | E984 | E1044 |
| | P25 | E25 | E85 | E145 | E205 | E265 | E325 | E385 | E445 | E505 | E565 | E625 | E685 | E745 | E805 | E865 | E925 | E985 | E1045 |
| | P26 | E26 | E86 | E146 | E206 | E266 | E326 | E386 | E446 | E506 | E566 | E626 | E686 | E746 | E806 | E866 | E926 | E986 | E1046 |
| | P27 | E27 | E87 | E147 | E207 | E267 | E327 | E387 | E447 | E507 | E567 | E627 | E687 | E747 | E807 | E867 | E927 | E987 | E1047 |
| | P28 | E28 | E88 | E148 | E208 | E268 | E328 | E388 | E448 | E508 | E568 | E628 | E688 | E748 | E808 | E868 | E928 | E988 | E1048 |
| | P29 | E29 | E89 | E149 | E209 | E269 | E329 | E389 | E449 | E509 | E569 | E629 | E689 | E749 | E809 | E869 | E929 | E989 | E1049 |

| First position / Second position combinations | Area of opening / frequency of alternating movement combinations |||||||||||||||||||
|---|---|---|---|---|---|---|---|---|---|---|---|---|---|---|---|---|---|---|
| | AF1 | AF2 | AF3 | AF4 | AF5 | AF6 | AF7 | AF8 | AF9 | AF10 | AF11 | AF12 | AF13 | AF14 | AF15 | AF16 | AF17 | AF18 |
| P30 | E30 | E90 | E150 | E210 | E270 | E330 | E390 | E450 | E510 | E570 | E630 | E690 | E750 | E810 | E870 | E930 | E990 | E1050 |
| P31 | E31 | E91 | E151 | E211 | E271 | E331 | E391 | E451 | E511 | E571 | E631 | E691 | E751 | E811 | E871 | E931 | E991 | E1051 |
| P32 | E32 | E92 | E152 | E212 | E272 | E332 | E392 | E452 | E512 | E572 | E632 | E692 | E752 | E812 | E872 | E932 | E992 | E1052 |
| P33 | E33 | E93 | E153 | E213 | E273 | E333 | E393 | E453 | E513 | E573 | E633 | E693 | E753 | E813 | E873 | E933 | E993 | E1053 |
| P34 | E34 | E94 | E154 | E214 | E274 | E334 | E394 | E454 | E514 | E574 | E634 | E694 | E754 | E814 | E874 | E934 | E994 | E1054 |
| P35 | E35 | E95 | E155 | E215 | E275 | E335 | E395 | E455 | E515 | E575 | E635 | E695 | E755 | E815 | E875 | E935 | E995 | E1055 |
| P36 | E36 | E96 | E156 | E216 | E276 | E336 | E396 | E456 | E516 | E576 | E636 | E696 | E756 | E816 | E876 | E936 | E996 | E1056 |
| P37 | E37 | E97 | E157 | E217 | E277 | E337 | E397 | E457 | E517 | E577 | E637 | E697 | E757 | E817 | E877 | E937 | E997 | E1057 |
| P38 | E38 | E98 | E158 | E218 | E278 | E338 | E398 | E458 | E518 | E578 | E638 | E698 | E758 | E818 | E878 | E938 | E998 | E1058 |
| P39 | E39 | E99 | E159 | E219 | E279 | E339 | E399 | E459 | E519 | E579 | E639 | E699 | E759 | E819 | E879 | E939 | E999 | E1059 |
| P40 | E40 | E100 | E160 | E220 | E280 | E340 | E400 | E460 | E520 | E580 | E640 | E700 | E760 | E820 | E880 | E940 | E1000 | E1060 |
| P41 | E41 | E101 | E161 | E221 | E281 | E341 | E401 | E461 | E521 | E581 | E641 | E701 | E761 | E821 | E881 | E941 | E1001 | E1061 |
| P42 | E42 | E102 | E162 | E222 | E282 | E342 | E402 | E462 | E522 | E582 | E642 | E702 | E762 | E822 | E882 | E942 | E1002 | E1062 |
| P43 | E43 | E103 | E163 | E223 | E283 | E343 | E403 | E463 | E523 | E583 | E643 | E703 | E763 | E823 | E883 | E943 | E1003 | E1063 |
| P44 | E44 | E104 | E164 | E224 | E284 | E344 | E404 | E464 | E524 | E584 | E644 | E704 | E764 | E824 | E884 | E944 | E1004 | E1064 |
| P45 | E45 | E105 | E165 | E225 | E285 | E345 | E405 | E465 | E525 | E585 | E645 | E705 | E765 | E825 | E885 | E945 | E1005 | E1065 |
| P46 | E46 | E106 | E166 | E226 | E286 | E346 | E406 | E466 | E526 | E586 | E646 | E706 | E766 | E826 | E886 | E946 | E1006 | E1066 |
| P47 | E47 | E107 | E167 | E227 | E287 | E347 | E407 | E467 | E527 | E587 | E647 | E707 | E767 | E827 | E887 | E947 | E1007 | E1067 |
| P48 | E48 | E108 | E168 | E228 | E288 | E348 | E408 | E468 | E528 | E588 | E648 | E708 | E768 | E828 | E888 | E948 | E1008 | E1068 |
| P49 | E49 | E109 | E169 | E229 | E289 | E349 | E409 | E469 | E529 | E589 | E649 | E709 | E769 | E829 | E889 | E949 | E1009 | E1069 |
| P50 | E50 | E110 | E170 | E230 | E290 | E350 | E410 | E470 | E530 | E590 | E650 | E710 | E770 | E830 | E890 | E950 | E1010 | E1070 |
| P51 | E51 | E111 | E171 | E231 | E291 | E351 | E411 | E471 | E531 | E591 | E651 | E711 | E771 | E831 | E891 | E951 | E1011 | E1071 |
| P52 | E52 | E112 | E172 | E232 | E292 | E352 | E412 | E472 | E532 | E592 | E652 | E712 | E772 | E832 | E892 | E952 | E1012 | E1072 |
| P53 | E53 | E113 | E173 | E233 | E293 | E353 | E413 | E473 | E533 | E593 | E653 | E713 | E773 | E833 | E893 | E953 | E1013 | E1073 |
| P54 | E54 | E114 | E174 | E234 | E294 | E354 | E414 | E474 | E534 | E594 | E654 | E714 | E774 | E834 | E894 | E954 | E1014 | E1074 |
| P55 | E55 | E115 | E175 | E235 | E295 | E355 | E415 | E475 | E535 | E595 | E655 | E715 | E775 | E835 | E895 | E955 | E1015 | E1075 |
| P56 | E56 | E116 | E176 | E236 | E296 | E356 | E416 | E476 | E536 | E596 | E656 | E716 | E776 | E836 | E896 | E956 | E1016 | E1076 |
| P57 | E57 | E117 | E177 | E237 | E297 | E357 | E417 | E477 | E537 | E597 | E657 | E717 | E777 | E837 | E897 | E957 | E1017 | E1077 |
| P58 | E58 | E118 | E178 | E238 | E298 | E358 | E418 | E478 | E538 | E598 | E658 | E718 | E778 | E838 | E898 | E958 | E1018 | E1078 |
| P59 | E59 | E119 | E179 | E239 | E299 | E359 | E419 | E479 | E539 | E599 | E659 | E719 | E779 | E839 | E899 | E959 | E1019 | E1079 |
| P60 | E60 | E120 | E180 | E240 | E300 | E360 | E420 | E480 | E540 | E600 | E660 | E720 | E780 | E840 | E900 | E960 | E1020 | E1080 |

|  | Area of opening / frequency of alternating movement combinations |  |  |  |  |  |  |  |  |  |  |  |  |  |  |  |  |  |
|---|---|---|---|---|---|---|---|---|---|---|---|---|---|---|---|---|---|---|
|  | AF19 | AF20 | AF21 | AF22 | AF23 | AF24 | AF25 | AF26 | AF27 | AF28 | AF29 | AF30 | AF31 | AF32 | AF33 | AF34 | AF35 | AF36 |
| P1 | E1081 | E1141 | E1201 | E1261 | E1321 | E1381 | E1441 | E1501 | E1561 | E1621 | E1681 | E1741 | E1801 | E1861 | E1921 | E1981 | E2041 | E2101 |
| P2 | E1082 | E1142 | E1202 | E1262 | E1322 | E1382 | E1442 | E1502 | E1562 | E1622 | E1682 | E1742 | E1802 | E1862 | E1922 | E1982 | E2042 | E2102 |
| P3 | E1083 | E1143 | E1203 | E1263 | E1323 | E1383 | E1443 | E1503 | E1563 | E1623 | E1683 | E1743 | E1803 | E1863 | E1923 | E1983 | E2043 | E2103 |
| P4 | E1084 | E1144 | E1204 | E1264 | E1324 | E1384 | E1444 | E1504 | E1564 | E1624 | E1684 | E1744 | E1804 | E1864 | E1924 | E1984 | E2044 | E2104 |
| P5 | E1085 | E1145 | E1205 | E1265 | E1325 | E1385 | E1445 | E1505 | E1565 | E1625 | E1685 | E1745 | E1805 | E1865 | E1925 | E1985 | E2045 | E2105 |
| P6 | E1086 | E1146 | E1206 | E1266 | E1326 | E1386 | E1446 | E1506 | E1566 | E1626 | E1686 | E1746 | E1806 | E1866 | E1926 | E1986 | E2046 | E2106 |
| P7 | E1087 | E1147 | E1207 | E1267 | E1327 | E1387 | E1447 | E1507 | E1567 | E1627 | E1687 | E1747 | E1807 | E1867 | E1927 | E1987 | E2047 | E2107 |
| P8 | E1088 | E1148 | E1208 | E1268 | E1328 | E1388 | E1448 | E1508 | E1568 | E1628 | E1688 | E1748 | E1808 | E1868 | E1928 | E1988 | E2048 | E2108 |
| P9 | E1089 | E1149 | E1209 | E1269 | E1329 | E1389 | E1449 | E1509 | E1569 | E1629 | E1689 | E1749 | E1809 | E1869 | E1929 | E1989 | E2049 | E2109 |
| P10 | E1090 | E1150 | E1210 | E1270 | E1330 | E1390 | E1450 | E1510 | E1570 | E1630 | E1690 | E1750 | E1810 | E1870 | E1930 | E1990 | E2050 | E2110 |
| P11 | E1091 | E1151 | E1211 | E1271 | E1331 | E1391 | E1451 | E1511 | E1571 | E1631 | E1691 | E1751 | E1811 | E1871 | E1931 | E1991 | E2051 | E2111 |
| P12 | E1092 | E1152 | E1212 | E1272 | E1332 | E1392 | E1452 | E1512 | E1572 | E1632 | E1692 | E1752 | E1812 | E1872 | E1932 | E1992 | E2052 | E2112 |
| P13 | E1093 | E1153 | E1213 | E1273 | E1333 | E1393 | E1453 | E1513 | E1573 | E1633 | E1693 | E1753 | E1813 | E1873 | E1933 | E1993 | E2053 | E2113 |
| P14 | E1094 | E1154 | E1214 | E1274 | E1334 | E1394 | E1454 | E1514 | E1574 | E1634 | E1694 | E1754 | E1814 | E1874 | E1934 | E1994 | E2054 | E2114 |
| P15 | E1095 | E1155 | E1215 | E1275 | E1335 | E1395 | E1455 | E1515 | E1575 | E1635 | E1695 | E1755 | E1815 | E1875 | E1935 | E1995 | E2055 | E2115 |
| P16 | E1096 | E1156 | E1216 | E1276 | E1336 | E1396 | E1456 | E1516 | E1576 | E1636 | E1696 | E1756 | E1816 | E1876 | E1936 | E1996 | E2056 | E2116 |
| P17 | E1097 | E1157 | E1217 | E1277 | E1337 | E1397 | E1457 | E1517 | E1577 | E1637 | E1697 | E1757 | E1817 | E1877 | E1937 | E1997 | E2057 | E2117 |
| P18 | E1098 | E1158 | E1218 | E1278 | E1338 | E1398 | E1458 | E1518 | E1578 | E1638 | E1698 | E1758 | E1818 | E1878 | E1938 | E1998 | E2058 | E2118 |
| P19 | E1099 | E1159 | E1219 | E1279 | E1339 | E1399 | E1459 | E1519 | E1579 | E1639 | E1699 | E1759 | E1819 | E1879 | E1939 | E1999 | E2059 | E2119 |
| P20 | E1100 | E1160 | E1220 | E1280 | E1340 | E1400 | E1460 | E1520 | E1580 | E1640 | E1700 | E1760 | E1820 | E1880 | E1940 | E2000 | E2060 | E2120 |
| P21 | E1101 | E1161 | E1221 | E1281 | E1341 | E1401 | E1461 | E1521 | E1581 | E1641 | E1701 | E1761 | E1821 | E1881 | E1941 | E2001 | E2061 | E2121 |
| P22 | E1102 | E1162 | E1222 | E1282 | E1342 | E1402 | E1462 | E1522 | E1582 | E1642 | E1702 | E1762 | E1822 | E1882 | E1942 | E2002 | E2062 | E2122 |
| P23 | E1103 | E1163 | E1223 | E1283 | E1343 | E1403 | E1463 | E1523 | E1583 | E1643 | E1703 | E1763 | E1823 | E1883 | E1943 | E2003 | E2063 | E2123 |
| P24 | E1104 | E1164 | E1224 | E1284 | E1344 | E1404 | E1464 | E1524 | E1584 | E1644 | E1704 | E1764 | E1824 | E1884 | E1944 | E2004 | E2064 | E2124 |
| P25 | E1105 | E1165 | E1225 | E1285 | E1345 | E1405 | E1465 | E1525 | E1585 | E1645 | E1705 | E1765 | E1825 | E1885 | E1945 | E2005 | E2065 | E2125 |
| P26 | E1106 | E1166 | E1226 | E1286 | E1346 | E1406 | E1466 | E1526 | E1586 | E1646 | E1706 | E1766 | E1826 | E1886 | E1946 | E2006 | E2066 | E2126 |
| P27 | E1107 | E1167 | E1227 | E1287 | E1347 | E1407 | E1467 | E1527 | E1587 | E1647 | E1707 | E1767 | E1827 | E1887 | E1947 | E2007 | E2067 | E2127 |
| P28 | E1108 | E1168 | E1228 | E1288 | E1348 | E1408 | E1468 | E1528 | E1588 | E1648 | E1708 | E1768 | E1828 | E1888 | E1948 | E2008 | E2068 | E2128 |
| P29 | E1109 | E1169 | E1229 | E1289 | E1349 | E1409 | E1469 | E1529 | E1589 | E1649 | E1709 | E1769 | E1829 | E1889 | E1949 | E2009 | E2069 | E2129 |

First position / Second position combinations

*Fig. 18 continued*

| | Area of opening / frequency of alternating movement combinations | | | | | | | | | | | | | | | | | |
|---|---|---|---|---|---|---|---|---|---|---|---|---|---|---|---|---|---|---|
| | AF19 | AF20 | AF21 | AF22 | AF23 | AF24 | AF25 | AF26 | AF27 | AF28 | AF29 | AF30 | AF31 | AF32 | AF33 | AF34 | AF35 | AF36 |
| P30 | E1110 | E1170 | E1230 | E1290 | E1350 | E1410 | E1470 | E1530 | E1590 | E1650 | E1710 | E1770 | E1830 | E1890 | E1950 | E2010 | E2070 | E2130 |
| P31 | E1111 | E1171 | E1231 | E1291 | E1351 | E1411 | E1471 | E1531 | E1591 | E1651 | E1711 | E1771 | E1831 | E1891 | E1951 | E2011 | E2071 | E2131 |
| P32 | E1112 | E1172 | E1232 | E1292 | E1352 | E1412 | E1472 | E1532 | E1592 | E1652 | E1712 | E1772 | E1832 | E1892 | E1952 | E2012 | E2072 | E2132 |
| P33 | E1113 | E1173 | E1233 | E1293 | E1353 | E1413 | E1473 | E1533 | E1593 | E1653 | E1713 | E1773 | E1833 | E1893 | E1953 | E2013 | E2073 | E2133 |
| P34 | E1114 | E1174 | E1234 | E1294 | E1354 | E1414 | E1474 | E1534 | E1594 | E1654 | E1714 | E1774 | E1834 | E1894 | E1954 | E2014 | E2074 | E2134 |
| P35 | E1115 | E1175 | E1235 | E1295 | E1355 | E1415 | E1475 | E1535 | E1595 | E1655 | E1715 | E1775 | E1835 | E1895 | E1955 | E2015 | E2075 | E2135 |
| P36 | E1116 | E1176 | E1236 | E1296 | E1356 | E1416 | E1476 | E1536 | E1596 | E1656 | E1716 | E1776 | E1836 | E1896 | E1956 | E2016 | E2076 | E2136 |
| P37 | E1117 | E1177 | E1237 | E1297 | E1357 | E1417 | E1477 | E1537 | E1597 | E1657 | E1717 | E1777 | E1837 | E1897 | E1957 | E2017 | E2077 | E2137 |
| P38 | E1118 | E1178 | E1238 | E1298 | E1358 | E1418 | E1478 | E1538 | E1598 | E1658 | E1718 | E1778 | E1838 | E1898 | E1958 | E2018 | E2078 | E2138 |
| P39 | E1119 | E1179 | E1239 | E1299 | E1359 | E1419 | E1479 | E1539 | E1599 | E1659 | E1719 | E1779 | E1839 | E1899 | E1959 | E2019 | E2079 | E2139 |
| P40 | E1120 | E1180 | E1240 | E1300 | E1360 | E1420 | E1480 | E1540 | E1600 | E1660 | E1720 | E1780 | E1840 | E1900 | E1960 | E2020 | E2080 | E2140 |
| P41 | E1121 | E1181 | E1241 | E1301 | E1361 | E1421 | E1481 | E1541 | E1601 | E1661 | E1721 | E1781 | E1841 | E1901 | E1961 | E2021 | E2081 | E2141 |
| P42 | E1122 | E1182 | E1242 | E1302 | E1362 | E1422 | E1482 | E1542 | E1602 | E1662 | E1722 | E1782 | E1842 | E1902 | E1962 | E2022 | E2082 | E2142 |
| P43 | E1123 | E1183 | E1243 | E1303 | E1363 | E1423 | E1483 | E1543 | E1603 | E1663 | E1723 | E1783 | E1843 | E1903 | E1963 | E2023 | E2083 | E2143 |
| P44 | E1124 | E1184 | E1244 | E1304 | E1364 | E1424 | E1484 | E1544 | E1604 | E1664 | E1724 | E1784 | E1844 | E1904 | E1964 | E2024 | E2084 | E2144 |
| P45 | E1125 | E1185 | E1245 | E1305 | E1365 | E1425 | E1485 | E1545 | E1605 | E1665 | E1725 | E1785 | E1845 | E1905 | E1965 | E2025 | E2085 | E2145 |
| P46 | E1126 | E1186 | E1246 | E1306 | E1366 | E1426 | E1486 | E1546 | E1606 | E1666 | E1726 | E1786 | E1846 | E1906 | E1966 | E2026 | E2086 | E2146 |
| P47 | E1127 | E1187 | E1247 | E1307 | E1367 | E1427 | E1487 | E1547 | E1607 | E1667 | E1727 | E1787 | E1847 | E1907 | E1967 | E2027 | E2087 | E2147 |
| P48 | E1128 | E1188 | E1248 | E1308 | E1368 | E1428 | E1488 | E1548 | E1608 | E1668 | E1728 | E1788 | E1848 | E1908 | E1968 | E2028 | E2088 | E2148 |
| P49 | E1129 | E1189 | E1249 | E1309 | E1369 | E1429 | E1489 | E1549 | E1609 | E1669 | E1729 | E1789 | E1849 | E1909 | E1969 | E2029 | E2089 | E2149 |
| P50 | E1130 | E1190 | E1250 | E1310 | E1370 | E1430 | E1490 | E1550 | E1610 | E1670 | E1730 | E1790 | E1850 | E1910 | E1970 | E2030 | E2090 | E2150 |
| P51 | E1131 | E1191 | E1251 | E1311 | E1371 | E1431 | E1491 | E1551 | E1611 | E1671 | E1731 | E1791 | E1851 | E1911 | E1971 | E2031 | E2091 | E2151 |
| P52 | E1132 | E1192 | E1252 | E1312 | E1372 | E1432 | E1492 | E1552 | E1612 | E1672 | E1732 | E1792 | E1852 | E1912 | E1972 | E2032 | E2092 | E2152 |
| P53 | E1133 | E1193 | E1253 | E1313 | E1373 | E1433 | E1493 | E1553 | E1613 | E1673 | E1733 | E1793 | E1853 | E1913 | E1973 | E2033 | E2093 | E2153 |
| P54 | E1134 | E1194 | E1254 | E1314 | E1374 | E1434 | E1494 | E1554 | E1614 | E1674 | E1734 | E1794 | E1854 | E1914 | E1974 | E2034 | E2094 | E2154 |
| P55 | E1135 | E1195 | E1255 | E1315 | E1375 | E1435 | E1495 | E1555 | E1615 | E1675 | E1735 | E1795 | E1855 | E1915 | E1975 | E2035 | E2095 | E2155 |
| P56 | E1136 | E1196 | E1256 | E1316 | E1376 | E1436 | E1496 | E1556 | E1616 | E1676 | E1736 | E1796 | E1856 | E1916 | E1976 | E2036 | E2096 | E2156 |
| P57 | E1137 | E1197 | E1257 | E1317 | E1377 | E1437 | E1497 | E1557 | E1617 | E1677 | E1737 | E1797 | E1857 | E1917 | E1977 | E2037 | E2097 | E2157 |
| P58 | E1138 | E1198 | E1258 | E1318 | E1378 | E1438 | E1498 | E1558 | E1618 | E1678 | E1738 | E1798 | E1858 | E1918 | E1978 | E2038 | E2098 | E2158 |
| P59 | E1139 | E1199 | E1259 | E1319 | E1379 | E1439 | E1499 | E1559 | E1619 | E1679 | E1739 | E1799 | E1859 | E1919 | E1979 | E2039 | E2099 | E2159 |
| P60 | E1140 | E1200 | E1260 | E1320 | E1380 | E1440 | E1500 | E1560 | E1620 | E1680 | E1740 | E1800 | E1860 | E1920 | E1980 | E2040 | E2100 | E2160 |

First position / Second position combinations

*Fig. 18 continued*

| fractional distance of movement of number of screens | Area of opening / frequency of alternating movement combinations | | | | | | | | | | | |
|---|---|---|---|---|---|---|---|---|---|---|---|---|
| | AF1 | AF2 | AF3 | AF4 | AF5 | AF6 | AF7 | AF8 | AF9 | AF10 | AF11 | AF12 |
| 0.01-9.0 | E2161 | E2178 | E2195 | E2212 | E2229 | E2246 | E2263 | E2280 | E2297 | E2314 | E2331 | E2348 |
| 0.1-9.0 | E2162 | E2179 | E2196 | E2213 | E2230 | E2247 | E2264 | E2281 | E2298 | E2315 | E2332 | E2349 |
| 0.1-8.5 | E2163 | E2180 | E2197 | E2214 | E2231 | E2248 | E2265 | E2282 | E2299 | E2316 | E2333 | E2350 |
| 0.1-8.0 | E2164 | E2181 | E2198 | E2215 | E2232 | E2249 | E2266 | E2283 | E2300 | E2317 | E2334 | E2351 |
| 0.1-7.0 | E2165 | E2182 | E2199 | E2216 | E2233 | E2250 | E2267 | E2284 | E2301 | E2318 | E2335 | E2352 |
| 0.1-6.0 | E2166 | E2183 | E2200 | E2217 | E2234 | E2251 | E2268 | E2285 | E2302 | E2319 | E2336 | E2353 |
| 0.1-5.0 | E2167 | E2184 | E2201 | E2218 | E2235 | E2252 | E2269 | E2286 | E2303 | E2320 | E2337 | E2354 |
| 0.1-4.0 | E2168 | E2185 | E2202 | E2219 | E2236 | E2253 | E2270 | E2287 | E2304 | E2321 | E2338 | E2355 |
| 0.1-3.0 | E2169 | E2186 | E2203 | E2220 | E2237 | E2254 | E2271 | E2288 | E2305 | E2322 | E2339 | E2356 |
| 0.1-2.0 | E2170 | E2187 | E2204 | E2221 | E2238 | E2255 | E2272 | E2289 | E2306 | E2323 | E2340 | E2357 |
| 0.1-1.0 | E2171 | E2188 | E2205 | E2222 | E2239 | E2256 | E2273 | E2290 | E2307 | E2324 | E2341 | E2358 |
| 0.1-0.9 | E2172 | E2189 | E2206 | E2223 | E2240 | E2257 | E2274 | E2291 | E2308 | E2325 | E2342 | E2359 |
| 0.1-0.8 | E2173 | E2190 | E2207 | E2224 | E2241 | E2258 | E2275 | E2292 | E2309 | E2326 | E2343 | E2360 |
| 0.1-0.7 | E2174 | E2191 | E2208 | E2225 | E2242 | E2259 | E2276 | E2293 | E2310 | E2327 | E2344 | E2361 |
| 0.1-0.6 | E2175 | E2192 | E2209 | E2226 | E2243 | E2260 | E2277 | E2294 | E2311 | E2328 | E2345 | E2362 |
| 0.1-0.5 | E2176 | E2193 | E2210 | E2227 | E2244 | E2261 | E2278 | E2295 | E2312 | E2329 | E2346 | E2363 |
| 0.1-0.4 | E2177 | E2194 | E2211 | E2228 | E2245 | E2262 | E2279 | E2296 | E2313 | E2330 | E2347 | E2364 |

*Fig. 19*

| | Area of opening / frequency of alternating movement combinations | | | | | | | | | | | |
|---|---|---|---|---|---|---|---|---|---|---|---|---|
| | AF13 | AF14 | AF15 | AF16 | AF17 | AF18 | AF19 | AF20 | AF21 | AF22 | AF23 | AF24 |
| 0.01-9.0 | E2365 | E2382 | E2399 | E2416 | E2433 | E2450 | E2467 | E2484 | E2501 | E2518 | E2535 | E2552 |
| 0.1-9.0 | E2366 | E2383 | E2400 | E2417 | E2434 | E2451 | E2468 | E2485 | E2502 | E2519 | E2536 | E2553 |
| 0.1-8.5 | E2367 | E2384 | E2401 | E2418 | E2435 | E2452 | E2469 | E2486 | E2503 | E2520 | E2537 | E2554 |
| 0.1-8.0 | E2368 | E2385 | E2402 | E2419 | E2436 | E2453 | E2470 | E2487 | E2504 | E2521 | E2538 | E2555 |
| 0.1-7.0 | E2369 | E2386 | E2403 | E2420 | E2437 | E2454 | E2471 | E2488 | E2505 | E2522 | E2539 | E2556 |
| 0.1-6.0 | E2370 | E2387 | E2404 | E2421 | E2438 | E2455 | E2472 | E2489 | E2506 | E2523 | E2540 | E2557 |
| 0.1-5.0 | E2371 | E2388 | E2405 | E2422 | E2439 | E2456 | E2473 | E2490 | E2507 | E2524 | E2541 | E2558 |
| 0.1-4.0 | E2372 | E2389 | E2406 | E2423 | E2440 | E2457 | E2474 | E2491 | E2508 | E2525 | E2542 | E2559 |
| 0.1-3.0 | E2373 | E2390 | E2407 | E2424 | E2441 | E2458 | E2475 | E2492 | E2509 | E2526 | E2543 | E2560 |
| 0.1-2.0 | E2374 | E2391 | E2408 | E2425 | E2442 | E2459 | E2476 | E2493 | E2510 | E2527 | E2544 | E2561 |
| 0.1-1.0 | E2375 | E2392 | E2409 | E2426 | E2443 | E2460 | E2477 | E2494 | E2511 | E2528 | E2545 | E2562 |
| 0.1-0.9 | E2376 | E2393 | E2410 | E2427 | E2444 | E2461 | E2478 | E2495 | E2512 | E2529 | E2546 | E2563 |
| 0.1-0.8 | E2377 | E2394 | E2411 | E2428 | E2445 | E2462 | E2479 | E2496 | E2513 | E2530 | E2547 | E2564 |
| 0.1-0.7 | E2378 | E2395 | E2412 | E2429 | E2446 | E2463 | E2480 | E2497 | E2514 | E2531 | E2548 | E2565 |
| 0.1-0.6 | E2379 | E2396 | E2413 | E2430 | E2447 | E2464 | E2481 | E2498 | E2515 | E2532 | E2549 | E2566 |
| 0.1-0.5 | E2380 | E2397 | E2414 | E2431 | E2448 | E2465 | E2482 | E2499 | E2516 | E2533 | E2550 | E2567 |
| 0.1-0.4 | E2381 | E2398 | E2415 | E2432 | E2449 | E2466 | E2483 | E2500 | E2517 | E2534 | E2551 | E2568 | fractional distance of movement of number of screens

*Fig. 19 continued*

| Area of opening / frequency of alternating movement combinations | | | | | | | | | | | | |
|---|---|---|---|---|---|---|---|---|---|---|---|---|
| | AF25 | AF26 | AF27 | AF28 | AF29 | AF30 | AF31 | AF32 | AF33 | AF34 | AF35 | AF36 |
| 0.01-9.0 | E2569 | E2586 | E2603 | E2620 | E2637 | E2654 | E2671 | E2688 | E2705 | E2722 | E2739 | E2756 |
| 0.1-9.0 | E2570 | E2587 | E2604 | E2621 | E2638 | E2655 | E2672 | E2689 | E2706 | E2723 | E2740 | E2757 |
| 0.1-8.5 | E2571 | E2588 | E2605 | E2622 | E2639 | E2656 | E2673 | E2690 | E2707 | E2724 | E2741 | E2758 |
| 0.1-8.0 | E2572 | E2589 | E2606 | E2623 | E2640 | E2657 | E2674 | E2691 | E2708 | E2725 | E2742 | E2759 |
| 0.1-7.0 | E2573 | E2590 | E2607 | E2624 | E2641 | E2658 | E2675 | E2692 | E2709 | E2726 | E2743 | E2760 |
| 0.1-6.0 | E2574 | E2591 | E2608 | E2625 | E2642 | E2659 | E2676 | E2693 | E2710 | E2727 | E2744 | E2761 |
| 0.1-5.0 | E2575 | E2592 | E2609 | E2626 | E2643 | E2660 | E2677 | E2694 | E2711 | E2728 | E2745 | E2762 |
| 0.1-4.0 | E2576 | E2593 | E2610 | E2627 | E2644 | E2661 | E2678 | E2695 | E2712 | E2729 | E2746 | E2763 |
| 0.1-3.0 | E2577 | E2594 | E2611 | E2628 | E2645 | E2662 | E2679 | E2696 | E2713 | E2730 | E2747 | E2764 |
| 0.1-2.0 | E2578 | E2595 | E2612 | E2629 | E2646 | E2663 | E2680 | E2697 | E2714 | E2731 | E2748 | E2765 |
| 0.1-1.0 | E2579 | E2596 | E2613 | E2630 | E2647 | E2664 | E2681 | E2698 | E2715 | E2732 | E2749 | E2766 |
| 0.1-0.9 | E2580 | E2597 | E2614 | E2631 | E2648 | E2665 | E2682 | E2699 | E2716 | E2733 | E2750 | E2767 |
| 0.1-0.8 | E2581 | E2598 | E2615 | E2632 | E2649 | E2666 | E2683 | E2700 | E2717 | E2734 | E2751 | E2768 |
| 0.1-0.7 | E2582 | E2599 | E2616 | E2633 | E2650 | E2667 | E2684 | E2701 | E2718 | E2735 | E2752 | E2769 |
| 0.1-0.6 | E2583 | E2600 | E2617 | E2634 | E2651 | E2668 | E2685 | E2702 | E2719 | E2736 | E2753 | E2770 |
| 0.1-0.5 | E2584 | E2601 | E2618 | E2635 | E2652 | E2669 | E2686 | E2703 | E2720 | E2737 | E2754 | E2771 |
| 0.1-0.4 | E2585 | E2602 | E2619 | E2636 | E2653 | E2670 | E2687 | E2704 | E2721 | E2738 | E2755 | E2772 | fractional distance of movement of number of screens

*Fig. 19 continued*

| | | R1 | R2 | R3 | R4 | R5 | R1+R2 | R1+R3 | R1+R4 | R1+R5 | R2+R3 | R2+R4 | R2+R5 |
|---|---|---|---|---|---|---|---|---|---|---|---|---|---|
| Features Reservoir | R1 Comprising cicular circumference | | X | | | | | | | | | | |
| | R2 comprising bent surfaces and/or obtuse angles | | | X | X | X | X | X | X | X | | | |
| | R3 second end is positioned opposite the first end | | | | X | X | X | X | X | X | | | |
| | R4 openings are provided in a section of the reservoir that in the use position is a lower part | | | X | | X | X | X | X | X | | | |
| | R5 openings have an elongated shape | | | | | | X | X | X | X | X | X | X |
| | R1+R5 | | X | X | X | | X | | | X | X | X | X |
| Features closing means | C1 number of closing means corresponds to number of openings | | | | | | X | | | X | | X | X |
| | C2 closing means can provide different levels of closing of the openings, such as a full closing of an opening and a partial closing of an opening | | | | | | | X | | | X | X | X |
| | C1+C2 | | | | | | | | | | | | |

*Fig. 20*

| | | R1+R2+R3 | R1+R2 | R1+R2+R5 | C1 | C2 | C1+C2 | S1 | S2 | S3 | S4 | S5 | S6 |
|---|---|---|---|---|---|---|---|---|---|---|---|---|---|
| Features Reservoir | R1 | Comprising cicular circumference | X | X | X | X | X | X | X | X | X | X | X |
| | R2 | comprising bent surfaces and/or obtuse angles | X | X | X | X | X | X | X | X | X | X | X |
| | R3 | second end is positioned opposite the first end | X | X | X | X | X | X | X | X | X | X | X |
| | R4 | openings are provided in a section of the reservoir that in the use position is a lower part | X | X | X | X | X | X | X | X | X | X | X |
| | R5 | openings have an elongated shape | X | X | X | X | | X | X | X | X | X | X |
| | | R1+R5 | X | X | X | X | | X | X | X | X | X | X |
| Features closing means | C1 | number of closing means corresponds to number of openings | X | X | X | X | X | X | X | X | X | X | X |
| | C2 | closing means can provide different levels of closing of the openings, such as a full closing of an opening and a partial closing of an opening | X | X | X | | X | X | | X | X | X | X | X |
| | | C1+C2 | | | | | | | X | X | X | X | X | X |

*Fig. 20 continued*

| | | S1+S2 | S1+S3 | S1+S4 | S1+S5 | S1+S6 | S2+S3 | S2+S4 | S2+S5 | S2+S6 | S3+S5 | S1+S2+S3 | S1+S2+S4 |
|---|---|---|---|---|---|---|---|---|---|---|---|---|---|
| Features Reservoir | R1 | Comprising cicular circumference | X | X | X | X | X | X | X | X | X | X | X | X |
| | R2 | comprising bent surfaces and/or obtuse angles | X | X | X | X | X | X | X | X | X | X | X | X |
| | R3 | second end is positioned opposite the first end | X | X | X | X | X | X | X | X | X | X | X | X |
| | R4 | openings are provided in a section of the reservoir that in the use position is a lower part | X | X | X | X | X | X | X | X | X | X | X | X |
| | R5 | openings have an elongated shape | X | X | X | X | X | X | X | X | X | X | X | X |
| | R1+R5 | | X | X | X | X | X | X | X | X | X | X | X | X |
| Features closing means | C1 | number of closing means corresponds to number of openings | X | X | X | X | X | X | X | X | X | X | X | X |
| | C2 | closing means can provide different levels of closing of the openings, such as a full closing of an opening and a partial closing of an opening | X | X | X | X | X | X | X | X | X | X | X | X |
| | C1+C2 | | X | X | X | X | X | X | X | X | X | X | X | X |

*Fig. 20 continued*

| | | S3+S4+S5 | S3+S5+S6 | M1 | M2 | M3 | M1+M2 | M1+M3 | M2+M3 | M1+M2+ | D1 | D2 | D3 | D4 |
|---|---|---|---|---|---|---|---|---|---|---|---|---|---|---|
| Features Reservoir | R1 | Comprising cicular circumference | X | X | X | X | X | X | X | X | X | X | X | X | X |
| | R2 | comprising bent surfaces and/or obtuse angles | X | X | X | X | X | X | X | X | X | X | X | X | X |
| | R3 | second end is positioned opposite the first end | X | X | X | X | X | X | X | X | X | X | X | X | X |
| | R4 | openings are provided in a section of the reservoir that in the use position is a lower part | X | X | X | X | X | X | X | X | X | X | X | X | X |
| | R5 | openings have an elongated shape | X | X | X | X | X | X | X | X | X | X | X | X | X |
| | R1+R5 | | X | X | X | X | X | X | X | X | X | X | X | X | X |
| Features closing means | C1 | number of closing means corresponds to number of openings | X | X | X | X | X | X | X | X | X | X | X | X | X |
| | C2 | closing means can provide different levels of closing of the openings, such as a full closing of an opening and a partial closing of an opening | X | X | X | X | X | X | X | X | X | X | X | X | X |
| | C1+C2 | | X | X | X | X | X | X | X | X | X | X | X | X | X |

*Fig. 20 continued*

| Features screens | | R1 | R2 | R3 | R4 | R5 | R1+R2 | R1+R3 | R1+R4 | R1+R5 | R2+R3 | R2+R4 | R2+R5 |
|---|---|---|---|---|---|---|---|---|---|---|---|---|---|
| | S1 | shape of the number of screens is two-dimensional | | | | | | | | | | | | |
| | S2 | The number of screens (in use position) is positioned essentially vertically | | | | | | | | | | | | |
| | S3 | screens have a size and form that renders them suitable to function as closing means | | | | | | | | | | | | |
| | S4 | screens protrude towards the circumferential wall, from a surface stretching from the upper surface of the first base away from the first base | | | | | | | | | | | | |
| | S5 | the number of screens comprises an even number of at least four screens, wherein alternating screens have different sizes and/or shapes, in particular have different surface areas | | | | | | | | | | | | |
| | S6 | number of screens is positioned essentially perpendicular to the direction of movement, preferably in two directions | | | | | | | | | | | | |
| | S2+S3 | | X | X | X | X | X | X | X | X | X | X | X | X |
| | S2+S3+S6 | | X | X | X | X | X | X | X | X | X | X | X | X |

*Fig. 20 continued*

| | | R1+R2+R3 | R1+R2 | R1+R2+R5 | C1 | C2 | C1+C2 | S1 | S2 | S3 | S4 | S5 | S6 |
|---|---|---|---|---|---|---|---|---|---|---|---|---|---|
| Features screens | S1 | shape of the number of screens is two-dimensional | | | | | | | | X | | | X |
| | S2 | The number of screens (in use position) is positioned essentially vertically | | | | | | | | | X | | X | X |
| | S3 | screens have a size and form that renders them suitable to function as closing means | | | | | | | | | | X | | X |
| | S4 | screens protrude towards the circumferential wall, from a surface stretching from the upper surface of the first base away from the first base | | | | | | | | | | | X | X |
| | S5 | the number of screens comprises an even number of at least four screens, wherein alternating screens have different sizes and/or shapes, in particular have different surface areas | | | | | | | | | | | | X |
| | S6 | number of screens is positioned essentially perpendicular to the direction of movement, preferably in two directions | | | | | | | | | | | | |
| | S2+S3 | | X | X | X | X | X | X | X | X | X | X | X | X |
| | S2+S3+S6 | | X | X | X | X | X | X | X | X | X | X | X | X |

*Fig. 20 continued*

| | | S1+S2 | S1+S3 | S1+S4 | S1+S5 | S1+S6 | S2+S3 | S2+S4 | S2+S5 | S2+S6 | S3+S5 | S1+S2+S3 | S1+S2+S4 |
|---|---|---|---|---|---|---|---|---|---|---|---|---|---|
| Features screens | S1 | shape of the number of screens is two-dimensional | X | X | X | X | X | X | X | X | X | X | X | X |
| | S2 | The number of screens (in use position) is positioned essentially vertically | X | X | X | X | X | X | X | X | X | X | X | X |
| | S3 | screens have a size and form that renders them suitable to function as closing means | X | X | X | X | X | X | X | X | X | X | X | X |
| | S4 | screens protrude towards the circumferential wall, from a surface stretching from the upper surface of the first base away from the first base | X | X | X | X | X | X | X | X | X | X | X | X |
| | S5 | the number of screens comprises an even number of at least four screens, wherein alternating screens have different sizes and/or shapes, in particular have different surface areas | X | X | X | X | X | X | X | X | X | X | X | X |
| | S6 | number of screens is positioned essentially perpendicular to the direction of movement, preferably in two directions | X | X | X | X | X | X | X | X | X | X | X | X |
| | S2+S3 | | X | X | X | X | X | X | | X | X | X | X | X |
| | S2+S3+S6 | | X | X | X | X | X | X | X | X | X | X | X | X |

*Fig. 20 continued*

| | | S3+S4+S5 | S3+S5+S6 | M1 | M2 | M3 | M1+M2 | M1+M3 | M2+M3 | M1+M2+ | D1 | D2 | D3 | D4 |
|---|---|---|---|---|---|---|---|---|---|---|---|---|---|---|
| Features screens | S1 shape of the number of screens is two-dimensional | X | | | | | | | | | | X | X | X |
| | S2 The number of screens (in use position) is positioned essentially vertically | X | X | X | X | X | X | X | X | X | X | X | X | X |
| | S3 screens have a size and form that renders them suitable to function as closing means | X | X | X | X | X | X | X | X | X | X | X | X | X |
| | S4 screens protrude towards the circumferential wall, from a surface stretching from the upper surface of the first base away from the first base | X | X | X | X | X | X | X | X | X | X | X | X | X |
| | S5 the number of screens comprises an even number of at least four screens, wherein alternating screens have different sizes and/or shapes, in particular have different surface areas | X | X | X | X | X | X | X | X | X | X | X | X | X |
| | S6 number of screens is positioned essentially perpendicular to the direction of movement, preferably in two directions | X | X | X | X | X | X | X | X | X | X | X | X | X |
| | S2+S3 | X | X | X | X | X | X | X | X | X | X | X | X | X |
| | S2+S3+S6 | X | X | X | X | X | X | X | X | X | X | X | X | X |

*Fig. 20 continued*

| | | R1 | R2 | R3 | R4 | R5 | R1+R2 | R1+R3 | R1+R4 | R1+R5 | R2+R3 | R2+R4 | R2+R5 |
|---|---|---|---|---|---|---|---|---|---|---|---|---|---|
| Features / movement | M1 | Movement is sliding movement | | | | | | | | | | | | |
| | M2 | Movement is circular movement | | | | | | | | | | | | |
| | M3 | movement is essentially horizontal (in use position) | | | | | | | | | | | | |
| | | M1+M2 | X | X | X | X | X | X | X | X | X | X | X | X |
| | | M1+M3 | X | X | X | X | X | X | X | X | X | X | X | X |
| | | M1+M2+M3 | X | X | X | X | X | X | X | X | X | X | X | X |
| Device combinations | D1 | reservoir on a first body and the screens on a separate second body and said second body is arranged at least partially within the circumferential wall of the first body | X | | | | X | X | X | X | X | X | X | X |
| | D2 | Closing means and screens on a single body | X | X | X | X | X | X | X | X | X | X | X | X |
| | D3 | reservoir, closing means and screens on 3 sperate bodies | X | X | X | X | X | X | X | X | X | X | X | X |
| | D4 | reservoir and number of screens are on a single body and the closing means preferably are on a separate body | X | X | X | X | X | X | X | X | X | X | X | X |

*Fig. 20 continued*

| | | | R1+R2+R3 | R1+R2 | R1+R2+R5 | C1 | C2 | C1+C2 | S1 | S2 | S3 | S4 | S5 | S6 |
|---|---|---|---|---|---|---|---|---|---|---|---|---|---|---|
| Features / movement | M1 | Movement is sliding movement | | | | | | | | | | | | |
| | M2 | Movement is circular movement | | | | | | | | | | | | |
| | M3 | movement is essentially horizontal (in use position) | | | | | | | | | | | | |
| | M1+M2 | | | X | X | X | X | X | X | X | X | X | X | X |
| | M1+M3 | | | X | X | X | X | X | X | X | X | X | X | X |
| | M1+M2+M3 | | | X | X | X | X | X | X | X | X | X | X | X |
| Device combinations | D1 | reservoir on a first body and the screens on a separate second body and said second body is arranged at least partially within the circumferential wall of the first body | X | | X | X | X | X | X | X | X | X | X | X |
| | D2 | Closing means and screens on a single body | | | X | X | X | X | X | X | X | X | X | X |
| | D3 | reservoir, closing means and screens on 3 seperate bodies | X | | X | X | X | X | X | X | X | X | X | X |
| | D4 | reservoir and number of screens are on a single body and the closing means preferably are on a separate body | X | | X | X | X | X | X | X | X | X | X | X |

*Fig. 20 continued*

| | | S1+S2 | S1+S3 | S1+S4 | S1+S5 | S1+S6 | S2+S3 | S2+S4 | S2+S5 | S2+S6 | S3+S5 | S1+S2 +S3 | S1+S2 +S4 |
|---|---|---|---|---|---|---|---|---|---|---|---|---|---|
| Features movement | M1 Movement is sliding movement | X | X | X | X | X | X | X | X | X | X | X | X |
| | M2 Movement is circular movement | | X | X | X | X | X | X | X | X | X | X | X |
| | M3 movement is essentially horizontal (in use position) | X | X | X | X | X | X | X | X | X | X | X | X |
| | M1+M2 | | X | X | X | X | X | X | X | X | X | X | X |
| | M1+M3 | X | X | X | X | X | X | X | X | X | X | X | X |
| | M1+M2+M3 | X | X | X | X | X | X | X | X | X | X | X | X |
| Device combinations | D1 reservoir on a first body and the screens on a separate second body and said second body is arranged at least partially within the circumferential wall of the first body | X | | | | X | X | X | X | X | X | X | X |
| | D2 Closing means and screens on a single body | X | X | X | X | X | X | X | X | X | X | X | X |
| | D3 reservoir, closing means and screens on 3 sperate bodies | X | X | | | X | X | X | X | X | X | X | X |
| | D4 reservoir and number of screens are on a single body and the closing means preferably are on a separate body | X | X | | | X | X | X | X | X | X | X | X |

*Fig. 20 continued*

|  |  | S3+S4 +S5 | S3+S5 +S6 | M1 | M2 | M3 | M1 +M2 | M1+ M3 | M2 +M3 | M1+ M2+ | D1 | D2 | D3 | D4 |
|---|---|---|---|---|---|---|---|---|---|---|---|---|---|---|
| Features / movement | M1 | Movement is sliding movement | X | X | X |  |  | X | X |  | X | X | X | X | X |
|  | M2 | Movement is circular movement | X | X |  | X |  | X |  | X | X | X | X | X | X |
|  | M3 | movement is essentially horizontal (in use position) | X | X |  |  | X |  | X | X | X | X | X | X | X |
|  |  | M1+M2 | X | X | X | X |  | X |  |  | X | X | X | X | X |
|  |  | M1+M3 | X | X | X |  | X |  | X |  | X | X | X | X | X |
|  |  | M1+M2+M3 | X | X | X | X | X | X | X | X | X | X | X | X | X |
| Device combinations | D1 | reservoir on a first body and the screens on a separate second body and said second body is arranged at least partially within the circumferential wall of the first body | X | X | X | X | X | X | X | X | X | X |  |  |  |
|  | D2 | Closing means and screens on a single body | X | X | X | X | X | X | X | X | X |  |  |  |  |
|  | D3 | reservoir, closing means and screens on 3 seperate bodies | X | X | X | X | X | X | X | X | X |  |  |  |  |
|  | D4 | reservoir and number of screens are on a single body and the closing means preferably are on a separate body | X | X | X | X | X | X | X | X | X |  |  |  |  |

*Fig. 20 continued*

| | | R1 | R2 | R3 | R4 | R5 | R1+R2 | R1+R3 | R1+R4 | R1+R5 | R2+R3 | R2+R4 | R2+R5 |
|---|---|---|---|---|---|---|---|---|---|---|---|---|---|
| Features Reservoir | R1 | Comprising cicular circumference | Y | | | | | Y | Y | Y | Y | Y | Y | Y |
| | R2 | comprising bent surfaces and/or obtuse angles | | | Y | | Y | Y | Y | Y | Y | Y | Y | Y |
| | R3 | second end is positioned opposite the first end | | | | | Y | Y | Y | Y | Y | Y | Y | Y |
| | R4 | openings are provided in a section of the reservoir that in the use position is a lower part | | | Y | | Y | Y | Y | Y | Y | Y | Y | Y |
| | R5 | openings have an elongated shape R1+R5 | | | | Y | | | Y | Y | Y | Y | Y | Y |
| Features closing means | C1 | number of closing means corresponds to number of openings | | Y | | Y | | | Y | Y | Y | Y | Y | Y |
| | C2 | closing means can provide different levels of closing of the openings, such as a full closing of an opening and a partial closing of an opening C1+C2 | | | | | | Y | Y | Y | Y | Y | Y | Y |

*Fig. 21*

| | | R1+R2+R3 | R1+R2 | R1+R2+R5 | C1 | C2 | C1+C2 | S1 | S2 | S3 | S4 | S5 | S6 |
|---|---|---|---|---|---|---|---|---|---|---|---|---|---|
| Features Reservoir | R1 | Comprising cicular circumference | Y | Y | Y | Y | Y | Y | | Y | Y | Y | Y | Y |
| | R2 | comprising bent surfaces and/or obtuse angles | Y | Y | Y | Y | Y | Y | | Y | Y | Y | Y | Y |
| | R3 | second end is positioned opposite the first end | Y | Y | Y | Y | Y | Y | | Y | Y | Y | Y | Y |
| | R4 | openings are provided in a section of the reservoir that in the use position is a lower part | Y | Y | Y | Y | Y | Y | | Y | Y | Y | Y | Y |
| | R5 | openings have an elongated shape | Y | Y | Y | Y | Y | Y | | Y | Y | Y | Y | Y |
| | | R1+R5 | Y | Y | Y | Y | Y | Y | | Y | Y | Y | Y | Y |
| Features closing means | C1 | number of closing means corresponds to number of openings | Y | Y | Y | | | Y | Y | Y | Y | Y | Y | Y |
| | C2 | closing means can provide different levels of closing of the openings, such as a full closing of an opening and a partial closing of an opening | Y | | Y | | | Y | Y | Y | Y | Y | Y | Y |
| | | C1+C2 | | | | | | | Y | Y | Y | Y | Y | Y |

*Fig. 21 continued*

| | | S1+S2 | S1+S3 | S1+S4 | S1+S5 | S1+S6 | S2+S3 | S2+S4 | S2+S5 | S2+S6 | S3+S5 | S1+S2+S3 | S1+S2+S4 |
|---|---|---|---|---|---|---|---|---|---|---|---|---|---|
| Features Reservoir | R1 | Comprising cicular circumference | Y | Y | Y | Y | Y | Y | Y | Y | Y | Y | Y | Y |
| | R2 | comprising bent surfaces and/or obtuse angles | Y | Y | Y | Y | Y | Y | Y | Y | Y | Y | Y | Y |
| | R3 | second end is positioned opposite the first end | Y | Y | Y | Y | Y | Y | Y | Y | Y | Y | Y | Y |
| | R4 | openings are provided in a section of the reservoir that in the use position is a lower part | Y | Y | Y | Y | Y | Y | Y | Y | Y | Y | Y | Y |
| | R5 | openings have an elongated shape | Y | Y | Y | Y | Y | Y | Y | Y | Y | Y | Y | Y |
| | R1+R5 | | Y | Y | Y | Y | Y | Y | Y | Y | Y | Y | Y | Y |
| Features closing means | C1 | number of closing means corresponds to number of openings | Y | Y | Y | Y | Y | Y | Y | Y | Y | Y | Y | Y |
| | C2 | closing means can provide different levels of closing of the openings, such as a full closing of an opening and a partial closing of an opening | | | | | | | | | | | Y | |
| | C1+C2 | | Y | Y | Y | Y | Y | Y | Y | Y | Y | Y | Y | Y |

*Fig. 21 continued*

| | | S3+S4+S5 | S3+S5+S6 | M1 | M2 | M3 | M1+M2 | M1+M3 | M2+M3 | M1+M2+ | D1 | D2 | D3 | D4 |
|---|---|---|---|---|---|---|---|---|---|---|---|---|---|---|
| Features Reservoir | R1 | Comprising cicular circumference | | | | | | | | | | | | |
| | | Y | Y | Y | Y | Y | Y | Y | Y | Y | Y | Y | Y | Y |
| | R2 | comprising bent surfaces and/or obtuse angles | | | | | | | | | | | | |
| | | Y | Y | Y | Y | Y | Y | Y | Y | Y | Y | Y | Y | Y |
| | R3 | second end is positioned opposite the first end | | | | | | | | | | | | |
| | | Y | Y | Y | Y | Y | Y | Y | Y | Y | Y | Y | Y | Y |
| | R4 | openings are provided in a section of the reservoir that in the use position is a lower part | | | | | | | | | | | | |
| | | Y | Y | Y | Y | Y | Y | Y | Y | Y | Y | Y | Y | Y |
| | R5 | openings have an elongated shape | | | | | | | | | | | | |
| | | Y | Y | Y | Y | Y | Y | Y | Y | Y | Y | Y | Y | Y |
| | R1+R5 | | | | | | | | | | | | | |
| | | Y | Y | Y | Y | Y | Y | Y | Y | Y | Y | Y | Y | Y |
| Features closing means | C1 | number of closing means corresponds to number of openings | | | | | | | | | | | | |
| | | Y | Y | Y | Y | Y | Y | Y | Y | Y | Y | Y | Y | Y |
| | C2 | closing means can provide different levels of closing of the openings, such as a full closing of an opening and a partial closing of an opening | | | | | | | | | | | | |
| | | Y | Y | Y | Y | Y | Y | Y | Y | Y | Y | Y | Y | Y |
| | C1+C2 | | | | | | | | | | | | | |
| | | Y | Y | Y | Y | Y | Y | Y | Y | Y | Y | Y | Y | Y |

| | | R1 | R2 | R3 | R4 | R5 | R1+R2 | R1+R3 | R1+R4 | R1+R5 | R2+R3 | R2+R4 | R2+R5 |
|---|---|---|---|---|---|---|---|---|---|---|---|---|---|
| Features screens | S1 | shape of the number of screens is two-dimensional | | | | | | | | | | | |
| | S2 | The number of screens (in use position) is positioned essentially vertically | | | | | | | | | | | |
| | S3 | screens have a size and form that renders them suitable to function as closing means | | | | | | | | | | | |
| | S4 | screens protrude towards the circumferential wall, from a surface stretching from the upper surface of the first base away from the first base | | | | | | | | | | | |
| | S5 | the number of screens comprises an even number of at least four screens, wherein alternating screens have different sizes and/or shapes, in particular have different surface areas | | | | | | | | | | | |
| | S6 | number of screens is positioned essentially perpendicular to the direction of movement, preferably in two directions | | | | | | | | | | | |
| | S2+S3 | Y | Y | Y | Y | Y | Y | Y | Y | Y | Y | Y | Y |
| | S2+S3+S6 | Y | Y | Y | Y | Y | Y | Y | Y | Y | Y | Y | Y |

|  |  | R1+R2+R3 | R1+R2 | R1+R2+R5 | C1 | C2 | C1+C2 | S1 | S2 | S3 | S4 | S5 | S6 |
|---|---|---|---|---|---|---|---|---|---|---|---|---|---|
| Features screens | S1 | shape of the number of screens is two-dimensional |  |  |  |  |  |  |  | Y |  |  | Y | Y |
|  | S2 | The number of screens (in use position) is positioned essentially vertically |  |  |  |  |  |  |  |  | Y | Y |  | Y |
|  | S3 | screens have a size and form that renders them suitable to function as closing means |  |  |  |  |  |  |  |  |  | Y |  | Y |
|  | S4 | screens protrude towards the circumferential wall, from a surface stretching from the upper surface of the first base away from the first base |  |  |  |  |  |  |  |  |  |  | Y |  |
|  | S5 | the number of screens comprises an even number of at least four screens, wherein alternating screens have different sizes and/or shapes, in particular have different surface areas |  |  |  |  |  |  |  |  |  |  |  | Y |
|  | S6 | number of screens is positioned essentially perpendicular to the direction of movement, preferably in two directions |  |  |  |  |  |  |  |  |  |  | Y | Y |
|  | S2+S3 | | Y | Y | Y | Y | Y | Y | Y | Y | Y | Y | Y | Y |
|  | S2+S3+S6 | | Y | Y | Y | Y | Y | Y | Y | Y | Y | Y | Y | Y |

*Fig. 21 continued*

| Features screens | | S1+S2 | S1+S3 | S1+S4 | S1+S5 | S1+S6 | S2+S3 | S2+S4 | S2+S5 | S2+S6 | S3+S5 | S1+S2+S3 | S1+S2+S4 |
|---|---|---|---|---|---|---|---|---|---|---|---|---|---|
| | S1 | shape of the number of screens is two-dimensional | Y | Y | Y | Y | Y | Y | Y | Y | Y | Y | Y | Y |
| | S2 | The number of screens (in use position) is positioned essentially vertically | Y | Y | Y | Y | Y | Y | Y | Y | Y | Y | Y | Y |
| | S3 | screens have a size and form that renders them suitable to function as closing means | Y | Y | Y | Y | Y | Y | Y | Y | Y | Y | Y | Y |
| | S4 | screens protrude towards the circumferential wall, from a surface stretching from the upper surface of the first base away from the first base | Y | Y | Y | Y | Y | Y | Y | Y | Y | Y | Y | Y |
| | S5 | the number of screens comprises an even number of at least four screens, wherein alternating screens have different sizes and/or shapes, in particular have different surface areas | Y | Y | Y | Y | Y | Y | Y | Y | Y | Y | Y | Y |
| | S6 | number of screens is positioned essentially perpendicular to the direction of movement, preferably in two directions | Y | Y | Y | Y | Y | Y | Y | Y | Y | Y | Y | Y |
| | S2+S3 | | Y | Y | Y | Y | Y | Y | Y | Y | Y | Y | Y | Y |
| | S2+S3+S6 | | Y | Y | Y | Y | Y | Y | Y | Y | Y | Y | Y | Y |

*Fig. 21 continued*

| | | S3+S4+S5 | S3+S5+S6 | M1 | M2 | M3 | M1+M2 | M1+M3 | M2+M3 | M1+M2+ | D1 | D2 | D3 | D4 |
|---|---|---|---|---|---|---|---|---|---|---|---|---|---|---|
| Features screens | S1 | shape of the number of screens is two-dimensional | Y | Y | Y | Y | Y | Y | Y | Y | Y | Y | Y | Y | Y |
| | S2 | The number of screens (in use position) is positioned essentially vertically | Y | Y | Y | Y | Y | Y | Y | Y | Y | Y | Y | Y | Y |
| | S3 | screens have a size and form that renders them suitable to function as closing means | Y | Y | Y | Y | Y | Y | Y | Y | Y | Y | Y | Y | Y |
| | S4 | screens protrude towards the circumferential wall, from a surface stretching from the upper surface of the first base away from the first base | Y | Y | Y | Y | Y | Y | Y | Y | Y | Y | Y | Y | Y |
| | S5 | the number of screens comprises an even number of at least four screens, wherein alternating screens have different sizes and/or shapes, in particular have different surface areas | Y | Y | Y | Y | Y | Y | Y | Y | Y | Y | Y | Y | Y |
| | S6 | number of screens is positioned essentially perpendicular to the direction of movement, preferably in two directions | Y | Y | Y | Y | Y | Y | Y | Y | Y | Y | Y | Y | Y |
| | S2+S3 | | Y | Y | Y | Y | Y | Y | Y | Y | Y | Y | Y | Y | Y |
| | S2+S3+S6 | | Y | Y | Y | Y | Y | Y | Y | Y | Y | Y | Y | Y | Y |

*Fig. 21 continued*

| | | | R1 | R2 | R3 | R4 | R5 | R1+R2 | R1+R3 | R1+R4 | R1+R5 | R2+R3 | R2+R4 | R2+R5 |
|---|---|---|---|---|---|---|---|---|---|---|---|---|---|---|
| Features | movement | M1 | Movement is sliding movement | | | | | | | | | | | |
| | | M2 | Movement is circular movement | | | | | | | | | | | |
| | | M3 | movement is essentially horizontal (in use position) | | | | | | | | | | | |
| | | | M1+M2 | Y | Y | Y | Y | Y | Y | Y | Y | Y | Y | Y | Y |
| | | | M1+M3 | Y | Y | Y | Y | Y | Y | Y | Y | Y | Y | Y | Y |
| | | | M1+M2+M3 | Y | Y | Y | Y | Y | Y | Y | Y | Y | Y | Y | Y |
| Device combinations | | D1 | reservoir on a first body and the screens on a separate second body and said second body is arranged at least partially within the circumferential wall of the first body | | | | | | Y | Y | Y | Y | Y | Y | Y |
| | | D2 | Closing means and screens on a single body | Y | | | | | Y | Y | Y | Y | Y | Y | Y |
| | | D3 | reservoir, closing means and screens on 3 sperate bodies | Y | | | | | Y | Y | Y | Y | Y | Y | Y |
| | | D4 | reservoir and number of screens are on a single body and the closing means preferably are on a separate body | Y | | | | | Y | Y | Y | Y | Y | Y | Y |

*Fig. 21 continued*

|  |  | R1+R2+R3 | R1+R2 | R1+R2+R5 | C1 | C2 | C1+C2 | S1 | S2 | S3 | S4 | S5 | S6 |
|---|---|---|---|---|---|---|---|---|---|---|---|---|---|
| Features / movement | M1 | Movement is sliding movement |  |  |  |  |  |  |  |  |  |  |  |  |
|  | M2 | Movement is circular movement |  |  |  |  |  |  |  |  |  |  |  |  |
|  | M3 | movement is essentially horizontal (in use position) |  |  |  |  |  |  |  |  |  |  |  |  |
|  |  | M1+M2 | Y | Y | Y | Y | Y | Y | Y | Y | Y | Y | Y |  |
|  |  | M1+M3 | Y | Y | Y | Y | Y | Y | Y | Y | Y | Y | Y |  |
|  |  | M1+M2+M3 | Y | Y | Y | Y | Y | Y | Y | Y | Y | Y | Y |  |
| Device combinations | D1 | reservoir on a first body and the screens on a separate second body and said second body is arranged at least partially within the circumferential wall of the first body | Y |  |  | Y | Y | Y | Y | Y | Y | Y | Y | Y |
|  | D2 | Closing means and screens on a single body | Y |  |  | Y | Y | Y | Y | Y | Y | Y | Y | Y |
|  | D3 | reservoir, closing means and screens on 3 seperate bodies | Y | Y |  | Y | Y | Y | Y | Y | Y | Y | Y | Y |
|  | D4 | reservoir and number of screens are on a single body and the closing means preferably are on a separate body | Y | Y |  | Y | Y | Y | Y | Y | Y | Y | Y | Y |

*Fig. 21 continued*

|  |  | S1+S2 | S1+S3 | S1+S4 | S1+S5 | S1+S6 | S2+S3 | S2+S4 | S2+S5 | S2+S6 | S3+S5 | S1+S2 +S3 | S1+S2 +S4 |
|---|---|---|---|---|---|---|---|---|---|---|---|---|---|
| Features movement | M1 | Movement is sliding movement | Y | Y | Y | Y | Y | Y | Y | Y | Y | Y | Y | Y |
| | M2 | Movement is circular movement | Y | Y | Y | Y | Y | Y | Y | Y | Y | Y | Y | Y |
| | M3 | movement is essentially horizontal (in use position) | Y | Y | Y | Y | Y | Y | Y | Y | Y | Y | Y | Y |
| | | M1+M2 | Y | Y | Y | | | Y | Y | Y | Y | Y | Y | Y |
| | | M1+M3 | Y | Y | Y | | | Y | Y | Y | Y | Y | Y | Y |
| | | M1+M2+M3 | Y | Y | Y | | | Y | Y | Y | Y | Y | Y | Y |
| Device combinations | D1 | reservoir on a first body and the screens on a separate second body and said second body is arranged at least partially within the circumferential wall of the first body | Y | | | | | Y | | | | Y | Y | Y |
| | D2 | Closing means and screens on a single body | Y | Y | | Y | Y | Y | Y | Y | Y | Y | Y | Y |
| | D3 | reservoir, closing means and screens on 3 seperate bodies | Y | Y | | | | Y | Y | Y | Y | Y | Y | Y |
| | D4 | reservoir and number of screens are on a single body and the closing means preferably are on a separate body | Y | Y | | | | Y | Y | Y | Y | Y | Y | Y |

*Fig. 21 continued*

|  |  | S3+S4+S5 | S3+S5+S6 | M1 | M2 | M3 | M1+M2 | M1+M3 | M2+M3 | M1+M2+ | D1 | D2 | D3 | D4 |
|---|---|---|---|---|---|---|---|---|---|---|---|---|---|---|
| Features / movement | M1 | Movement is sliding movement | Y | Y |  | Y | Y | Y | Y | Y | Y | Y | Y | Y | Y |
|  | M2 | Movement is circular movement | Y | Y | Y |  | Y | Y | Y | Y | Y | Y | Y | Y | Y |
|  | M3 | movement is essentially horizontal (in use position) | Y | Y | Y | Y |  | Y | Y | Y | Y | Y | Y | Y | Y |
|  |  | M1+M2 | Y | Y | Y | Y |  |  | Y | Y | Y | Y | Y | Y | Y |
|  |  | M1+M3 | Y | Y | Y |  | Y | Y |  | Y | Y | Y | Y | Y | Y |
|  |  | M1+M2+M3 | Y | Y | Y | Y | Y | Y | Y |  | Y | Y | Y | Y | Y |
| Device combinations | D1 | reservoir on a first body and the screens on a separate second body and said second body is arranged at least partially within the circumferential wall of the first body | Y | Y | Y | Y | Y | Y | Y | Y | Y |  | Y |  |  |  |
|  | D2 | Closing means and screens on a single body | Y | Y | Y | Y | Y | Y | Y | Y | Y | Y |  |  |  |
|  | D3 | reservoir, closing means and screens on 3 sperate bodies | Y | Y | Y | Y | Y | Y | Y | Y | Y | Y |  |  |  |
|  | D4 | reservoir and number of screens are on a single body and the closing means preferably are on a separate body | Y | Y | Y | Y | Y | Y | Y | Y | Y | Y |  |  |  |

*Fig. 21 continued*

DEVICE AND METHOD FOR DISPENSING A PARTICULATE MATERIAL

FIELD OF THE INVENTION

The present invention relates to dispensing of particulate materials, such as, but not limited to, particulate materials used in agriculture. Such particulate materials for example may be selected from compositions comprising beneficial arthropods, such as beneficial mites, and a carrier for the arthropod individuals.

BACKGROUND

Beneficial arthropods are presently frequently used in agriculture, for example for biological pest control. Examples of beneficial arthropods, used for this purpose, are predatory mites, parasitic wasps and assassin-bugs. In addition, distribution of prey, such as Astigmatid mites, for predatory arthropods, such as predatory mites, may also be beneficial in a target area where the predatory arthropods are present. This provision of (Astigmatid) prey to the predatory arthropods may help in supporting the development and maintenance of the population of predatory arthropods (see for example Hogerbrugge et al. (2008), Integrated Control in Protected Crops, Temperature Climate, IOBC/wprs Bulletin Vol 32, pp. 79-82).

To perform their function, such beneficial arthropods must be introduced (dispensed) in a target area, such as a crop. In the state of the art, for outdoor applications, this is in general done by manually dispensing compositions comprising beneficial arthropods with a particulate carrier in the crop simply by sprinkling the composition from a container. This method is very labour-intensive.

In order to provide a saving of labour while dispensing beneficial arthropods, systems using Unmanned Aerial Vehicles (UAVs) have been proposed. Examples are the system developed by Aerobugs Pty Ltd disclosed in Australian patent applications AU201510098 and AU2015101838. The existing system of Aerobugs Pty Ltd has the problem that it has poor compatibility with many commercial beneficial arthropod formulations containing a carrier comprising particulate material having poor flowability (are not fully free flowing), such as bran or sawdust, which are frequently used. When dispensing such formulations comprising particulate materials having poor flowability with the existing devices, problems of irregular dispensing and/or clogging have been observed.

SUMMARY

To find a solution to the problem associated with existing systems for dispensing particulate compositions comprising beneficial arthropods, the inventors of the present invention have developed a new method for dispensing a particulate material that has good distribution properties for particulate materials that are not fully free flowing (are not free flowing) and a device for use in such a method. Apart from utility in dispersing non-free-flowing particulate materials, the method and device have broader utility in dispensing particulate materials in general. Thus a solution for dispensing particulate materials, which can be applied more generally is provided.

The invention according to a first aspect relates to a method for dispensing a particulate material in a target area. The method comprising the steps of:

(i) providing a reservoir for the particulate material, said reservoir comprising a number of openings, suitable to allow particulate material to exit from the reservoir;
(ii) providing a number of closing means suitable for at least partially closing the openings of the reservoir;
(iii) providing a number of screens in the void of the reservoir, said screens being movable, through the void of the reservoir between at least a first and a second position, such that in their movement from a first to a second position, the screens push against particulate material, when present in the void;
(iv) loading particulate material in the reservoir, preferably when the closing means are closing the openings;
(v) moving the reservoir over the target area and at least partially opening the openings while alternatingly moving the screens between a first and a second position and vice versa.

A further aspect of the invention relates to a device for dispensing a particulate material in a target area, such as in a crop. The device comprises:

a body comprising a reservoir for the particulate material comprising a circumferential wall surrounding a void, and having a first end and a second end at a distance from the first end, wherein the body further comprises a base, the first base, said first base connected to the circumferential wall at the first end closing the void at the first end, said first base provided with a number of openings, suitable to allow particulate material to flow from the first body;
a body comprising a number of closing means suitable for at least partially closing the openings of the first base;
a body comprising a number of screens, protruding into the void, wherein the screens are moveable, in particular slidable, rotatable, liftable or tiltable, between at least a first and a second position, such that in their movement from a first to a second position, the screens push against particulate material, when present in the void.

The invention furthermore relates to the use of a device of the invention for distributing particulate material in a target area, in particular in a method according to the invention.

Yet a further aspect of the invention relates to a vehicle, such as an aerial vehicle, or an agricultural vehicle, equipped with a device according to the invention.

BRIEF DESCRIPTION OF THE FIGURES

FIGS. 9A-9F show schematic views of separate bodies and assembled bodies of alternative embodiments of the invention.

FIGS. 10A-10G show schematic views of separate bodies and assembled bodies of alternative embodiments of the invention.

FIGS. 14A-14C show results of experiment 6.

FIGS. 15-21 show tables presenting combinations of parameter values envisaged within the method and device of the invention and the related use and vehicle of the invention.

DETAILED DESCRIPTION

The method of the invention is for dispensing a particulate material in a target area. Within the present invention the term "particulate material" or equivalent terms, such as "particulate matter" should be understood to mean a material composed of distinct particles. Particulate materials that are of particular interest, according to certain embodiments may be selected from particulate materials having applications in agriculture in particular in connection to plant health, for example as biocontrol agents or products supporting the function of biocontrol agents. In this respect it is known to the skilled person that beneficial arthropods, such as predatory mites or Astigmatid prey mites may be presented in compositions in combination with a carrier, such as a carrier selected from for example sawdust, wheat bran, vermiculite, or chaff, such as chaff selected from rice husks or millet husks. Often such carriers are used in a moistened form. Such (moistened) carriers may be considered to be particulate materials. In addition individual beneficial arthropods, on an abstracted level, may also be considered to be particles. Thus a larger collection (or population) of beneficial arthropods may be considered to be a particulate material. The terms "particulate material", "particulate material comprising particles" and their equivalent terms, thus within the context of the present invention include and according to preferred embodiments mean "a composition comprising beneficial arthropods". "A composition comprising beneficial arthropods" may or may not comprise a suitable carrier such as mentioned above. The term "carrier" includes moistened versions. According to preferred embodiments a composition comprising beneficial arthropods does comprise a suitable carrier for the arthropods.

According to certain embodiments a particulate material is selected having particles with a size distribution wherein the average particle size is 0.05-15.00 mm, such as 0.10-10.00 mm, preferably 0.25-10.00 mm, such as 0.50-2.00 mm, more preferably 0.25-7.00 mm. In general such particulates will be suitable for dispensing by the device of the invention. According to some embodiments the particles have a longest axis (when the particles are stretched or have a stretched shape) and the average particle size is considered over the longest axis of the particles. Examples of such particulate materials available with such an average particle size are saw dust, wheat bran, vermiculite, chaff, such as millet chaff or husks or rice husks.

Figures 1, 2:
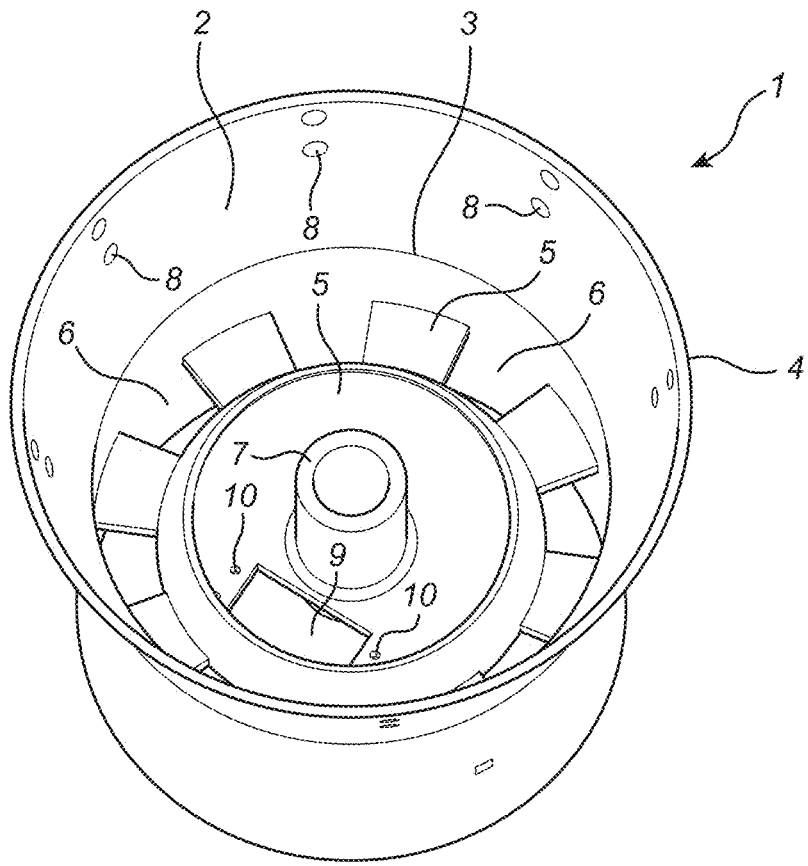
FIG. 1, presents an overview of examples of combinations of particle size and density of the particulate materials considered for dispensing within the context of the invention.
FIG. 2 presents a perspective view from the top of the body comprising the reservoir of an embodiment of the device of the invention.

The particulate materials according to certain embodiments has a density of 50-300 grams per litre (g/l), preferably 70-250 g/l, such as 70-100 gl, 90-150 g/l, 180-240 g/or 140-200 g/l. Particulate materials having a density within these ranges in general can be distributed relatively easily with the device of the invention. FIG. 1 shows combinations of average particle size and density of particles envisaged by the invention. It will however be clear that alternative particulate materials having different sizes and densities may be suitable to be dispensed with the method and device of the invention.

Apart from being suitable for dispensing particulate materials in general, the device of the present invention is suitable for dispensing particulate materials which are not fully free flowing. The skilled person will know the meaning of the term "free-flowing" and will be able to determine whether the particles of a particulate material are not fully free-flowing. In particular, the skilled person will know that physical properties such as particle size, size distribution, shape, surface area, density and the existence of cohesive and/or adhesive forces may play a role in how particulate materials flow and thus whether or not they are fully free flowing or not. Tests to determine whether a materials is free flowing, for example tests based on determinations of the angle of repose, are available. In the art it is often indicated that an angle of repose below 30° indicates good flowability and that above 30° the flowability is less than fully free flowing. A suitable test for determining the angle of repose is described by Geldart et al. (Characterization of powder flowability using measurement of angle of repose, China particuology, Vol. 4, Nos. 3-4, 104-107, 2006). In the context of the present invention, non-free flowing particulate materials are materials having less then fully free-flowing characteristics, in particular materials having an angle of repose, in particular as determined with the Mark 4 device described by Geldart et al. (2006) or a similar device, of 30° or higher, preferably 35° or higher, more preferably 40° or higher, most preferably 45° or higher. Materials of interest that in many cases are not fully free-flowing (non-free-flowing) are (moistened) sawdust (moistened) bran and (moistened) vermiculite.

As is noted above, compositions comprising beneficial arthropods may be selected as the particulate material. The beneficial arthropods may be provided as such or in combination with a carrier. As the use of a carrier material is common for many beneficial arthropods, it should be understood that when solely the term "beneficial arthropods" or "arthropods" is used, these terms also encompass the combination with a carrier material unless explicitly stated otherwise. In connection to the present invention the term "arthropods" and "beneficial arthropods" are used interchangeably. Beneficial arthropods encompass all life stages, inclusive eggs, nymphs (as far as these occur in a certain species), pupae (as far as these occur in a certain species), and adults of for example insects, such as parasite wasps and assassin-bugs or mites, such as predatory mites, for example phytoseiidae, such as described by De Moraes et al. (De Moraes, G. J., J. A. McMurtry, H. A. Denmark & C B. Campos (2004) A revised catalog of the mite family Phytoseiidae. Magnolia Press Auckland New Zealand). Within the term "beneficial arthropods" also other arthropods, which may be useful in biological pest control or for any other human benefit are included. Dispensing of particulate materials comprising beneficial arthropods comprising adult life stages, such as mites, in particular predatory mites, is especially envisaged in the present invention. In particular dispensing of beneficial arthropods combined with a particulate carrier material, especially a carrier material having less then fully free-flowing characteristics as is described above.

In the method of the invention a reservoir for the particulate material is provided. The reservoir comprises a number of openings, suitable to allow particulate material to exit from the reservoir, preferably by flowing from the reservoir, e.g. under the influence of gravity. The term "reservoir" should be understood to mean a holding body thus is interchangeable with equivalent terms such as "container" and "chamber". The skilled person will understand that in general a reservoir has a void and will be able to provide a reservoir suitable for holding the particulate material. The number of openings in the reservoir may be any suitable opening that allow the particulate material to exit from the reservoir. Within the context of this invention, "a number of" comprises, each time the term is used, one or more, such as a plurality, for example 2, 3, 4, 5, 6, 7, 8, 9 or 10. In the language used in this description of the invention, the term may be used interchangeably in connection to the singular form or the plural. In general within the context of this description of the present invention, singular forms and plurals of any term should be considered technically equivalent, unless the specific context implies differently. As the skilled person will understand, for allowing the particulate material to exit from the number of openings it is preferred that they are provided in a section of the reservoir that in the use position (the dispensing position) is a lower part, such that the particulate material may move towards the number of openings under the influence of gravity. The reservoir may in particular comprise a circumferential wall surrounding a void, and having a first end and a second end at a distance from the first end and a base, the first base, said first base connected to the circumferential wall at the first end closing the void at the first end, said first base provided with a number of openings, suitable to allow particulate material to exit from the reservoir.

In the method a number of closing means suitable for at least partially closing the openings of the reservoir are further provided. A closing means may be selected from any means that is suitable to at least partially close an opening. Closing means preferably should be dynamic in that they can provide different levels of closing of the openings, such as a full closing of an opening and a partial closing of an opening. A body (or a part thereof) that may obstructs an opening may for example be used as a closing means as it can function for example as a slide or an equivalent closing means. The number of closing means preferably corresponds to the number of openings, such that for each opening a separate closing means is provided.

A number of screens is further provided in the void of the reservoir. The term "screen" should be understood to mean a "partition". Thus it refers to an element comprising a wall or a barrier that at least partially parts sections of the void of the reservoir. A screen may have any shape, form and size that renders it suitable as a (partial) partition. According to preferred embodiments, the general shape of the number of screens will be two-dimensional, meaning that the (average) length and (average) width are substantially larger than the (average) thickness, preferably at least 2 times as large. It should be understood that a screen may have a complex shape and form having a varying length, width and thickness. The skilled person will understand that for screens having a complex shape and form with a varying length, width and thickness, the average length, width and thickness should be taken into consideration. On the basis of the overall shape and form of a screen and the sizes of the average length, average width and average thickness, the skilled person will be able to determine whether a screen in general is two-dimensional. The preferred screens having in general a two dimensional form thus may be defined by a plane. For example, if the screens have a shape and form that is mirror symmetrical, the mirror plane may be considered the defining plane. The defining plane thus is not necessarily the surface of the screen.

The number of screens preferably is positioned essentially vertically. Essentially vertically refers to a position with little or no deviation from vertical and thus includes vertically. However, screens positioned under an angle with the vertical may alternatively be used within the method of the invention.

The screens are movable, through the void of the reservoir between at least a first and a second position in particular in a slidable, rotatable, liftable or tiltable movement. At least a first and a second position includes a first and a second position. The movement is such that in moving from a first to a second position, a screen (i.e. its surface) pushes against particulate material, when this is present in the void. This may for example be accomplished when screens are positioned essentially vertically and a movement from a first to a second position and vice versa is essentially horizontally. However, as the skilled person will understand, alternative movements may be possible. Essentially horizontally refers to a position with little or no deviation from horizontal and thus includes horizontally. However, a movement under an angle with the horizontal may alternatively be used within the method of the invention. The skilled person will understand that it is preferred to maximize the pushing function of the screens against the particulate material. For this the screens may be positioned such that in the movement from the first to the second position, the projected area of the surface of the screens projected in the direction of movement is maximized. The skilled person will understand that the projected area of the surface of a screen projected in the direction of movement from the first to the second position is maximal when a screen is positioned perpendicular to the direction of movement, preferably in two directions.

It is preferred, that also in the movement from the second position to the first position a screen pushes against particulate material, when this is present in the void. Thus it is highly preferred that a movement from a second position to a first position is the opposite of the movement from a first position to a second position.

In the method the particulate material is loaded in the reservoir. This is preferably done when the closing means are closing the openings. The skilled person will understand that for loading the particulate material, the reservoir provided will have a number of loading openings. For a loading opening, preferably a separate opening different from the exit openings is provided in the reservoir. According to certain embodiments loading may be via the openings used to allow the particulate material to exit the reservoir. This may require a different positioning of the reservoir for loading and for dispensing. Loading of the particulate material into the reservoir via an opening suitable for loading may be according to any suitable procedure known to the skilled person. For loading suitable tools such as funnels may be used.

It is preferred that in the space of the reservoir provided, wherein particulate material is loaded, the presence of acute angles (<90° angles) is limited as much as possible. This because particulate material may remain in these acute angles, which interferes with full emptying of the particulate material from the reservoir. It is therefore preferred that the space of the reservoir provided, wherein particulate material is loaded, comprises bend surfaces and/or obtuse angles (angles larger than 90° and smaller than 180°).

For dispensing the particulate material, the reservoir loaded with particulate material is moved over the target area and the number of openings are at least partially opened while alternatingly moving the screens through the void between a first and a second position and vice versa. The skilled person will understand that when the exit openings are configured and positioned suitably for the particulate material to exit from the reservoir e.g. under the influence of gravity, when the exit openings are at least partially opened this will allow the particulate material to exit from the number of openings. For particulate materials not having full free flowing characteristics, however, there is a risk that the flow of material may be irregular and/or that there is clogging due to interactions between the particles of the particulate material. In the alternating movement through the void between a first and a second position, the number of screens push against the particulate material present in the void. Due to this pushing against the particulate material, the interactions between the particles of the particulate material are disturbed and a more regular flow is obtained.

It should be understood that when moving between a first and a second position, a screen may move via a number of intermediate positions, between a first and second position. Such intermediate positions may be considered first and second positions relative to each other. In embodiments of the invention where there are intermediate first and second positions, there is a higher degree of variability in regulating the movement of the protruding sections. It is therefore preferred if the number of screens is movable continuously (without any fixed intermediate positions) through the void, thus there are a high number (theoretically an infinite number) of intermediate positions.

The movement by which the number of screens is movable between a first and a second position, may be any movement by which the screens are moved. On the basis of this description of the present invention, the skilled person will understand, that depending on the configuration of the reservoir and the number of screens and their relative arrangement, different alternative movements of the number of screens are possible. Suitable movements of the number of screens between a first and a second position in particular may be selected from a sliding movement, a rotating movement, a lifting movement or a tilting movement. Rotating and sliding movements are preferred. The skilled person will understand that certain rotating movements are sliding movements and vice versa and that certain tilting movements are rotating movements and vice versa. Circular sliding movements are most preferred, as the direction of a circular movement may be designed such that it is not directed towards the circumferential wall, in particular when the circumferential wall also has a circular circumference. When the movement between a first and second position has a direction towards the circumferential wall, there is a risk of pressure build-up due to compaction of the particulate material in the area between the screen and the circumferential wall. Such a pressure build-up may be negative for the quality of the particulate material, in particular when the particulate material comprises beneficial arthropods.

It is preferred that in the movement of the screens between a first and a second position the closing of the openings by closing means is changed. This may be accomplished by connecting the movement of the screens to a movement of the closing means. For example by providing the number of screens and the number of closing means on a single body and moving this single body relative to the reservoir and the openings. In these embodiments it is preferred that a number of screens have a size and form, in particular at their base (the side at their lower end), that renders them suitable to function as closing means. Alternatively the screens can be provided on a body comprising the reservoir and the openings and this body can be moved relative to a body comprising the closing means. On the basis of the further description of various embodiments of the device of the invention presented below, the skilled person will be able to bring these embodiments of the method of the invention into practice.

In the method of the invention, the movement of the screens may be over any distance suitable to have screens push sufficiently against particulate material, when present in the void. The maximal distance of the movement of the screens between a first and a second position will be within the scale of the size of the number of openings (0.1 to 10 times the size of the openings). The minimal distance of the movement of the screens between a first and a second position may be up to one scale smaller than the size of the openings (0.01-0.1 times the size of the openings). The size of the number of openings to consider is the hydraulic diameter (D) given by the relation D=4A/P, wherein A is surface area of the opening, and P is the length of the perimeter of the opening. If a plurality of openings is provided, the hydraulic diameter to consider is the average of the hydraulic diameters of the different openings. According to certain embodiments a screen is moved between a first and second position over a distance corresponding to 0.01 to 9.0, such as 0.1 to 9.0, 0.1 to 8.5, 0.1 to 8.0, 0.1 to 7.0, 0.1 to 6.0, 0.1 to 5.0, 0.1 to 4.0, 0.1 to 3.0, 0.1 to 2.0, 0.1 to 1.0, 01. to 0.9, 0.1 to 0.8, 0.1 to 0.7, 0.1 to 0.6, 0.1 to 0.5, preferably 0.1 to 0.4 times the hydraulic diameter of the number of openings. This distance may be referred to as the fractional distance.

In embodiments wherein in the movement of the screens between a first and a second position the closing of the openings by closing means is changed, it is preferred that in the first position the number of openings are open for 0-20%, such as 2-20%, 2-18%, 4-18%, 4-16% or 5-15% and in the second position the openings are open for 30-100%, such as 30-95%, 30-90%, 30-85%, 30-80%, 35-80%, 35-75%, 40-70%, or 40-65%, most preferably 40-60%. The size of the openings thus may be somewhat over-dimensioned in relation what is required in the alternating movement between the first and the second position. However, for quick flushing of particulate material from the reservoir of devices used in the method of the invention, larger openings may have benefits. Lower limits for the first position above 0% are beneficial in that the complete closing of the openings may create pressure areas, where the particulate material is pressurized. It may be beneficial to prevent such pressure areas, in particular for particulate materials comprising pressure sensitive beneficial arthropods.

The percentage opening refers to the percentage of the area of the openings that is open, i.e. that is not closed off by closing means, where in the fully open position the number of openings are considered 100% open. According to certain embodiments the open area of the number of openings is considered on the basis of the total area of the number of openings. According to other embodiments, the open area of the number of openings is considered on the basis of the area of a number of individual openings. It is preferred that the percentage of the open area of the number of openings considered on the basis of the total area of the number of openings is the same as the open area of the number of openings considered on the basis of the area of the number of individual openings, i.e. that all openings are closed in the same percentage.

The frequency of the alternating movement between the first and second position according to certain embodiments is between 0.05 and 50 times per second, such as $0.10\ \text{s}^{-1}$-$45\ \text{s}^{-1}$, $0.10\ \text{s}^{-1}$-$40\ \text{s}^{-1}$, $0.2\ \text{s}^{-1}$-$40\ \text{s}^{-1}$, $0.2\ \text{s}^{-1}$-$35\ \text{s}^{-1}$, $0.5\ \text{s}^{-1}$-$30\ \text{s}^{-1}$, $0.5\ \text{s}^{-1}$-$25\ \text{s}^{-1}$, $1\ \text{s}^{-1}$-$20\ \text{s}^{-1}$, $1\ \text{s}^{-1}$-$15\ \text{s}^{-1}$, $1\ \text{s}^{-1}$-$10\ \text{s}^{-1}$. The skilled person will understand that for larger movements of the screens lower frequencies are more suitable and that vice versa, when higher frequencies are desired, smaller movements of the screens are more suitable.

In the method of the invention the reservoir is moved over a target area. It should be understood that with the reservoir also the closing means and the screens are moved over the target area. The target area preferably is a crop, more preferably a field crop i.e. a crop growing in an open (outdoor) field. The crop may be selected from, but is not restricted to (greenhouse) vegetable crops such as tomatoes (*Solanum lycopersicum*), peppers (*Capsicum annuum*), eggplants (*Solanum melogena*) Curcubits (*Cucurbitaceae*) such as cucumbers (*Cucumis sativa*), melons (*Cuctnis melo*) watermelons (*Citrullus lanatus*); soft fruit, such as strawberries (*Fragaria x annanassa*), raspberries (*Rubus ideaus*)), blueberries, (greenhouse) ornamental crops (such as roses, gerberas, chrysanthemums) or tree crops such as *Citrus* spp.

Moving the reservoir (and the closing means and the screens) over the target area may be achieved with the aid of any suitable means, such as a vehicle, preferably a motorised vehicle. According to the invention it is in particular preferred to use an Unmanned Aerial Vehicle (UAV), such as a drone, for example a quadcopter or a hexacopter, to move the reservoir over the target area. Alternatively a tractor may be used to move the reservoir over the target area. For this the reservoir may be connected to a suitable position of the vehicle.

Additional information concerning alternative embodiments of the reservoir, closing means, screens and other features of the method of the invention may be derived from what is discussed below in relation to the device of the invention, which is suitable for performing the method of the invention. The following discussion in connection to the device of the invention is expressly intended to also further support the disclosure of the method of the invention.

The invention further relates to a device suitable for dispensing a particulate material. With the device the method of the invention can be performed. The device of the invention comprises a body comprising a reservoir for the particulate material, preferably comprising a circumferential wall, which surrounds a void and comprises a first end and a second end at a distance of the first end. According to preferred embodiments the second end is positioned opposite the first end. The reservoir further comprises a first base connected to the circumferential wall at the first end closing the void at the first end. The circumferential wall together with the first base thus encloses a void which may be open at the second end or may be closed at the second end. The teem "void" should be understood as meaning a "chamber" or in alternative terms a space. The second end of the first body preferably is at least partially open, allowing loading of particulate material into the device. Alternatively, there may also be a number of openings in the circumferential wall for introducing particulate material into the chamber of the first body. Openings for loading of particulate material in the void preferably are closable with a suitable closing means, such as a door or a hatch.

The circumference of the circumferential wall may have any suitable shape, such as a circular, a rectangular, for example a square, a triangular, a rhombus or a trapezoid shape. The circumferential wall preferably has a shape having a circular cross-section. The skilled person will understand that the void in cross section has a shape corresponding to the shape of the inner circumference of the circumferential wall. The first base preferably is a base plate having a cross-section corresponding to the cross section of the inner circumference of the circumferential wall, such as a circular cross-section.

In many embodiments, the first base has an upper surface on the side of the void and a lower surface facing away from the void. The first base is further provided with a number of openings that are designed to allow a particulate material, when present in the void of the reservoir, to exit the reservoir, preferably by flowing out of the reservoir, e.g. under the influence of gravity. The size of the number of openings will thus depend on the particulate material in the void of the reservoir. The minimal size of the number of openings preferably is such that clogging in the openings of the particulate material selected to be dispensed is minimal or most preferably absent. The maximal size of the number of openings is such that the desired maximal flow may be achieved. For this, according to certain embodiments, the area of an individual opening in the first base is between 5 $\text{mm}^2$ and $1,000,000\ \text{mm}^2$, more preferably 10 $\text{mm}^2$ and $100,000\ \text{mm}^2$, more preferably 50 $\text{mm}^2$ and $50,000\ \text{mm}^2$, most preferably between 50 $\text{mm}^2$ and 500 $\text{mm}^2$. An area of between 50 $\text{mm}^2$ and 500 $\text{mm}^2$ is in particular suitable when dispensing particulate materials used as carriers for beneficial arthropods, such as sawdust carrier materials and wheat bran carrier materials.

The openings in the first base may be positioned in the first base at any suitable position. Preferably a number of openings is provided near the outer edge of the first base, close to the circumferential wall. Near the circumferential wall should be understood as meaning in the proximity of the circumferential wall. According to certain preferred embodiments the openings are located at a distance of 0-10 cm, such as 0.1-10.0 cm, 0.1-8.0 cm, 0.1-7.0 cm, 0.1-6.0 cm, 0.1-5.0 cm or 0.1-4.0 cm from the circumferential wall or from the centre of the first base. When at a distance of 0 cm from the circumferential wall, the openings are at the circumferential wall.

The openings may have any shape and form that is suitable for allowing the particles of the particulate material to pass. Preferably the openings have an elongated shape. When located in the proximity of the circumferential wall, as is preferred, the elongated shape of a number of openings may follow the shape of the circumference, for example by being bend or angled. This may make it easier to position elongated openings in the proximity of the circumferential wall, in particular when the circumferential wall has a bend or angled shape.

The device of the invention further comprise a body comprising a number of closing means suitable for at least partially closing the openings of the first base. The closing means are suitable for regulating the outflow of particulate material through the openings of the first base. A closing means may be selected from any means that is suitable to at least partially close an opening. Closing means preferably should be dynamic in that they can provide different levels of closing of the openings, such as a full closing of an opening and a partial closing of an opening. A body (or a part thereof) that may obstructs an opening may for example be used as a closing means as it can function for example as a door, such as a sliding door, or a hatch or an equivalent closing means.

The device also comprises a body comprising a number of screens, protruding into the void. The term "protruding" should be understood as meaning "projecting" or "extending". The screens are moveable, in particular slidable, rotatable, liftable or tiltable, between at least a first and a second position, such that in their movement from a first to a second position, the screens push against particulate material, when present in the void. It is preferred that also in the movement from the second to the first position the screen push against particulate material, when present in the void. Details concerning the configuration and function of the screens have already been provided above in the discussion of the method of the invention. The information provided there also applies to the screens of the device of the invention. It should be noted that where in connection to the position of the screens in the discussion of the method of the invention reference is made to an essentially vertical position of the screens, this relates to the use position, i.e. the dispensing position, of the device. From the whole of this description of the invention it will be clear for the skilled person what the dispensing position is. In the dispensing position in particular the first base in is positioned below the second end and preferably the number of openings is positioned at the lowest point in the reservoir. In terms of the configuration of the device, if for example, the upper surface (the side facing the void) of the first base is an essentially flat surface, the essentially vertical position of the screens is essentially perpendicular to the upper surface of the first base. If for example the first base has an essentially circular cross section, the essentially vertical position of the screens is essentially perpendicular to the plane of the circular cross section of the first base. "Essentially perpendicular" meaning with little or no deviation from perpendicular and thus includes perpendicular. "Essentially flat" meaning with little or no deviation from flat and thus includes flat. "Essentially circular" meaning with little or no deviation from circular and thus includes circular. Similarly where in connection to the movement of the screens in the discussion of the method of the invention reference is made to an essentially horizonal movement of the screens, this again relates to the use position of the device. In terms of the configuration of the device, if for example, the upper surface (the side facing the void) of the first base is an essentially flat surface, the essentially horizontal movement of the screens is in a plane essentially parallel to the upper surface of the first base. If for example the first base has an essentially circular cross section, the essentially horizontal movement of the screens is essentially parallel to the plane of the circular cross section of the first base. "Essentially parallel" meaning with little or no deviation from parallel and thus includes parallel. According to a particularly preferred embodiment, in the device a plurality of screens is provided, the design of the movement of the screens from a first position to a second position is such that the screens provided move in the same plane and the screens are positioned essentially perpendicular to the common plane of their designed movement (wherein they move in the use of the device). In order to have the maximize the pushing effect of the screens, the number is screens is positioned perpendicular to their designed direction of movement in two directions, first in the direction perpendicular to the common plane of the movement and second a in direction in the common plane of movement.

According to certain preferred embodiments, the number of screens comprises an even number of at least four screens, wherein alternating screens have different sizes and/or shapes, in particular have different surface areas. In this configuration of the screens an improved pushing effect against the particulate material is achieved, as the pushing pressure exerted by the different screens differs.

In the device of the invention one or more of the reservoir, the closing means and/or the screens may be combined on a single body or they all may be on separate bodies. It is preferred that the number of screens and the closing means are on the same body.

According to certain preferred embodiments the body comprising the reservoir is a first body and the body comprising the screens is a separate second body and said second body is arranged at least partially within the circumferential wall of the first body. The second body thus is at least partially arranged (positioned) in the void of the reservoir. The position of the second body in the first body is such that an edge of the second body, the boundary edge, is abutting the upper surface (the surface on the side of the void) of the first base. Abutting meaning bordering as close as possible, while preferably not being in actual contact. Actual contact preferably is prevented to reduce friction in the movement of the second body relative to the first body. By having the boundary edge abutting on the upper surface of the first base, particulate material can be loaded in the space between the first base, the circumferential wall and the second body. In these embodiments the number of screens preferably extend (stretch) from the upper surface of the first base (the surface on the side of the void) in the direction of the second end of the first body. In their position the number of screens preferably are positioned essentially perpendicular to the first base. Alternatively the screens are positioned essentially perpendicular to the circumferential wall. Most preferably the number of screens is positioned essentially perpendicular to the first base and essentially perpendicular to the circumferential wall. The number of screens further preferably protrude into the void from a supporting element, such as a supporting surface or a supporting pillar of the second body.

A preferred supporting element for the number of screens on the second body in these embodiments comprises a surface, the sliding surface, extending from the upper surface of the first base away from the first base in the direction of the second end of the first body. Thus the sliding surface stretches as a raised surface from the first base into the void of the reservoir. The sliding surface preferably provides a surface that directs the particulate material, when present in the void, towards the openings in the first base. The sliding surface preferably extends from the circumference of the first base towards a point within the circumference of the first base, preferably from the circumference of the first base toward a point projected from the middle of the upper surface. In view of the fact that the sliding surface is raised above the first base and its upper surface, the skilled person will understand that points on the sliding surface can be projected on the upper surface and vice versa and the reference to projections of points will be understood by the skilled person. The sliding surface preferably is a surface having rotational symmetry, for example corresponding to a straight line under an angle rotated along an axis through its end point, such as a cone shape, or a rotated convex line, such as a dome shape, or a rotated concave line, such as a trumpet shape. A sliding surface having a convex shape is most preferred. The sliding surface has an edge, the boundary edge, which forms a boundary of the sliding surface. For example for a cone shape, a dome shape, or a trumpet shape, the boundary edge is the edge of the mantle.

The raised surface of the sliding surface has an angle α with the plane of the boundary edge of the second body. The angle α may be an angle between 15° and 90°, such as 20°-75°, 25°-60°, 30°-60°, or 35°-60°, preferably 40°-60°. It will be clear that convex and concave shapes do not have a constant angle. Thus, in case the raised surface is a bend surface, the angle α to take into consideration is the angle α between points a, b and c, wherein a is the point on the sliding surface having the longest projected distance from the plane of the boundary edge, b is a point on the boundary edge, c is an (imaginary) projection of point a in the plane of the boundary edge. The definition of the angle α is further explained below with reference to FIG. 4.

For many embodiments it is preferred that the size and shape of the perimeter of the boundary edge corresponds to the size and shape of the circumference of the circumferential wall of the first body, such that the second body at its base fully covers the upper surface (the surface facing the void) of the first base. It is preferred if the boundary edge has a circular perimeter and it is most preferred that the circumference of the circumferential wall and the perimeter of the boundary edge have a corresponding circular shape.

In the embodiments wherein the body comprising the reservoir is a first body and the body comprising the screens is a separate second body and said second body is arranged at least partially within the circumferential wall of the first body, the screens are protruding from the sliding surface towards the circumferential wall. It is preferred if at least part of the number of screens stretches over the full distance from the sliding surface towards the circumferential wall.

In the embodiments wherein the body comprising the reservoir is a first body and the body comprising the screens is a separate second body and said second body is arranged at least partially within the circumferential wall of the first body, the closing means may be on the second body, or on a separate third body. It is preferred that the closing means are on the second body. When the closing means are on the second body, it is further preferred, when a number of screens have a size and shape to render them suitable as closing means. This may be achieved by designing a number of screens to have a size and shape suitable to cover at least a part of a number of openings of the first base. In this it is preferred that individual screens have a size and shape suitable to cover at least part of a corresponding individual opening. The number of screens thus may function as means for at least partially closing and/or covering the openings, whereby the outflow of particulate material may be influenced by adjusting the covering of the openings. Most preferably individual screens have a size and shape suitable to fully cover a corresponding individual opening. In such embodiments, the number of protruding sections corresponds to the number of openings. In these embodiments wherein a number of screens function as closing means, in the movement between a first and a second position the closing of the openings by closing means may be changed because in the movement from the first to the second position, the covering of openings by parts of the screens, in particular the base of the screens, may change by a changing position of the screens with respect to openings. In these embodiments in the first position the screens of the second body at least partially cover the openings of the first base, at least partially blocking outflow of particulate material, when present, from the device. In the second position the openings of the first base are at least partially left open, allowing outflow of particulate material, when present, from the device. In the second position the openings in the first base thus are more open than in the first position. According to certain embodiments, the first position includes a position fully closing the openings in the first base. According to certain other embodiments, the second position includes a position fully opening the openings in the first base. It is preferred that in the device the second body is designed and arranged such that it is movable between positions such that in the first position the number of openings in the first base is fully opened and in the second position the number of openings in the second base is fully closed.

As is indicated above, the closing means may alternatively be on a separate third body. Such closing means preferably comprise closing means selected from sliding closing means, such as a sliding door or a sliding wall. When closing means are present on a third body, closing of openings may be independent from the movement of the number of screens.

In embodiments comprising a third body, preferably all closing means are on the third body. The third body may for example be a movable plate comprising cut-outs (creating teeth) positioned between the first base and the boundary edge. The third body may for example alternatively also be a movable plate comprising cut-outs positioned below the first base abutting the underside of the first base. The skilled person will understand that by moving the third body relative to the reservoir, the position of the cut-outs will change relative to the openings in the first base. When a cut-out at least partially coincides with an opening, particulate material present in the void may exit though the opening, while it is blocked from exiting through the opening where the material of the second body blocks the opening. Thus the outflow of particulate material may be regulated by the movement of the third body.

In alternative embodiments of the device the body comprising the reservoir and the body comprising the number of screens are a single body and the closing means preferably are on a separate body. In these embodiments the screens preferably are protruding from the circumferential wall inward to the centre of the void.

For moving the number of screens, for example by moving the body comprising the number of screens, and or for moving closing means the device according to certain preferred embodiments, comprises an number of actuators. An actuator should be understood as meaning any actuation means, such as mechanical means suitable for moving the second body with respect to the first body with a desired movement that moves the splines as discussed above. The skilled person will be able to select a suitable actuation means (actuator). For example a rotary or linear actuator may be selected. An actuator may for example be selected from electrical, pneumatic or hydraulic actuators, such as electrical motors, for example servomotors or stepper motors.

An actuator is preferably configured for alternating movement of the number of screens between a first and a second position. When in the device the number of screens is movable through the void between a number of additional positions, the intermediate positions, it is preferred that the actuator is also configured for alternating movement of the number of screens between intermediate position. The frequency of alternating movement between first and second and/or intermediate positions preferably is at a frequency between 0.05 and 50 times per second, such as $0.10\ s^{-1}$-$45\ s^{-1}$, $0.10\ s^{-1}$-$40\ s^{-1}$, $0.2\ s^{-1}$-$40\ s^{-1}$, $0.2\ s^{-1}$-$35\ s^{-1}$, $0.5$-$30\ s^{-1}$, $0.5\ s^{-1}$-$25\ s^{-1}$, $1\ s^{-1}$-$20\ s^{-1}$, $1$-$15\ s^{-1}$, $1\ s^{-1}$-$10\ s^{-1}$.

In the device of the invention, the movement of the screens may be over any distance suitable to have screens push sufficiently against particulate material, when present in the void. The maximal distance of the movement of the screens between a first and a second position will be within the scale of the size of the number of openings (0.1 to 10 times the size of the openings). The minimal distance of the movement of the screens between a first and a second position may be up to one scale smaller than the size of the openings (0.01-0.1 times the size of the openings). The size of the number of openings to consider is the hydraulic diameter (D) given by the relation D=4A/P, wherein A is surface area of the opening, and P is the length of the perimeter of the opening. If a plurality of openings is provided, the hydraulic diameter to consider is the average of the hydraulic diameters of the different openings. According to certain embodiments a screen is moved between a first and second position over a distance corresponding to 0.01 to 9.0, such as 0.1 to 9.0, 0.1 to 8.5, 0.1 to 8.0, 0.1 to 7.0, 0.1 to 6.0, 0.1 to 5.0, 0.1 to 4.0, 0.1 to 3.0, 0.1 to 2.0, 0.1 to 1.0, 01. to 0.9, 0.1 to 0.8, 0.1 to 0.7, 0.1 to 0.6, 0.1 to 0.5, preferably 0.1 to 0.4 times the hydraulic diameter of the number of openings. This distance may be referred to as the fractional distance.

For executing methods of the invention wherein in the movement of the screens between a first and a second position the closing of the openings by closing means is changed, it is preferred that in the device an actuator is configured such that in the first position the number of openings are open for 0-20%, such as 2-20%, 2-18%, 4-18%, 4-16% or 5-15% and in the second position the openings are open for 30-100%, such as 30-95%, 30-90%, 30-85%, 30-80%, 35-80%, 35-75%, 40-70%, or 40-65%, most preferably 40-60% as has been discussed above. Such embodiments include embodiments wherein a number of screens function as closing means.

In the device an actuator may be arranged on the body comprising the reservoir and may be provided with a number of arms connected to the body comprising the number of screens, wherein movement of the number of arms is configured to move the body comprising the number of screens, such that screens move though the void between a first and a second position, such that in their movement from a first to a second position, the screens push against particulate material, when present in the void. Preferably, the actuator and the number of arms are configured to move in a direction parallel to the plane of the first base.

The inventors of the present invention have observed, that the alternating movement between a first and a second position, results in a more homogenous dosing of particulate material, in particular non-free-flowing particulate materials. Without wishing to be bound by this theory, it is believed that due to the alternating movement of the number of screens between a first and second position, interactions between particles that may contribute to bridge forming between particles are at least reduced. Thus resulting in a more homogeneous flow of the particulate material though the openings of the first base.

The effect of improved homogeneity of outflow from the openings in the first base is increased when the number of screens comprises an even number of at least four, wherein alternating screens have different sizes and/or shaped, in particular have different surface areas. Without wishing to be bound by this theory, it is believed that while the movement of screens aids in disturbing the interaction between the particles, this effect is increased with more irregularity of the configuration of the screens.

According to certain embodiments, the device of the invention comprises a number of ducts connected to openings in the first base. The ducts comprise an inlet and an outlet and a hollow body connecting the inlet with the outlet. The ducts are suitable for transporting particles from an opening in the first base, via the hollow body to the outlet. Thus the inlets of the number of ducts are connected to the number of openings in the first base. It is preferred that the number of inlets and ducts correspond to the number of openings in the first base, such that each duct is connected to a single opening. Embodiments comprising ducts connected to the openings are in particular suitable for distributing particulate materials simultaneously in a plurality of rows of a crop with for example a wheeled agricultural vehicle, such as a tractor. For this the outlets are positioned at different positions a distance away from each other, preferably on an essentially straight line. The horizontal distance between the outlets preferably corresponds to the distance of the rows in a field where the crop grows, such as between 0.3 and 5.0 meters, for example 0.3-4.0 m, 0.3-3.0 m or 0.3-2.0 m.

The invention furthermore relates to the use of the device of the invention for distributing particulate material in a target area. In the use the device may in particular be used in a method of the invention. The features of the device and method have been discussed in detail above. Thus the skilled person will be able to put the use into practice. It is in particular preferred that the use is for distributing a particulate material comprising beneficial arthropods in a crop.

Yet a further aspect of the invention relates to a vehicle equipped with a device according to the invention. The vehicle may be any suitable vehicle, preferably a motorised vehicle. The device may be an aerial vehicle, such as an Unmanned Aerial Vehicle (UAV), such as a drone, for example a quadcopter or a hexacopter. Alternatively the vehicle may be an agricultural vehicle such as a tractor. The device of the invention preferably is connected to the vehicle via the first body, for example via the circumferential wall. The vehicle is in particular suitable for performing the method of the invention and the device of the invention may be considered an intermediate product for producing the vehicle.

The invention will now further be discussed with reference to the attached figures and the following experiments, which present illustrative non-limiting embodiments of the invention.

In FIGS. 2-3, 5-10, different embodiments of the body comprising the reservoir, the body comprising the closing means and the body comprising the screens of the device of the invention, and these bodies arranged together are presented. Corresponding elements have been presented with identical reference numbers.

In FIG. 2 the body comprising the reservoir (1) of a preferred embodiment of the device of the invention is shown. As is shown, the body comprising the reservoir (1) comprises a circumferential wall (2) having a circular cross section. The circumferential wall has a first end (3) located at the lower end in the presented view, a second end (4) located at the higher end in the presented view at a distance from the first end (3) and a first base (5), wherein the first base (5) closes the circumferential wall (2) at the first end (3). The circumferential wall (2) surrounds a void which is limited at the first end (3) by the first base (5). The circumferential wall (2) of this embodiment has a circular cross section with a smaller diameter at the first end (3) relative to the diameter on the second end (4). In the first base (5) a number of openings (6) is provided for the particulate material, when present in the reservoir, to flow from the reservoir. For arranging a second body comprising screens and closing means, in the centre of the first base (5) a hollow axis (7) is provided for receiving an axis on the second body. The circumferential wall (2) on the second end (4) comprises a number of mounting holes (8), for mounting a reservoir extension, for extending the volume of the reservoir or via which the device of the invention may be mounted on a vehicle by the use of fastening means such as screws or cooperating bolts and nuts (not shown). In the first base (5) an opening (9) is provided for receiving the housing of a servo motor (not shown), that is used as an actuator in this embodiment of the device of the invention. For fastening of the housing of the servo motor, holes (10) are provided in the first base (5).

Figure 3:
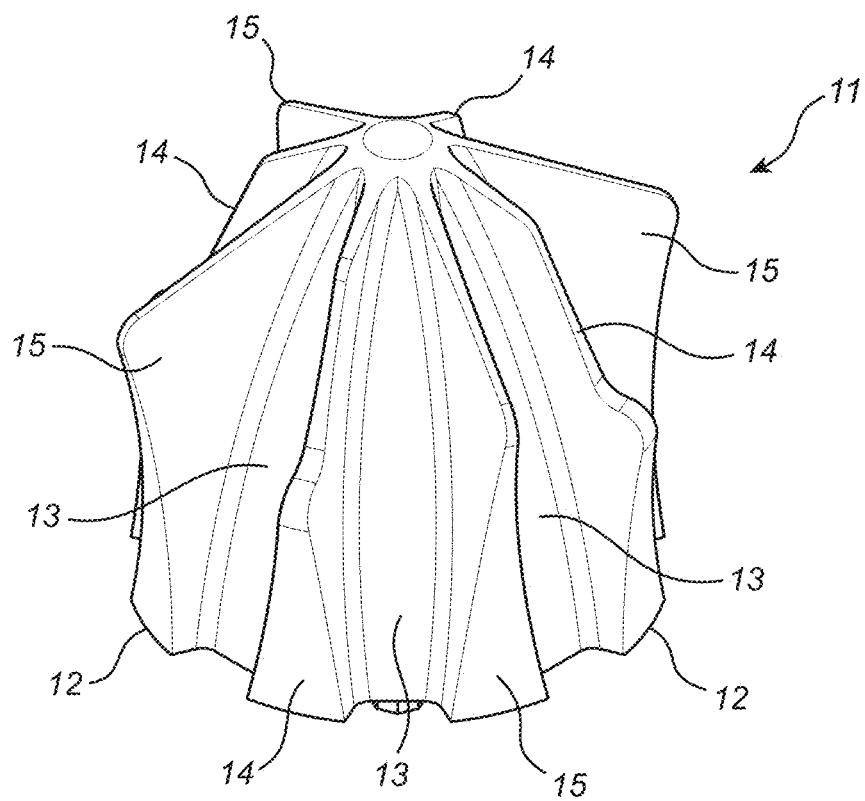
FIG. 3 presents a perspective view from the top of a body comprising screens and closing means of an embodiment of the device of the invention.

FIG. 3, shows a preferred embodiment of a body (11) comprising screens and closing means for arrangement as a second body (11) in the void of the body of FIG. 2. The second body (11) in general has a dome shape having a boundary edge (12) on the lower side of the dome. The surface (13) of the dome of the second body is a sliding surface (13) for particulate material when present in the void. The second body comprises a number of screens (14, 15) protruding from the sliding surface (13) supporting the screens. The screens (14, 15), extend from the top of the sliding surface (13) towards the boundary edge (12). The protruding screens (14, 15) of this embodiment have a size and shape suitable to cover the openings of the first base (6) of the first body (1). In this embodiment the protruding splines are provided in an even number of 8 splines, wherein alternating protruding splines (14, 15) have different sizes and shapes. In particular the surface area of the smaller splines (14) is smaller than the surface area of the larger splines (15).

Figure 4:
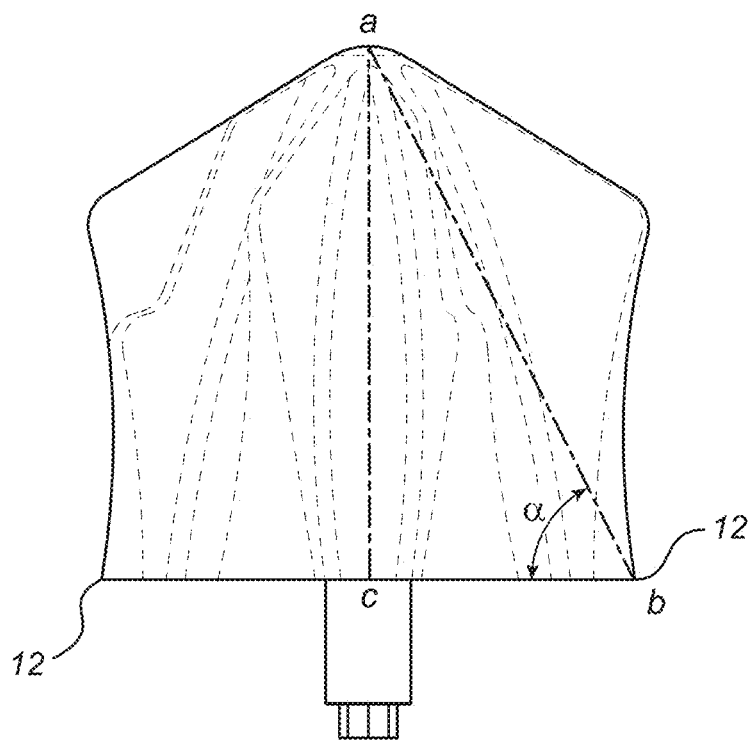
FIG. 4, presents a schematic view from the side of the body presented in FIG. 3, for indicating the angle α and points a, b, and c.

FIG. 4 schematically shows a wire frame view of the embodiment of the second body (11) presented in FIG. 3. This figure is presented to illustrate the position of the angle α between points a, b and c, wherein a is the point on the sliding surface (13) having the longest projected distance from the plane of the boundary edge (12), b is a point on the boundary edge (12), c is an (imaginary) projection of point a in the plane of the boundary edge (12).

Figure 5:
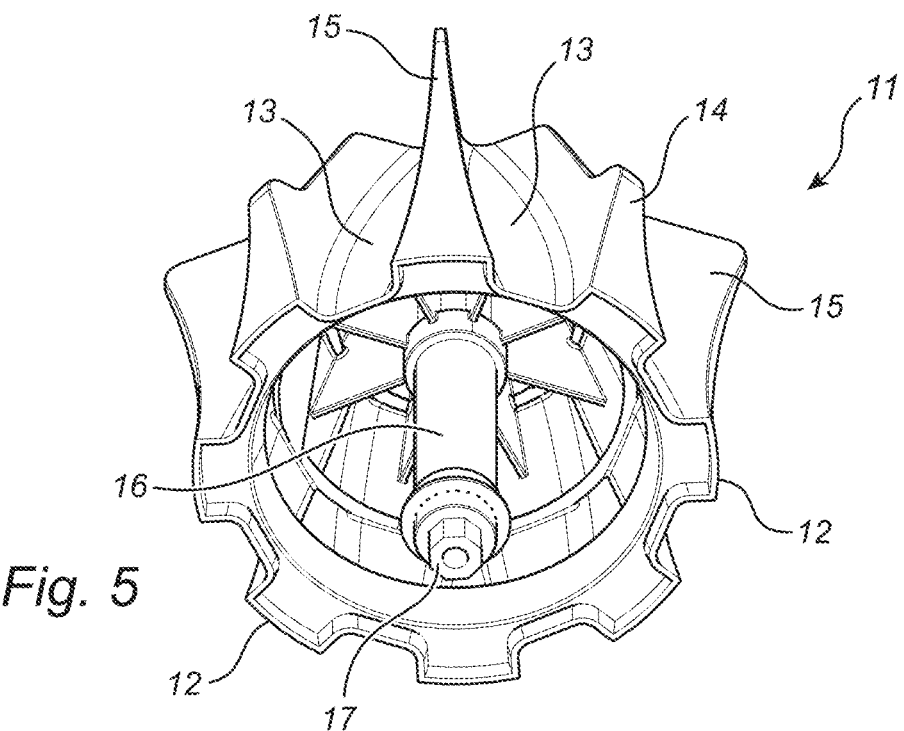
FIG. 5 presents a perspective view from the bottom of the body of FIG. 3.

FIG. 5 presents a perspective view of the underside of the embodiment of the second body (11) presented in FIG. 3. This view of this embodiment of the second body (11) shows a better view on its underside and the form and shape of the protruding screens (14, 15) protruding from the sliding surface (13). Also in this bottom view it is visible that alternating screens (14, 15) have a different shape. The form and shape of the screens (14, 15) on the underside (near and at boundary edge (12)) is suitable for covering the openings (6) in the first base (5) of the first body (1) and the screens (14, 15) function as closing means. In this embodiment in the middle of the dome shaped second body (11) an axis (16) is provided that cooperates with the hollow axis (7) on the first base (5) of the first body (1), to arrange the first body (1) and second body (11) together. The cooperation of the hollow axis (7) on the first base (5) and the axis (16) of the second body (11), allows for a rotating (sliding) movement of the second body (11) relative to the first body (1). For fixing the axis (16) of the second body on the axis (7) of the first body (1), a bolt (18) is provided that cooperates with a screw thread on the axis.

Figure 6:
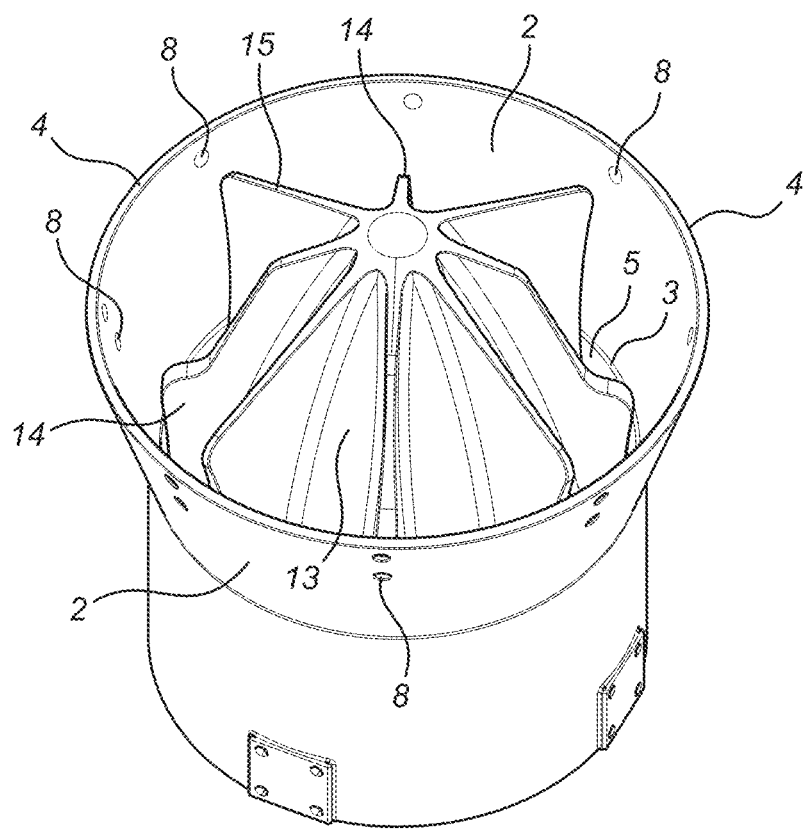
FIG. 6 presents a perspective view from the top of an embodiment of the device of the invention, wherein the bodies of FIGS. 2 and 3 are assembled together.

In FIG. 6, the first body (1) of FIG. 2 and second body (11) of FIG. 3 arranged together are shown. As is shown, the second body (11) is arranged in the void of the first body (1) enclosed by the circumferential wall (2) of the first body (1). In the arrangement of the second body (11) relative to the first body (1), the boundary edge (12) is abutting the upper side of the first base (5). The central axis (16) of the second body (11) is arranged in cooperation with the central axis (7) of the first body (1). Thus a rotational sliding movement of the second body (11) relative to the first body (1) is possible around the axes (7, 17)). In moving the second body (11) relative to the first body (11), the bases (the parts near and at the boundary edge (12)) of the splines (14, 15) of the second body (11) change their position relative to the openings (6) in the first base (5). Thus the bases of the splines (14, 15) may move between a first position at least partially covering the openings (6) and a second position wherein the openings (6) of the first base (5) are at least partially left open. In the embodiment shown, in the first position the openings (6) are fully covered, while in the second position the openings (6) are fully open. In the embodiment of FIG. 6, the second body (11) may also be positioned relative to the first body (1) in a number of intermediate positions, wherein the openings (6) are partially covered. The number of intermediate positions is in theory infinite, as the second body (11) can move continuously between the first and second position. By altering the covering of the openings (6) by the screens (14, 15), the outflow of particulate material loaded in the reservoir of the device via the opening at the second end (4) of the first body (1), may be regulated. The movement of the second body (11) relative to the first body (1) is actuated by a servomotor positioned in a housing placed in the receiving opening (9) of the first body (1). For the actuation an arrangement of arms is used (see FIG. 7) to transform the rotating movement of the driving axis of the servomotor to a rotating movement of the axis (16) of the second body (11). The control unit of the servo motor is programmed to allow alternating movements between the first and second position and intermediate first and second positions in a selected frequency between 0.05 and 50 per second. When the second body (ii) moves relative to the first body (11) the screens (14, 15) move through particulate material, when loaded in the device and present in the space between the circumferential wall (2) of the first body (1) and the sliding surface (13) of the second body (11). In this movement the screens (14, 15) push against the particulate material and thus disturb the packing of the particles of the particulate material. For non-free flowing particulate materials a frequent disturbing of the packing particles improves the flow characteristics.

Figure 7:
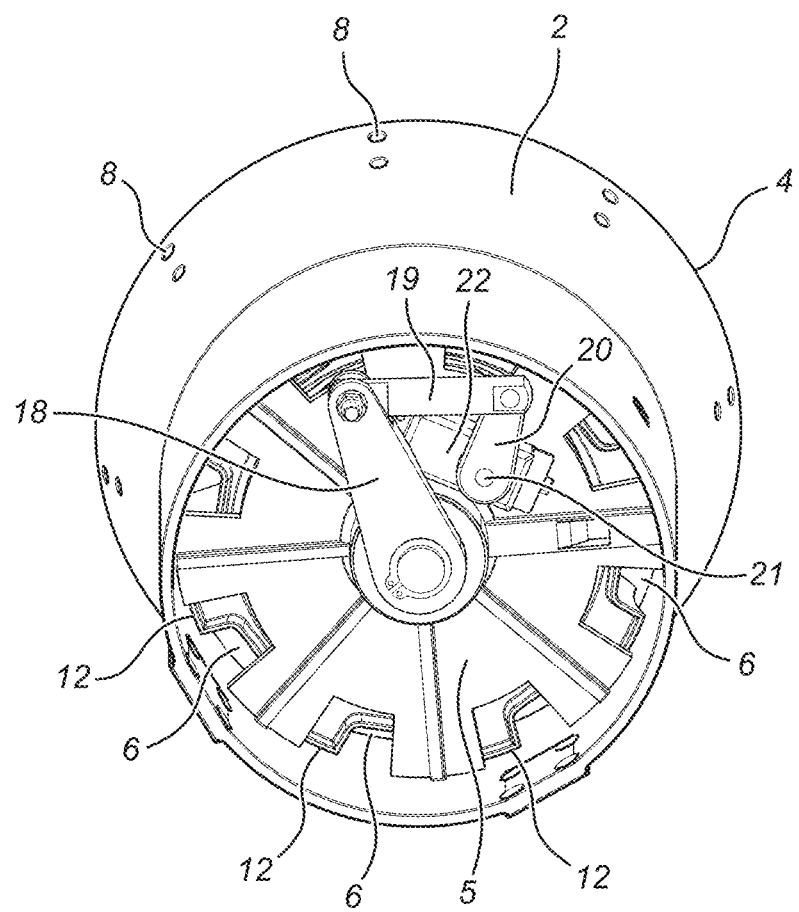
FIG. 7 presents a bottom view of the assembled device of FIG. 6.

In FIG. 7, the underside of the device of FIG. 6 is presented. This bottom view shows the arrangement of arms (18, 19, 20) used to transform the rotating movement of the driving axis (21) of the servomotor (22) to a rotating movement of the axis of the second body.

Figure 8A:
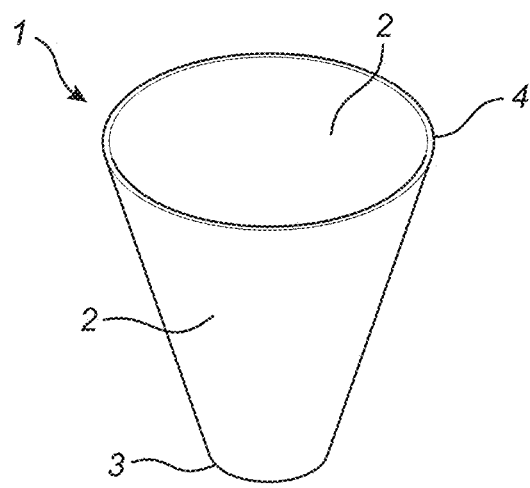
FIGS. 8A-8F show schematic views of separate bodies and assembled bodies of alternative embodiments of the invention.
Figure 8B:
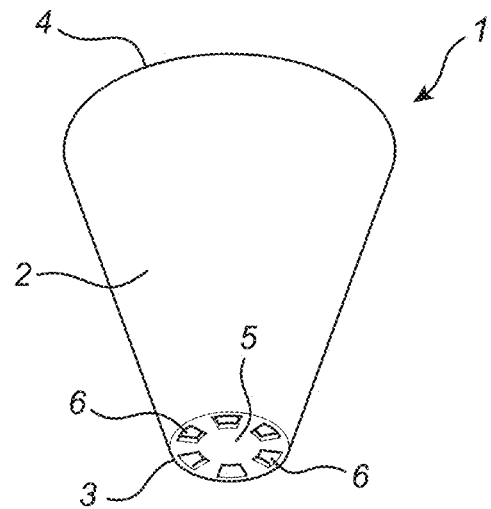
Figure 8C:
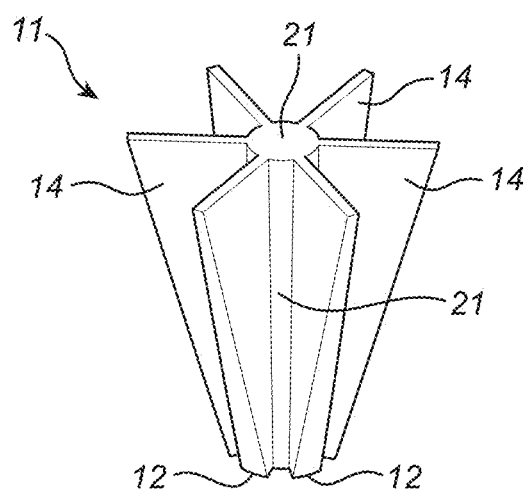
Figure 8D:
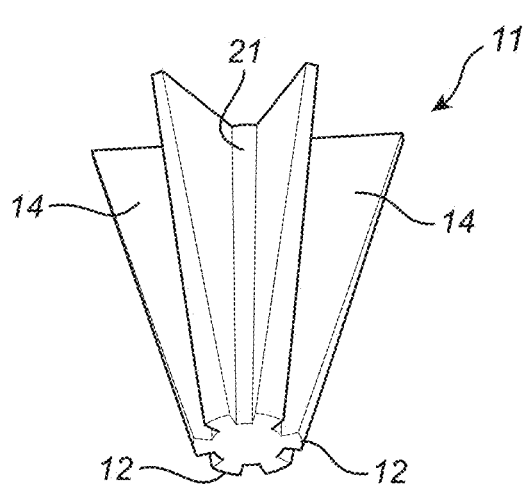
Figure 8E:
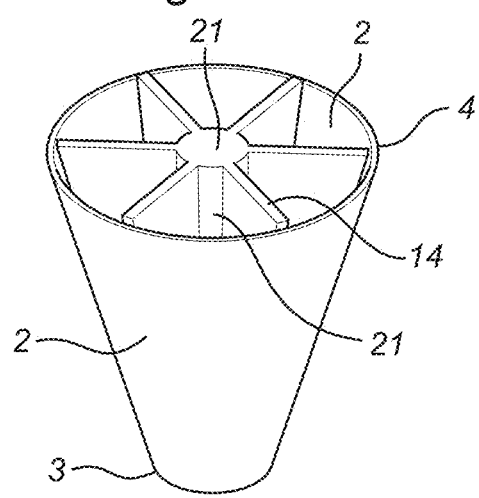
Figure 8F:
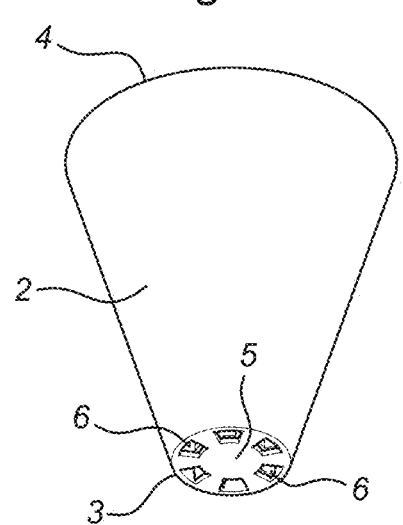

FIGS. 8A and 8B present perspective views from above and from below of schematic presentations of alternative embodiments of a body comprising a reservoir that may be considered a first body. The reservoir (1) of the body, the circumferential wall (2), the first end (3), the second end (4), the first base (5) and the openings (6) are presented with the same reference numerals as used for similar elements of the embodiment in FIGS. 2, 5, 6. The circumferential wall (2) of the reservoir (1) has a cone shape, wherein the circumference of the cone mantle is smaller at the first end than at the second end. FIGS. 8C and 8D present perspective views from above and from below of schematic presentations of an alternative embodiment of a body comprising a number of screens and a number of closing means that may be considered a second body (11). The screens (14) and the boundary edge (12) are presented with the same reference numerals as used for similar elements of the embodiment in FIGS. 3, 5, 6. It should be noted that in the embodiment of FIGS. 8C and 8D, the screens (14) all are of identical size and shape. In addition in this embodiment the screens protrude from a central supporting pillar (21). Also in this embodiment the screens at their lower end (near and at the boundary edge) (12) have a size and shape that is suitable for covering the openings (6) of the first base (5) of the first body (1). FIGS. 8E and 8F present an assembly of the body of FIGS. 8A/8B in the void of the reservoir of the body of FIGS. 8C/8D. The second body (11) is positioned in the void of the first body (1) such that the boundary edge (12) abuts the uppers surface (the surface on the side of the void) of the first base (5). Particulate material can be loaded into the reservoir in the free space between the circumferential wall (2) and the second body (11). Also in this embodiment, by rotation of the second body relative to the first body, the level of covering of the openings (6) screens (14) closing of the openings may be changed. Rotation of the first second body relative to the first body may be accomplished with suitable actuation means. The skilled person will be able to select and/or design suitable actuation means, e.g. in analogy with the embodiments of FIGS. 2-3, 5-7.

FIGS. 9A-9F schematically show an alternative embodiment wherein the body comprising the reservoir and the body comprising the screens are a single body and the body comprising the closing means are a separate body. In FIGS. 9A and 9B the body comprising the reservoir and the screens are schematically presented in perspective view from above and from below. The reservoir (1) of the body, the circumferential wall (2), the first end (3), the second end (4), the first base (5) and the openings (6) are presented with the same reference numerals as used for similar elements of the embodiment in FIGS. 2, 5, 6. In this embodiment the circumferential wall (2) of the reservoir (1) has a cone shape, wherein the circumference of the cone mantle is smaller at the first end than at the second end. The screens (14) protrude from the circumferential wall (2) into the void of the reservoir (1). The screens stretch from the upper surface (the surface on the side of the void) of first base (5) to the second end (4). Also in this embodiment the screens (14) all have an identical size and shape. FIGS. 9C and 9D present perspective views from above and from below of schematic presentations of an embodiment of a body (24) comprising a number of closing means (22). The closing means (22) are elongated plates that radiate from the underside of a central pillar (23). FIGS. 9E and 9F present an assembly of the body of FIGS. 9A/9B and of FIGS. 9C/9D. In the assembly the central pillar (23) is inserted into the void of the reservoir (1) via the central opening (24) in the void of the reservoir (1). The closing means (22) abut on the lower surface (the side away from the void) of the first base (5). Particulate material can be loaded into the reservoir (1) in the free space between the circumferential wall (2) and the central pillar (23). By rotation of the reservoir with splines relative to the central pillar (23) with the closing means (22), the screens (14) will push against particulate material loaded in the void while the level of covering of the openings (6) by the closing means will change, thus changing the closing of the openings. Rotation of the reservoir (1) relative to the central pillar (23) may be accomplished with suitable actuation means. The skilled person will be able to select and/or design suitable actuation means, e.g. in analogy with the embodiments of FIGS. 2-3, 5-7.

FIGS. 10A and 10B present perspective views from above and from below of schematic presentations of an alternative embodiment of a body comprising a reservoir that may be considered a first body. The reservoir (1) of the body, the circumferential wall (2), the first end (3), the second end (4), the first base (5) and the openings (6) are presented with the same reference numerals as used for similar elements of the embodiment in FIGS. 2, 5, 6. FIGS. 10C and 10D present perspective views from above and from below of schematic presentations of an alternative embodiment of a body comprising a number of screens (14) that may be considered a second body (11). The second body (11) also in this embodiment in general has a dome shape having a boundary edge (12) on the lower side of the dome. The surface (13) of the dome of the second body is a sliding surface (13) for particulate material when present in the void. The second body comprises a number of screens (14) protruding from the sliding surface (13). The screens (14), extend from the top of the sliding surface (13) towards the boundary edge (12). In the embodiment of FIGS. 10C and 10D, the screens (14) all are of identical size and shape. FIG. 10E presents a perspective view from the top of a body (25) comprising closing means. The body comprises a flat disc (26) having extending teeth (27). The body is mirror symmetrical in its plane. Thus the upper side shown is identical to the underside. The diameter of the disc teethed disc corresponds to the diameter of the first base and the teeth have a size and shape that renders them suitable for covering the openings (6) of the reservoir (1). In FIG. 10F, the first body (1), second body (11) and body (25) comprising the closing means arranged together are shown. The second body (11) is arranged in the void of the first body (1) enclosed by the circumferential wall (2) of the first body (1). In the arrangement of the second body (11) relative to the first body (1), the boundary edge (12) is abutting the upper side of the first base (5). Particulate material may be loaded in the space between the circumferential wall (2) and the surface (13) of the dome of the second body (11). A rotational sliding movement of the second body (11) relative to the first body (1) is possible. By this movement the screens move, such that they will push against particulate material loaded in the void. The teethed body (25) is arranged abutting the lower surface (the surface away from the void) of the first base (5) with its upper side facing the lower side of the first base (5). It may also be moved in a rotational sliding movement by which the covering of the openings (6) by the teeth (27) is changed. By altering the covering of the openings (6) by the teeth, the outflow of particulate material loaded in the reservoir of the device via the opening at the second end (4) of the first body (1), may be regulated. Rotation of the second body (1) relative to the first body and of the teethed body (25) relative to the first body may be accomplished with suitable actuation means. The skilled person will be able to select and/or design suitable actuation means, e.g. in analogy with the embodiments of FIGS. 2-3, 5-7.

Figure 11:
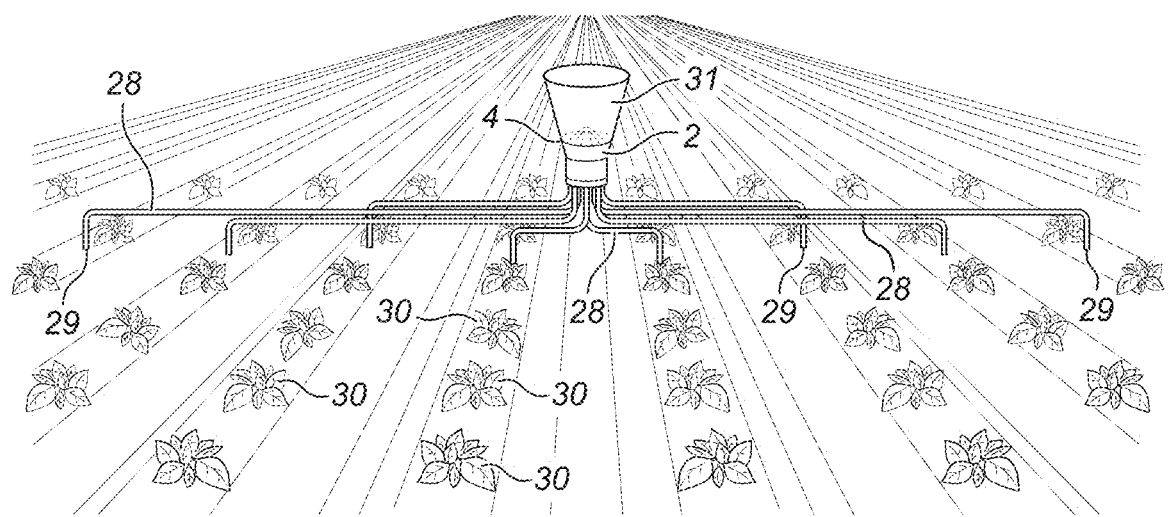
FIG. 11 shows a schematic view of a device of the invention comprising ducts.

FIG. 11 presents an alternative embodiment of the device of the invention. The embodiment is an alternative to the embodiments presented in FIGS. 2-3, 5-7 and comprising ducts (28) connected via inlets to the openings (6) in the first base (5), for transporting particles from the openings (6) in the first base (5). In the embodiment presented in FIG. 11, the number inlets and ducts (28) corresponds to the number of openings (6) in the first base (5), such that each duct (28) is connected to a single opening. This embodiment comprising transporting ducts (28) is in particular suitable for dispensing particulate material simultaneously in a plurality of rows of a crop (30), for example with a wheeled agricultural vehicle, such as a tractor (for the sake of simplicity not shown in FIG. 11). For this the outlets of the ducts (28) of the embodiment presented are positioned at different positions a distance away from each other on an essentially straight line. The horizontal distance between the outlets (29) corresponds to the distance of the rows of the crop (30) in the field. To increase the filling capacity of the device, in this embodiment the reservoir is extended with an extension beaker (31) connected to the second end (4) of the circumferential wall (2) of the reservoir. The device may be mounted on the agricultural vehicle via the reservoir, in particular via the circumferential wall (2).

EXPERIMENTS

Experiment 1

Material Characterization Experiment

Method

The flowability of the different carrier materials is defined in the following experiment. The method developed by Geldart et al. (Characterization of powder flowability using measurement of angle of repose, China particuology, Vol. 4, Nos. 3-4, 104-107, 2006) is used to classify the different materials. The device used is the Mark4 Angle Of Repose (AOR) tester available from Powder Research Ltd. (North Yorkshire, UK (www.powderresearch.com)). The following protocol is used, 100 g of material is slowly poured on the (vibrating) chute taking about 20 seconds, a vibrating device is used if the material does not flow. The angle is determined by measuring the height and diameter of the material on the backplate and baseboard. The three carrier materials to be tested are vermiculite, saw dust and bran. Before each run the material is homogenized by mixing the material, whereby large chunks are broken down into smaller parts which can freely flow through the funnel in the Mark 4 AOR tester. Mixing is done manually by moving a hand or a tool through the material. Each material is tested five times.

TABLE 1

Angle of repose, classification of flow characteristics according to Geldart et al (2006).

| Angle of repose | Flowability indication |
| --- | --- |
| <30° | Good, free flowing |
| 30°-45° | Some cohesiveness, limited free flowing |
| 45°-55° | Cohesiveness |
| >55° | Sluggish, non-free flowing |

Table 1 is used in order to define the flow characteristics.

Results

TABLE 2

Results Mark 4 Angle of repose tester

| Carrier | Angle of repose [° ± std] |
| --- | --- |
| Vermiculite (n = 5) | 36.67° ± 0.95° |
| Saw Dust (n = 5) | 46.57° ± 0.86° |
| Bran (n = 5) | 43.91° ± 0.24° |

In Table 2 it can be seen that Vermiculite and Bran fall in the category of limited free flowing and Saw Dust falls in the category where cohesiveness is observed. For saw dust the vibrating device had to be switched on.

Conclusion

All tested materials, which are commonly used as carrier materials for beneficial arthropods, at least have limited free flowing characteristics and the saw dust tested shows cohesiveness. This will result in risks of irregular flow and/or clogging, when dispensing formulations comprising such carriers Experiment 2

Static Dispensing Experiment

Introduction

In this experiment the particle distribution of a device according to the invention is determined in a static setup, whereby the volumetric flow over time should be reproducible. The volumetric flows required from the device are dependent on the speed of the vehicle on which the device is mounted, e.g. drone or tractor, density of particulate material to be released onto a target area and the required application rate (amount/m$^2$) in the target area.

Method

The device of the invention used in this experiment corresponded to embodiments as presented in FIGS. 2-3, 5-7. Both the first and the second body were created using the additive manufacturing technique SLA (Stereolithography) with the following dimensions: height of 206.5 mm, diameter of the base of body 1 of 155 mm, excluding thickness of the walls, and with 8 openings having an individual surface area of 320 mm$^2$. An extension of the reservoir (comparable to what is shown in FIG. 11) is connected to the second end of the first body in order to increase the filling capacity of the dispensing device. The reservoir of the first body of the device was filled with 5.0 liters of 3 different particulate materials manually homogenized by moving a hand or a tool through the material. The control unit (Unitronics V570 with snap-in module V200-18-EIB) was set to drive the servomotor (HiTec HS7954SH) such that the required volumetric flow was obtained. The particulate materials used are the moistened carrier materials used in products of Koppert Biological Systems and are based on saw dust, vermiculite or bran. In experiment 1 it is shown that the flowing characteristics are different for the 3 particulate materials. A timer and the servo actuator are started at the same time and the timer is stopped when through visual inspection the release of material is completed. Results for the different particulate materials are presented below. The settings used are defined by the two positions relative to the fully open position and frequency for alternating between the two positions.

Results

In Table 3 to 5 the results are listed for the different materials. These experiment were conducted without influence of external vibrations.

TABLE. 3

Results saw dust; SD: Standard deviation
Saw dust (n = 40)

| Setpoints | | | | |
|---|---|---|---|---|
| Min. opening [%] | Max. opening [%] | Frequency [Hz] | Time ± SD [s] | Flow ± SD [ml/s] |
| 5 | 45 | 5 | 203.4 ± 4.7 | 24.6 ± 0.57 |
| 14 | 48 | 4.2 | 176.8 ± 7.9 | 28.3 ± 1.28 |
| 16 | 50 | 4.2 | 136.3 ± 2.0 | 36.7 ± 0.54 |
| 15 | 55 | 5 | 106.0 ± 2.8 | 47.2 ± 1.24 |

For the saw dust the dispensing device has an outflow result whereby the standard deviation is between 1.5% and 4.5%.

TABLE 4.

Results vermiculite; SD: Standard deviation
Vermiculite (n = 80)

| Setpoints | | | | |
|---|---|---|---|---|
| Min. opening [%] | Max. opening [%] | Frequency [Hz] | Time ± SD [s] | Flow ± SD [ml/s] |
| 5 | 38 | 5 | 194.8 ± 9.3 | 25.7 ± 1.23 |
| 5 | 40 | 5 | 155.3 ± 3.9 | 32.2 ± 0.81 |
| 5 | 42 | 5 | 147.1 ± 9.7 | 34.0 ± 2.26 |
| 4 | 44 | 5 | 130.1 ± 10.0 | 38.4 ± 2.96 |
| 5 | 49 | 5 | 98.6 ± 1.5 | 50.7 ± 0.75 |
| 5 | 55 | 5 | 78.3 ± 1.2 | 63.9 ± 0.94 |
| 8 | 58 | 5 | 68.1 ± 1.8 | 73.4 ± 1.94 |
| 12 | 62 | 5 | 54.8 ± 1.3 | 91.2 ± 2.17 |

The results of the outflow show a standard deviation between 1.5% and 7.7% while dispensing Vermiculite.

TABLE 5

Results bran; SD: Standard deviation
Bran (n = 90)

| Setpoints | | | | |
|---|---|---|---|---|
| Min. opening [%] | Max. opening [%] | Frequency [Hz] | Time ± SD [s] | Flow ± SD [ml/s] |
| 7 | 38 | 5 | 403.6 ± 9.1 | 12.4 ± 0.28 |
| 10 | 40 | 5 | 309.8 ± 6.1 | 16.1 ± 0.32 |
| 10 | 50 | 5 | 244.4 ± 11.2 | 20.5 ± 0.94 |
| 8 | 48 | 5 | 205.2 ± 5.3 | 24.4 ± 0.63 |
| 11 | 51 | 5 | 178.8 ± 1.5 | 28.0 ± 0.23 |
| 10 | 55 | 5 | 153.2 ± 3.0 | 32.6 ± 0.65 |
| 20 | 70 | 3.3 | 118.8 ± 1.1 | 42.1 ± 0.39 |
| 25 | 75 | 3.2 | 99.2 ± 0.8 | 50.4 ± 0.43 |
| 25 | 75 | 4 | 73.2 ± 0.8 | 68.3 ± 0.78 |

The dispensing of Bran has a standard deviation between 0.8% and 4.6%.

Conclusion

The results show an acceptable variance of the median flow for each of the different tested settings. The average standard deviation is 2.7%, therefore it is concluded that the dispensing device is capable of reproducing the same outflow over time.

Experiment 3

Dynamic Dispensing Experiment

Introduction

The previous experiment showed that in a static situation, dispensing flow of different particulate materials with the device of the invention is reproducible within tolerable margins. In this experiment the dynamic situation of distribution of particulate materials is tested, while the device of the invention is mounted on an Unmanned Aerial Vehicle (UAV). The goal is to determine the effect of external vibration sources, e.g. vibration from a vehicle, on the release of particulate material and to determine how the particulate material will be deposited on a surface while the UAV is flying over the surface.

Method

Figure 12:
FIG. 12 shows the layout of the trays as used in the dynamic distribution experiment (experiment 3).

The device and reservoir as used in the static experiment are used in this experiment. The device was mounted on the bottom of a hexacopter drone (model DJI M600 Pro) between the landing legs via the extension beaker connected to the second end of the first body. The drone was flown in a single path over a surface consisting of 210 trays of 200 ml. The trays were positioned in a matrix of 21 rows by 10 columns with their sides abutting. The surface with 200 ml trays can be seen in FIG. 12. In FIG. 12 there are additional tray on both sides used in the experiment to determine whether there is material collected on the sides, whereby also the straightness of the flight can be determined afterwards. The same sawdust, vermiculite and bran used in the static experiment, were used in this experiment. The reservoir is again filled before each flight with 5.0 liter of material manually homogenized by moving a hand or a tool through the material. After each flight the amount of particulate material (sawdust/bran/vermiculite) deposited in each separate trays is determined by weighing and the values were recorded. For each material three flights were performed in an hangar where there was no to minimal influence of wind on the pattern of deposition of the particulate material. The drone was flown over the center line of the columns of the matrix (columns 5-6) and the direction of flight is from row 1 to row 21. Each flight is flown at a height of 4 meters with a speed of 12 km/h. The settings used were recorded in Table 6.

TABLE 6

Settings used in dynamic distribution experiment

| Material | Minimum opening [%] | Maximum opening [%] | Frequency [Hz] |
|---|---|---|---|
| Saw dust | 10 | 70 | 5 |
| Vermiculite | 20 | 60 | 5 |
| Bran | 10 | 100 | 5 |

Results

Figure 13A:
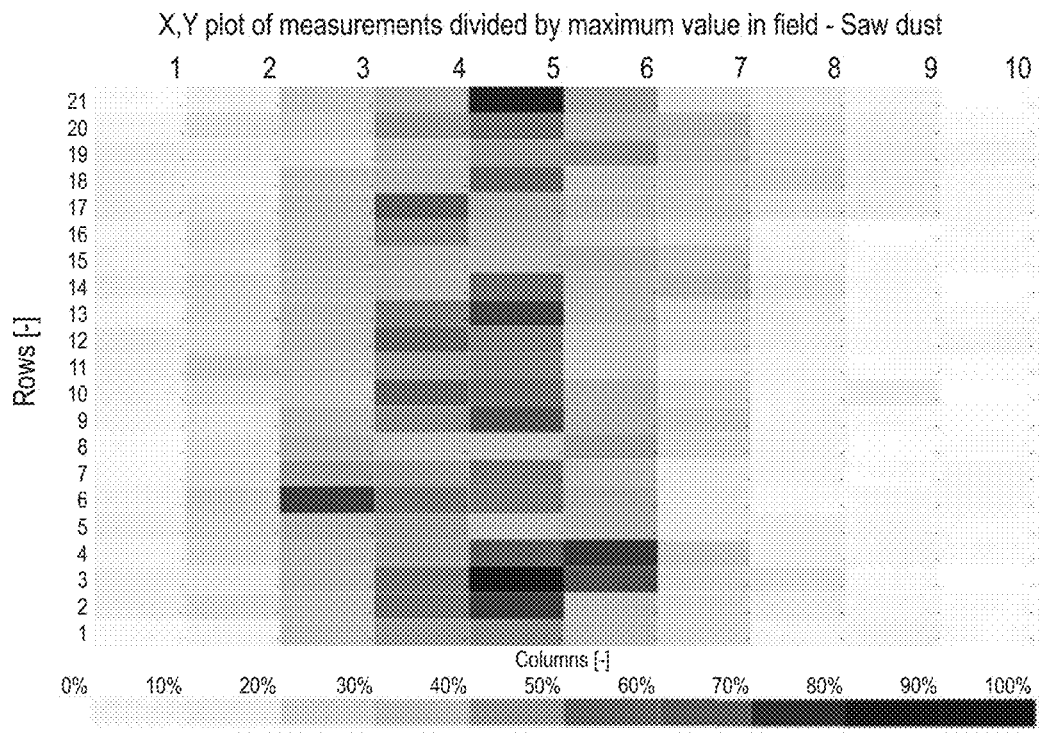
FIGS. 13A-13C show the results of the dynamic distribution experiment (experiment 3) for the three different carrier materials used.
Figure 13B:
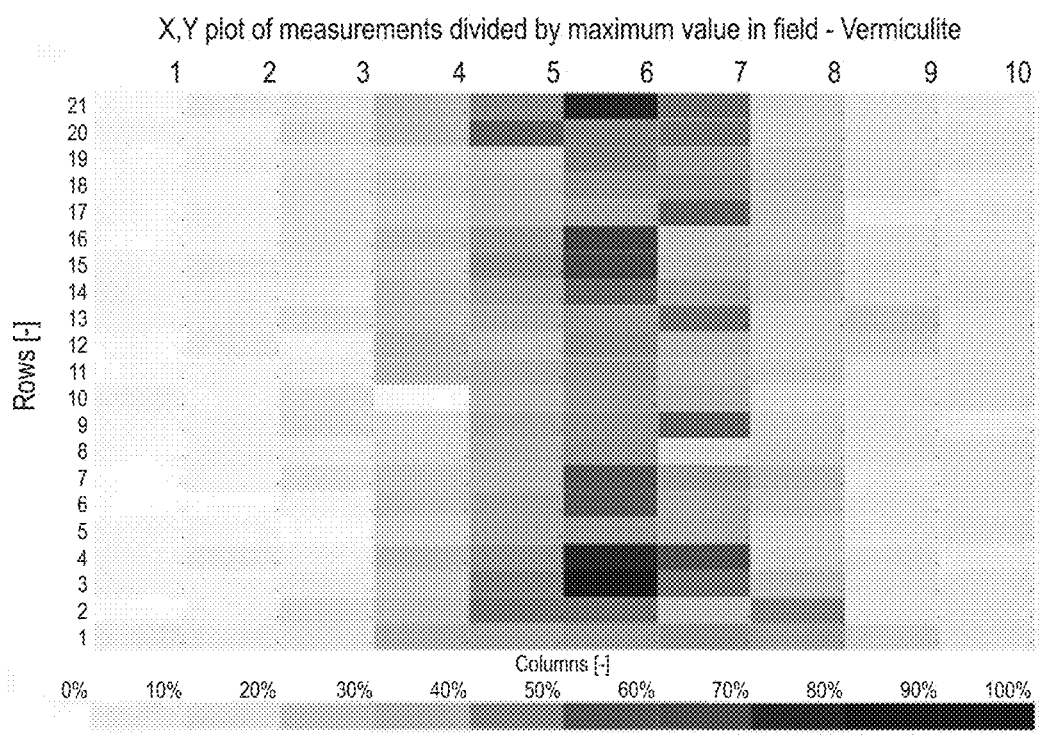
Figure 13C:
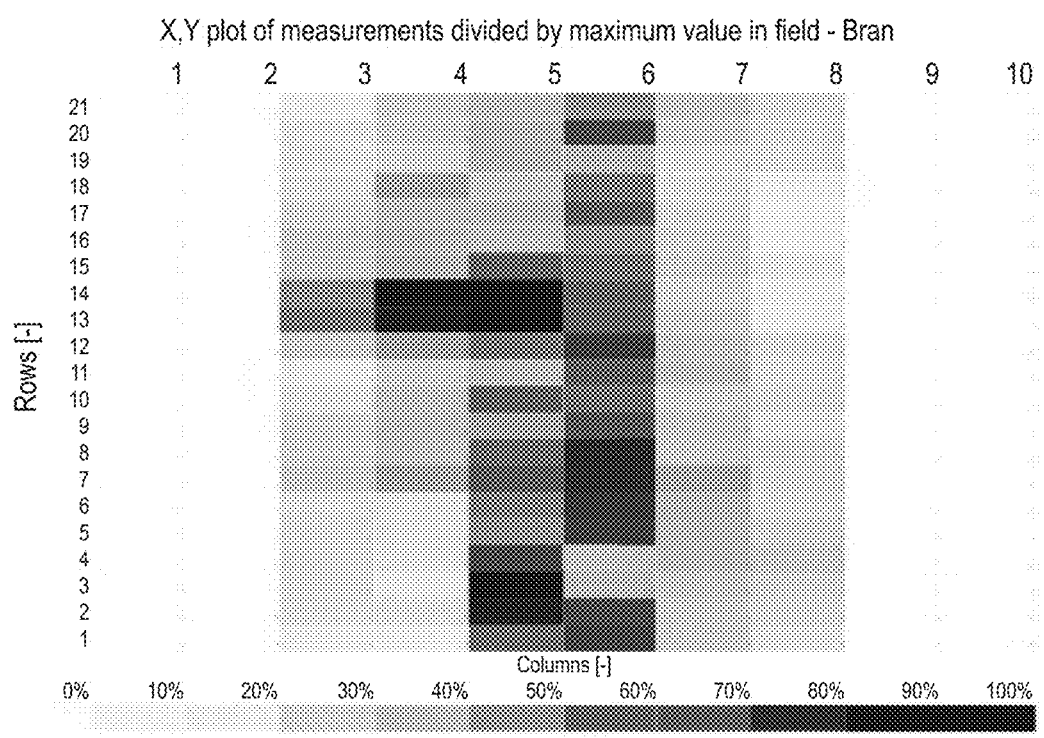

In FIGS. 13A-13C the results are plotted in a x, y matrix with an intensity scale, wherein the percentage for each cell of the matrix is calculated from the measurement of the corresponding tray divided by the maximal value measured in the field.

A slight deviation from the exact center flight path in both translation or rotation can influence the distribution pattern as presented in FIGS. 13A-13C. From the results in FIG. 13C (bran) it can be derived that the drone had a slight deviation where the direction of flight is from column 5 row 1 to column 4 row 21.

For each of the materials it is observed that there are peaks where material was released during the repetitive motion of the dispersal device. Under the conditions of the test, on average the material is released on a width of 5 rows which corresponds with a 90 cm width release pattern.

Conclusion

The dispersal pattern is 90 cm wide and has constant release of material. Of the tested materials, vermiculite is the only material which shows large peaks where material was deposited. This phenomenon can be explained by the better free flowing properties and different aerodynamic properties of vermiculite compared to saw dust and bran. By changing the settings e.g. by increasing the frequency and/or using a smaller amplitude between minimal (first position) and maximal opening (second position) the peaks could be reduced.

Experiment 4

Survival Experiment

Introduction

To test whether there is any significant mortality of beneficial arthropods during dispensing with the device of the invention, the following experiment is performed in both static and dynamic situations. The static tests are performed in a controlled environment and the dynamic are performed indoors in a hangar to exclude the influence of the environment.

Method

The beneficial arthropod used is the predatory mite *Phytoseiulus persimilis* (Spidex™ product from Koppert Biological Systems) provided in a bottle of 500 ml with 10.000 mites per bottle and saw dust as carrier material. Phytoseiulus persimilis is selected for this test, as it is known to be a sensitive organism. In addition, the formulation of the product contains no other mites. For each trial 6 bottles were combined and mixed using 2 buckets where the product was gently moved from one bucket to the other ten times. After which three samples of 1 gram were taken and contained in a petri dish, these are the reference samples. Each collected sample was emptied on a separate piece of A3 paper to be able to count all the living *Phytoseiulus persimilis* mites.

During dispensing in the static test three bulk samples of 100 ml were collected in 500 ml containers, marked with a 100 ml reference line. The setting of the device used are the same as stated in Table 6 for saw dust from the dynamic distribution experiment. The bulk samples are collected after 1 minute, 5 minutes and 10 minutes after starting the dispensing function of the device. Prior to counting of living *P. persimilis* mites, the collected samples were homogenized by pouring the sample from one container to another ten times. From the bulk sample container three samples of 1 gram, weighed on a calibrated scale, are taken and placed in a separate petri dish. Each petri dish is emptied on a separate piece of A3 paper to be able to count all the living *P. persimilis*.

The number of living *P. persimilis* mites was compared to the number in the reference sample taken at the start of each trial. The result is positive if the mortality is less than 10% (or survival >90%).

For the dynamic test the first steps are the same, but the material released from the drone was collected using a field of 6 rows×2 columns containers (total surface area 2.2 m$^2$) placed long side leading. The drone was flown in the direction of the columns while kept as centered as possible above both columns. The material dispensed in the containers was carefully emptied above a large sheet of paper. The living *P. persimilis* were counted immediately, in addition the dead *P. persimilis* were counted using a binocular. By counting both the living and dead mites the mortality throughout the entire supply chain is determined, if the mortality (dead mites counted divided by total mites counted) where the upper limit of 15%. The differing methodology was used to increase the accuracy of the method. In the dynamic test no reference samples were taken in consideration.

Results

In Table 7 and 8 present the results for the static experiment and the dynamic experiment respectively.

TABLE 7

Results static mortality experiment

|  | Average weight sample [g] | Average count living *P. persimilis* [—] | Average density [—/g] | Mortality [%] |
|---|---|---|---|---|
| Reference (n = 3) | 1.07 | 159 | 150 | n/a |
| 1 (n = 3) | 1.25 | 171 | 137 | 8.6% |
| 2 (n = 3) | 1.10 | 171 | 154 | −3.2% |
| 3 (n = 3) | 1.14 | 168 | 148 | 1.3% |

The average mortality during the static experiment was 2.2%. This is well below the acceptable upper limit of 10%. Inspection of the dispensing device showed that some living *P. persimilis* remained behind. This amount was estimate to be 0.5%-1%. Due to the fact that the living mites are motile, there are some deviations in the measurements. This may result in negative values for the mortality.

In the adjusted dynamic experiment, counting of dead *P. persimilis* were included. Thus the mortality over the entire logistics chain is identified. By using this method a mortality rate of 15%, through the entire logistics chain is acceptable.

TABLE 8

Results dynamic mortality experiment

| Trial | Weight sample [g] | Count living *P. persimilis* [—] | Count dead *P. persimilis* [—] | Density [—/g] | Mortality [%] |
|---|---|---|---|---|---|
| 1 | 1.38 | 230 | 23 | 183 | 9.1% |
| 2 | 1.44 | 192 | 22 | 148 | 10.3% |
| 3 | 1.60 | 207 | 21 | 158 | 9.2% |

The average mortality (9.6%) during the entire process falls within the specified requirement (15%). During emptying of the containers on the sheet of paper it could not be avoided to have an increase in mortality due to hard contact of the container on the paper.

Conclusion

The mortality of beneficial arthropods dispensed with the device of the invention is very low (2.2%) and shows that the device itself is unlikely to cause relevant mortality. The mortality in the overall process, from factory to release on the end surface (9.6%), is within acceptable limits.

Experiment 5

De-Mixing Experiment

Introduction

Enclosed in large bulk volumes (>3 liter), certain arthropods can survive up to around 20 minutes. If a vehicle carrying the device, such as a drone, is capable of longer travel times it is assumed that the material will be added in suitable time intervals. Therefore 20 minutes is considered an acceptable time period wherein no de-mixing should be observed.

Method

The beneficial arthropod used is the predatory mite *Phytoseittlus persimilis* (Spidex™ product from Koppert Biological Systems) provided in a bottle of 500 ml with 10.000 mites per bottle and saw dust as carrier material. For each trial 6 bottles were combined and mixed using 2 buckets where the product is gently moved from one bucket to the other ten times to ensure a homogenous mixture. After mixing and homogenization, three samples of 1 grain are taken and contained in a petri dish, these are the reference samples. For counting, each sample is emptied on a separate piece of A3 paper to be able to count all the living *P. persimilis*.

The product is poured into the reservoir of a dispensing device as presented in FIGS. 2-3, 5-7 with an extension of the reservoir similar to what is shown in FIG. 11. The settings for the openings and the frequency of operation are identical to those used for saw dust in the static distribution experiment. In the test 100 ml samples are taken every 5 minutes in 500 ml containers. These samples are homogenized by pouring the sample from one container to another ten times. From the homogenized product in the containers three samples of 1 gram are taken and placed in separate petri dish. Each petri dish is emptied on a separate piece of A3 paper to count all the living *P. persimills*. Counting was performed as detailed for the static survival experiment.

Results

In table 9 the results are shown for the de-mixing properties in the dispensing device. During the 20 minute run there is no de-mixing noticeable, the average loss is 1.6%. The loss compared to the reference samples is the combination of mortality and de-mixing.

TABLE 9

Results de-mixing

| | Average weight sample [g] | Average count living *P. persimilis* [—] | Average density [—/g] | Loss compared to reference [%] |
|---|---|---|---|---|
| Reference (n = 3) | 1.12 | 166 | 148 | n/a |
| 5 minutes (n = 3) | 1.11 | 157 | 140 | 5.6% |
| 10 minutes (n = 3) | 1.07 | 157 | 147 | 1.1% |
| 15 minutes (n = 3) | 1.12 | 172 | 154 | −3.7% |
| 20 minutes (n = 3) | 1.25 | 179 | 144 | 3.4% |

Conclusion

Comparing the results in Table to those of the static mortality experiment, the results show no significant variance and hereby it can be concluded that no de-mixing is occurring.

Experiment 6

Field Efficacy Experiment

Introduction

In this test the efficacy of the arthropods (*Phytoseiutus persimilis* provided as Spidex™ product from Koppert Biological Systems) dispensed in the field with the device of the invention as shown in FIGS. 1-3, 5-7 mounted on the drone used in the dynamic experiment, is compared to manual release by sprinkling which is a common method for dispensing beneficial arthropods, such as beneficial mites.

Method

For execution of the experiment three different fields were selected within the same climate and with the same phenotype of strawberry plants. On each field three plots for the device of the invention and three control plots for manual sprinkling (the control treatment) are defined. On the control plots *P. persimilis* was dispensed by manual sprinkling by trained personnel at a rate of 20,000/acre. On the plots treated with manual sprinkling, *P. persimilis* was manually sprinkled by trained personnel at a rate of 20,000/ acre. Each plot contained 21 rows of 100 m long beds of strawberry plants. Each field was scouted for *Tetranychus urticae* (pest) and *P. persimilis* (predator) the day prior to introduction of *P. persimilis* and each week after the first introduction for 9 weeks in total. Thirty random count samples were taken per plot per analysis moment, whereby the three outer left, three outer right rows, and the first and last three meters of each plot were excluded due to possible contamination of surrounding fields. During the test season there were introductions on week 1, 3 and 6, these were determined on the *T. urticae* pressure. In Table 10 the used treatments are listed.

TABLE 10

| | | Treatment method | |
|---|---|---|---|
| T | Arthropod | Rate | Type |
| T1 | *P. persimilis* | 20,000/acre | Control (Manual sprinkling) |
| T2 | *P. persimilis* | 20,000/acre | Device of invention (mounted under the drone) |

Results

The experiment was executed in the Watsonville area (California United States of America) starting in week 2 of 2018 and in FIGS. 14A to 14C the results are presented from week 2 until week 11, where *P. persimilis* introductions were in week 2, 4, and 7.

In FIG. 14A the intensity of *T. urticae* is shown. There is no significant difference in intensity of *T. urticae* between the control (hand sprinkling of *P. persimilis*) and plots treated with *P. persimilis* dispensed with the device of the invention.

FIG. 14B shows the average proportion presence of *P. persimilis* in the crop. The results clearly show that the development of *P. persimilis* pressure in the plots treated with *P. persimilis* dispensed with the device of the invention is comparable to the control plots.

FIG. 14C shows the intensity of *P. persimilis*. The results clearly show that there is no significant difference in intensity of *P. persimilis* between the control plots and plots treated with *P. persimilis* dispensed with the device of the invention.

Conclusion

There is no difference in intensity of *T. urticae* between the control plots and plots treated with *P. persimilis* dispensed with the device of the invention. Since there is no significant difference in intensity and average pressure of *P. persimilis*, the efficacy of *P. persimilis* dispensed with the device of the invention is comparable to manual introduction by sprinkling. Therefore it is concluded that the use of the device of the invention for dispensing beneficial arthropods is effective and has no significant negative effect on the efficacy of the released arthropods.

Embodiments

From the above description it is clear that the method of the invention, the device of the invention, the use thereof in distributing a particulate material in a target area and the vehicle of the invention have may have many variations and forms. All variations and forms covered by the claims are envisaged by the invention. FIGS. 15-21 further show combinations of parameters envisaged for use in the invention in all its aspects.

In FIG. 15 combinations of the percentage of opening in the first position and in the second position envisaged for the method, the device, the use of the device and the vehicle of the invention are presented as P1-P60. It will be clear that for example combination P46 is the combination wherein in the openings are open for 4-16% in the first position and are open for 35-80% in the second position. All individual combinations P1 to P60 are envisaged within the invention.

In FIG. 16 combinations of the area of the openings and the frequency of the alternating movement envisaged for the method, the device, the use of the device and the vehicle of the invention are presented as AF1-AF36. It will be clear that for example combination AF10 is the combination wherein in the area of the opening is 10-100*$10^3$ $mm^2$ and the frequency is 0.2-40 $s^{-1}$. All individual combinations AF1 to AF36 are envisaged within the invention.

In FIG. 17 combinations of the P1-P60 combinations of FIG. 15 and the frequency of the alternating movement envisaged for the method, the device, the use of the device and the vehicle of the invention are presented as PF1-PF540. It will be clear that for example combination PF166 is the combination wherein the P46 combination is selected and the frequency is 0.2-40 $s^{-1}$. Thus the openings are open for 4-16% in the first position and are open for 35-80% in the second position and the frequency is 0.2-40 $s^{-1}$. All individual combinations PF1 to PF540 are envisaged within the invention.

In FIG. 18 combinations of the P1-P60 combinations of FIG. 15 and the AF1-AF36 combinations of FIG. 16 that are envisaged for the method, the device, the use of the device and the vehicle of the invention are presented as E1-E2160. It will be clear that for example combination E586 refers to a combination of parameters corresponding to the combination of the AF10 combination with the P46 combination. Thus the openings are open for 4-16% in the first position and are open for 35-80% in the second position, the area of the opening is 10-100*$10^3$ $mm^2$ and the frequency is 0.2-40 $s^{-1}$. Similarly, combinations of the fractional distance of the movement of the screens and the AF1-AF36 combinations of FIG. 16 that are envisaged for the method, the device, the use of the device and the vehicle of the invention are presented as E2161-E2772 in FIG. 19. All individual combinations E1 to E2772 are envisaged within the invention.

FIG. 20 shows a matrix of combinations of a number of features of the reservoir (R1–R5, R1+R5), features of the closing means (C1, C2, C1+C2), features of the screens (S1–S6, S2+S3, S2+S3+S6) and features of the movement of the screens between the first and second position (M1–M3, M1+M2, M1+M3, M1+M2+M3) envisaged in the method and device of the invention and the related use and vehicle of the invention. In addition the combination of these features with different embodiments of the device of the invention (D1–D4) are presented. Where an “X” is presented a certain combination is explicitly envisaged within the context of the invention. It should be understood that where a certain feature in the combination matrix would appear twice in a combination marked with an “X” that feature should be considered only once for the combination. For example the combination “S2+S3/S2+S4” relates to a combination S2+S3+S4, thus combining the features “The number of screens (in use position) is positioned essentially vertically” (S2), “screens have a size and form that renders them suitable to function as closing means” (S3) and “screens protrude towards the circumferential wall, from a surface stretching from the upper surface of the first base away from the first base” (S4). The combinations of features as presented in the matrix of FIG. 20 may be combined with the independent claims or with any of the dependent claims as would be suitable.

FIG. 21 shows a feature combination matrix similar to the matrix of FIG. 20, for alternative groups of embodiments presented generically, wherein each “Y” may be substituted for “P1-P60”, “AF1-AF36”, “PF1-PF540” or “E1-E2160” or “E2161-E2772” (thus 5 alternative matrices can be obtained wherein all “Y”’s are substituted for either of “P1-P60”, “AF1-AF36”, “PF1-PF540”, “E1-E2160” or “E2161-E2772” (Thus Y=AF1-AF36, Y=PF1-PF540, Y=E1-E2160 or Y=E2161-E2772). Where Y=P1-P60, the feature combinations corresponding to a Particular "Y" presented in FIG. 20 within the context of the independent claims or any of the dependent claims as would be suitable, are further combined with the 60 individual combinations of the % opening in the first and second position as presented in FIG. 15. Thus for example the R1/S4 combination of the "P1-P60" matrix relates to the combination of a reservoir comprising a circular circumference with screens protrude towards the circumferential wall, from a surface stretching from the upper surface of the first base away from the first base and a combination of the % opening in the first and second position as presented in FIG. 15, for example P25, wherein in the first position the openings are open for 2-18% and in the second position the openings are open for 30-80%. In analogy to what is explained for the "P1-P60" matrix in the AF1-AF36", "PF1-PF540", "E1-2160" and "E2161-E2772" matrix, the combinations of FIG. 20 are combined with the individual combinations of FIGS. 16, 17, 18 and 19 respectively. Combination of the matrix of FIG. 21 with the individual combinations of FIG. 17 is preferred, thus Y=PF1-PF540 is preferred.

The invention claimed is:

1. A method for dispensing in a target area, a particulate material, the method comprising the steps of:
   (i) providing a reservoir for the particulate material, said reservoir comprising a number of openings, suitable to allow particulate material to exit from the reservoir;
   (ii) providing a number of closing means suitable for at least partially closing the openings of the reservoir;
   (iii) providing a number of screens in the void of the reservoir, said screens being movable, through the void of the reservoir between at least a first and a second position;
   (iv) loading particulate material in the reservoir; and
   (v) moving the reservoir loaded with particulate material over the target area and at least partially opening the number of openings while alternatingly moving the screens between the first and the second positions and vice versa;
   wherein in the movement between the first and the second positions, the closing of the openings by the closing means is changed.

2. The method according to claim 1, wherein screens are positioned essentially vertically and the movement from a first to a second position and vice versa is essentially horizontally.

3. The method according to claim 1, wherein screens function as closing means.

4. The method according to claim 1, wherein in the first position the number of openings are open for 0-20%, and in the second position the number of openings are open for 30-100%.

5. The method according to claim 1, wherein the frequency of the alternating movement between the first and second position is between 0.05 and 50 times per second.

6. A method according to claim 1, wherein in their movement from a first to a second position, the screens push against particulate material, when present in the void.

7. A device for dispensing a particulate material, comprising:
   a body comprising a reservoir for the particulate material comprising a circumferential wall, surrounding a void, and having a first end and a second end at a distance from the first end, wherein the body further comprises a base, the first base, said first base connected to the circumferential wall at the first end closing the void at the first end, said first base provided with a number of openings, suitable to allow particulate material to exit from the reservoir;
   a body comprising a number of closing means suitable for at least partially closing the openings of the first base; and
   a body comprising a number of screens, protruding into the void, wherein the screens are moveable, between at least a first and a second position such that in their movement from a first to a second position, the screens push against particulate material, when the particulate material is present in the void, and wherein in the movement of the number of screens between the first and the second positions, the closing of the openings by the closing means is changed.

8. The device according to claim 7, wherein in the use position of the device screens are positioned essentially vertically and the movement from a first to a second position and vice versa is essentially horizontal, wherein the device preferably comprises a plurality of screens and the design of the movement of the screens from a first position to a second position is such that screens move in the same plane and screens are positioned essentially perpendicular to the plane of their designed movement.

9. The device according to claim 7, wherein the body comprising the reservoir is a first body and the body comprising the screens is a separate second body and said second body is arranged at least partially within the circumferential wall of the first body, the second body comprising a surface stretching from the upper surface of the first base away from the first base, and the screens are protruding from the surface towards the circumferential wall.

10. The device according to claim 7, wherein a number of screens have a size and shape to render them suitable as closing means.

11. The device according to claim 7, wherein the body comprising the reservoir and the body comprising the number of screens are a single body and the closing means preferably are on a separate body.

12. The device according to claim 7, wherein the body comprising the reservoir is a first body, the body comprising the screens is a separate second body and the body comprising the closing means is a separate third body.

13. The device according to claim 7, wherein the number of screens comprises an even number of at least four screens, wherein alternating screens have different sizes and/or shapes.

14. The device according to claim 7, wherein the openings have an area between 5 mm$^2$ and 1,000,000 mm$^2$.

15. The device according to claim 7, wherein the device comprises an actuator for movement of the screens, the actuator configured for alternating movement of the screens between a first and second position, such that in the first position the openings are open for 0-20% and in the second position the openings are open for 30-100%.

16. The device according to claim 7, wherein the device comprises an actuator for movement of the screens, the actuator configured for alternating movement of the screens between a first and second position at a frequency between 0.05 and 50 times per second.

17. The device according to claim 7, wherein the device comprises a number of ducts, each duct comprising an inlet, an outlet and a hollow body connecting the inlet with the outlet and the inlet of a duct is connected to an openings in the first base.

18. Use of a device according to claim 7 for dispensing particulate material in a target area.

19. Use according to claim 18, wherein the use is for a particulate material comprising beneficial arthropods.

20. A vehicle equipped with a device according to claim 7.

* * * * *